US012074378B2

(12) United States Patent
Fabrega Sanchez et al.

(10) Patent No.: US 12,074,378 B2
(45) Date of Patent: Aug. 27, 2024

(54) MULTIBAND ANTENNAS

(71) Applicant: QUALCOMM Incorporated, San Diego, CA (US)

(72) Inventors: Jorge Fabrega Sanchez, San Diego, CA (US); Mohammad Ali Tassoudji, San Diego, CA (US); Assaf Aviv, Carlsbad, CA (US); Taesik Yang, San Diego, CA (US); Jeongil Jay Kim, San Diego, CA (US); Kevin Hsi-Huai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/166,933

(22) Filed: Feb. 9, 2023

(65) Prior Publication Data

US 2023/0187848 A1 Jun. 15, 2023

Related U.S. Application Data

(63) Continuation of application No. 17/395,308, filed on Aug. 5, 2021, now Pat. No. 11,581,664.
(Continued)

(51) Int. Cl.
*H01Q 25/00* (2006.01)
*H01Q 5/49* (2015.01)

(52) U.S. Cl.
CPC ............. *H01Q 25/001* (2013.01); *H01Q 5/49* (2015.01)

(58) Field of Classification Search
CPC .......... H01Q 25/001; H01Q 5/49; H01Q 5/42; H01Q 5/35; H01Q 5/378; H01Q 9/0414; H01Q 21/08
See application file for complete search history.

(56) References Cited

U.S. PATENT DOCUMENTS 7,283,101 B2 10/2007 Bisiules et al.
7,932,870 B2 4/2011 Baliarda et al.
(Continued)

FOREIGN PATENT DOCUMENTS

CN 1647319 A * 7/2005 ............. H01Q 1/246
CN 210838072 U * 6/2020 ............. H01Q 21/00
(Continued)

OTHER PUBLICATIONS

He Y., et al., "28/39-GHZ Dual-Band Dual-Polarized Millimeter Wave Stacked Patch Antenna Array for 5G Applications," 2020 International Workshop on Antenna Technology (IWAT), IEEE, Feb. 25, 2020 (Feb. 25, 2020), 4 pages, XP033767869, DOI: 10.1109/IWAT48004.2020.1570609770, [retrieved on Apr. 30, 2020] Sections II to III, figures 1-5.
(Continued)

*Primary Examiner* — Hoang V Nguyen
(74) *Attorney, Agent, or Firm* — Patterson & Sheridan, L.L.P./Qualcomm Incorporated

(57) ABSTRACT

An antenna is described. The antenna includes a first plurality of first elements. Each of the first elements is dual polarized and configured to support a first set of bands and a second set of bands that is mutually exclusive from the first set of bands. The antenna also includes a second plurality of second elements. Each of the second elements is dual polarized and configured to support the second set of bands. The second plurality of second elements is interleaved with the first plurality of first elements.

20 Claims, 19 Drawing Sheets

Related U.S. Application Data

(60) Provisional application No. 63/063,185, filed on Aug. 7, 2020.

(56) References Cited

U.S. PATENT DOCUMENTS

| | | | |
|---|---|---|---|
| 2009/0224995 A1 | 9/2009 | Puente et al. | |
| 2019/0020110 A1* | 1/2019 | Paulotto | H01Q 5/392 |
| 2019/0312337 A1 | 10/2019 | Farzaneh et al. | |
| 2022/0045442 A1 | 2/2022 | Fabrega et al. | |

FOREIGN PATENT DOCUMENTS

| | | |
|---|---|---|
| EP | 3460905 A1 | 3/2019 |
| WO | 02084790 A1 | 10/2002 |
| WO | 2007011295 A1 | 1/2007 |

OTHER PUBLICATIONS

International Search Report and Written Opinion—PCT/US2021/045078—ISA/EPO—Nov. 29, 2021.

Mao C-X., et al., "Low-Cost X/Ku/Ka-Band Dual-Polarized Array With Shared Aperture," IEEE Transactions on Antennas and Propagation, IEEE, USA, vol. 65, No. 7, Jul. 1, 2017 (Jul. 1, 2017), pp. 3520-3527, XP011655694, ISSN: 0018-926X, DOI: 10.1109/TAP.2017.2700161 [retrieved on Jul. 3, 2017] Sections II-IV, figures 1-8.

Zhai W., et al., "Dual-Band Millimeter-Wave Interleaved Antenna Array Exploiting Low-Cost PCB Technology for High Speed 5G Communication", IEEE MTT-S International Microwave Symposium (IMS), 2016, 4 Pages.

* cited by examiner

MULTIBAND ANTENNAS

RELATED APPLICATION

This application is a continuation application of U.S. patent application Ser. No. 17/395,308, filed Aug. 5, 2021, which is related to and claims priority to U.S. Provisional Patent Application Ser. No. 63/063,185, filed Aug. 7, 2020, herein incorporated by reference in their entireties as if fully set forth below and for all applicable purposes

FIELD OF DISCLOSURE

The present disclosure relates generally to radio frequency (RF) devices. More specifically, the present disclosure relates to multiband antennas.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently, or with higher quality are often sought after.

Some electronic devices (e.g., cellular phones, smartphones, laptop computers, etc.) communicate with other electronic devices. For example, electronic devices may transmit and/or receive radio frequency (RF) signals to communicate. Improving electronic device transmission and/or reception may be beneficial.

SUMMARY

An antenna is described. The antenna includes a first plurality of first elements. Each of the first elements is dual polarized and configured to support a first set of bands and a second set of bands that is mutually exclusive from the first set of bands. The antenna also includes a second plurality of second elements. Each of the second elements is dual polarized and configured to support the second set of bands. The second plurality of second elements is interleaved with the first plurality of first elements.

The first set of bands may be lower in frequency than the second set of bands. A highest frequency in the first set of bands may be separated from a lowest frequency in the second set of bands by more than 6 gigahertz (GHz).

A first element spacing for the first set of bands may be greater than a second element spacing for the second set of bands. A first number of elements for the first set of bands may be less than a second number of elements for the second set of bands.

The antenna may include a third plurality of third elements. Each of the third elements may be dual polarized and may be configured to support the first set of bands and one or more third bands. The one or more of the third bands may overlap with the second set of bands. A band of the one or more third bands may be separated from the second set of bands by at least 3 GHz. The third plurality of third elements may include two elements that are separated by multiple of the second elements. The third plurality of third elements may include two elements that are separated by one second element. A lowest frequency in the first set of bands, the second set of bands, and the one or more third bands may be greater than 23 gigahertz (GHz).

The antenna may include a third element that may be dual polarized and may be configured to support the first set of bands and a third set of bands that overlaps with the second set of bands. The antenna may include a fourth element that may be dual polarized and may be configured to support the first set of bands and a fourth set of bands that overlaps with the second set of bands.

The antenna may include a non-uniform element spacing for a band. The antenna may include 7 elements. The antenna may include 8 elements.

Each of the first elements may include a stack of metallic patches. Two of the metallic patches may support respective sets of bands.

Each of the first elements and the second elements may be soldered to a base. Each of the first elements and the second elements may be a respective printed circuit board. The base may be a printed circuit board. At least two of the printed circuit boards of the first elements and the second elements may be different heights. All of the elements may be on a same printed circuit board.

The antenna may include a third plurality of third elements. Each of the third elements may be dual polarized and may be configured to support only the first set of bands.

One or more of the first elements may include four feeds. One or more of the first elements may include two feeds. Each of the two feeds may correspond to a different polarization. Signals on the first set of bands and signals on the second set of bands may be multiplexed for each of the different polarizations.

The antenna may have a largest dimension that is 30 millimeters or less. Each of the first elements and second elements may support only a subset of all bands supported by the antenna.

A method is also described. The method includes transmitting, from an antenna, a first signal in two polarizations in one of a first set of bands from a first element of a first plurality of first elements. Each of the first elements is configured to support the first set of bands and a second set of bands that is mutually exclusive from the first set of bands. The method also includes transmitting, from the antenna, a second signal in two polarizations in one of the second set of bands from a second element of a second plurality of second elements. Each of the second elements is configured to support the second set of bands. The second plurality of second elements is interleaved with the first plurality of first elements. The method may include transmitting, from the antenna, a third signal in two polarizations in a third band from a third element of a third plurality of third elements. Each of the third elements may be configured to support the first set of bands and the third band. The third band may include frequencies of approximately 48 GHz.

A non-transitory tangible computer-readable medium storing computer-executable code is also described. The computer-readable medium includes code for causing an electronic device to transmit a signal from an antenna. The antenna includes a first plurality of first elements. Each of the first elements is dual polarized and configured to support a first set of bands and a second set of bands that is mutually exclusive from the first set of bands. The antenna also includes a second plurality of second elements. Each of the second elements is dual polarized and configured to support the second set of bands. The second plurality of second elements is interleaved with the first plurality of first elements.

An apparatus is also described. The apparatus includes a signal transmission means. The signal transmission means includes a first plurality of first elements. Each of the first elements is dual polarized and configured to support a first set of bands and a second set of bands that is mutually exclusive from the first set of bands. The signal transmission means also includes a second plurality of second elements. Each of the second elements is dual polarized and configured to support the second set of bands. The second plurality of second elements is interleaved with the first plurality of first elements.

DETAILED DESCRIPTION

Figure 1A:
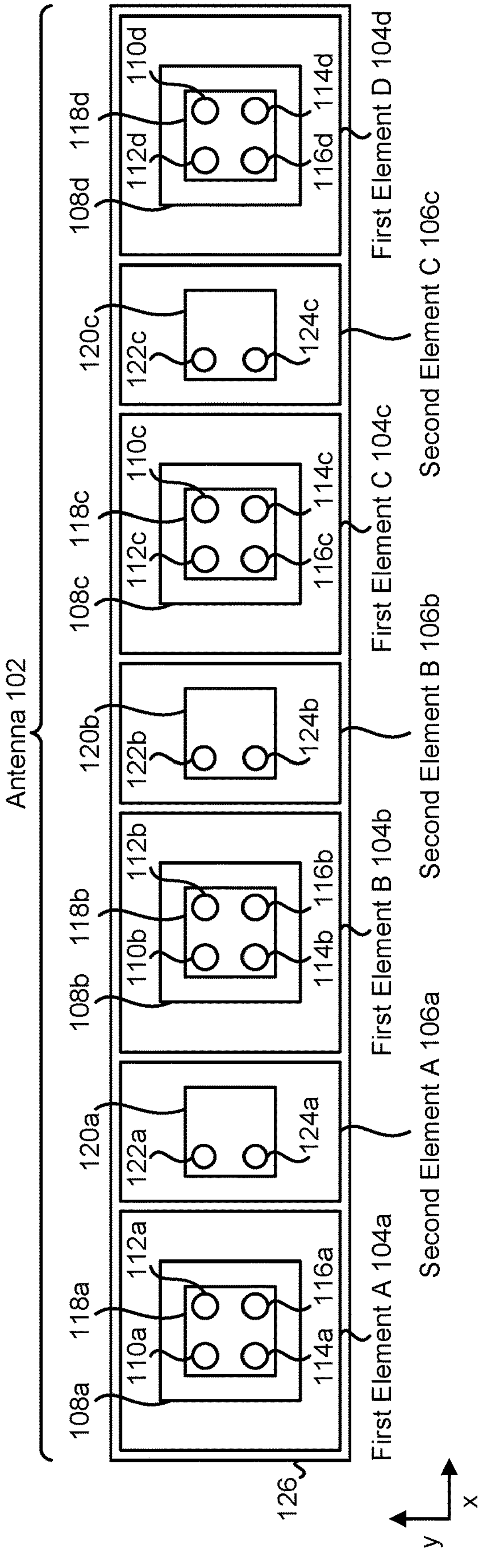
FIG. 1A is a diagram illustrating a top view of one example of an antenna in accordance with some of the configurations described herein.

Some configurations of the systems and methods disclosed herein may relate to multiband aperture-shared interleaved antenna arrays. An antenna may be a structure for transmitting and/or receiving electromagnetic signals. An antenna array may be an antenna that includes multiple elements, where each element may be capable of radiating and/or receiving electromagnetic (e.g., RF) signals. An element may include one or more metallic structures for radiating and/or receiving electromagnetic signals. In some examples, an element may be implemented as and/or included in a printed circuit board (PCB) or otherwise disposed on or in a substrate.

Some configurations of the systems and methods disclosed herein may relate to antenna arrays and/or antennas for signaling in a 20-300 gigahertz (GHz) frequency range (e.g., millimeter wave (mmWave) signaling in a 30-300 GHz frequency range and/or other frequency range(s)). For instance, some configurations of the systems and methods disclosed herein may relate to one or more implementations of multiband aperture-shared interleaved mmWave antenna arrays.

Some examples of the antennas described herein may provide signaling in frequency ranges (e.g., bands) utilized for fifth generation (5G) or New Radio (NR) communications, fourth generation (4G) communications, Long-Term Evolution (LTE) communications, third generation (3G) communications, Evolved Universal Mobile Telecommunications Service (UMTS) communications, Institute of Electrical and Electronics Engineers (IEEE) 802.11 (Wi-Fi) communications, Bluetooth communications, etc.

In some examples, antennas (e.g., mmWave antenna modules for 5G) may be integrated in wireless devices such as cell phones. For instance, cell phones may be implemented to include multiple antennas to provide coverage in all directions. Improving coverage and/or radiated performance of the antennas from within a limited volume (e.g., volume occupied by the antenna(s) in the device) may be beneficial.

It may be beneficial to support (e.g., provide communication signaling for) more signaling bands as more signaling bands become available. For example, it may be beneficial for an antenna to support one or more new bands (in addition to legacy bands), for instance.

Some examples of the techniques disclosed herein may provide interleaved antenna arrays with improved performance and/or coverage. Some examples may enable supporting more bands without increasing a physical size of an antenna array. Some examples of the antenna arrays described herein may have a largest dimension that is 30 millimeters (mm) or less. For instance, some of the antenna arrays described herein may have a width that is 27.2 mm, 26.2 mm, 25 mm, or another width that is 30 mm or less. Some examples of the antenna arrays described herein may have a length dimension that is 4 mm or less (e.g., 3.5 mm). In some examples, an antenna array may have a height between 0.5 and 1.5 mm. In some examples, an antenna element PCB may have a height of 0.94 mm. Some examples may provide antenna arrays that support a 47.2-48.2 GHz band (which may be referred to as a 48G or n262 band) with one or more other bands (e.g., 26.5-29.5 GHz (n257) band, 24.25-27.5 GHz (n258) band, 27.5-28.35 GHz (n261) band, 37-40 GHz (n260) band, and/or 39.5-43.5 GHz (n259) band).

Element size and spacing are factors for multiband antenna arrays. A multiband antenna array may be an antenna that supports multiple bands. In some examples, a multiband antenna array may support multiple bands by including an element that supports a single band and another element that supports another single band. A multiband element may be an element that supports multiple bands. For example, a multiband element itself may be utilized to transmit and/or receive on multiple bands. A single polarization element may be an element that supports a single polarization (e.g., vertical polarization, horizontal polarization, or polarization along only one direction, etc.). A dual polarization element may be an element that supports two polarizations (e.g., vertical polarization and horizontal polarization, polarizations along two directions, slant polarizations, ±45 degree polarizations, etc.).

An example of a multiband antenna array may be an antenna array with regularly-spaced multiband and dual polarization elements. In this example, all supported bands share the same element (which may be referred to as aperture sharing). Having the same spacing for all elements may lead to reduced scanning performance for relatively higher bands if the elements are spaced too far apart or may lead to increased coupling between elements for relatively lower bands if elements are spaced too closely.

An example of a multiband antenna array may be an antenna array with interleaved multiband and dual polarization elements, where each type of element may exclusively support a band or set of bands. For example, multiple elements of a first type are interleaved with multiple elements of second type, and each type of element may exclusively support a band or set of bands (without aperture sharing, for instance). This example of a multiband antenna array may result in relatively larger physical arrays and poor scanning performance in relatively higher bands. For instance, spacing may be too large between elements for the relatively higher band, which may create grating lobes. In some examples, "interleave" may mean alternating elements of different types, where one (e.g., only one) element of a type may be disposed between two elements of another type (for a series of at least three elements, for example). For instance, an element type A may be interleaved with another element type B when disposed in at least an alternating pattern: ABA. In some examples, "interleave" may mean alternating elements where one or more elements of a type may be disposed between two elements of another type (e.g., ABBA). In some examples, elements of an antenna may be disposed only along a row (e.g., only along a line or row without being disposed along another dimension or "column").

An example of an antenna array may be a dual band single polarization array. Different spacing of elements for relatively lower dual bands and for a relatively higher band may improve scanning performance. However, element arrangement in this example may increase array size and/or may not allow for dual polarization.

Another example of an antenna array may be a multiband interlaced array. In this example, single-band arrays may be interlaced with multiband elements in positions where elements of different arrays coincide.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1B:
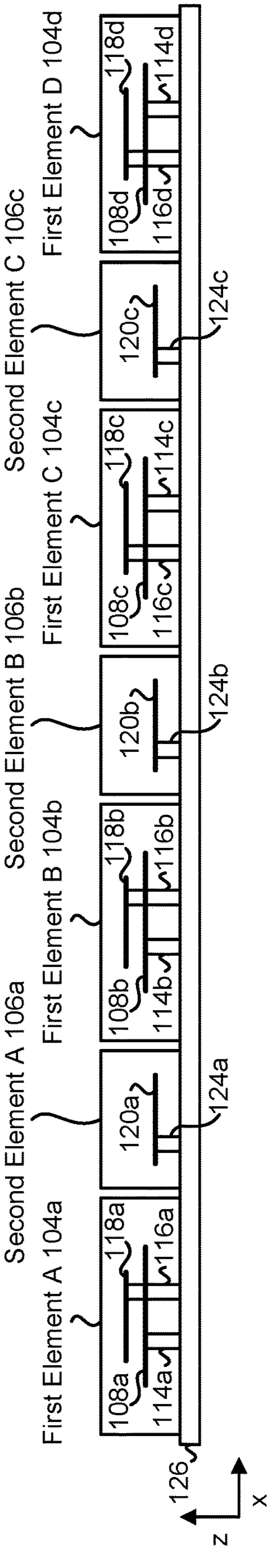
FIG. 1B is a diagram illustrating an elevation view of the antenna of FIG. 1A.

FIG. 1A is a diagram illustrating a top view of one example of an antenna 102 in accordance with some of the configurations described herein. FIG. 1B is a diagram illustrating an elevation view of the antenna 102 of FIG. 1A. FIG. 1A and FIG. 1B will be described together. In this example, aspects (e.g., dimensions, physical relationships, etc.) may be described in terms of x, y, and/or z axes. In some examples, "width" may refer to the x axis, "length" may refer to the y axis, and "height" may refer to the z axis. The antenna 102 may include a first plurality of first elements 104*a-d* and a second plurality of second elements 106*a-c*. In this example, four first elements 104*a-d* and three second elements 106*a-c* are illustrated. In other examples, other numbers of first elements 104*a-d* and/or second elements 106*a-c* may be implemented.

In some configurations of the antennas described herein, some elements may include one or more radiators. A radiator may be a metallic structure for transmitting and/or receiving electromagnetic signals. Examples of radiators include patches (e.g., approximately planar metallic structures), strips, etc. In some examples, a radiator may be connected to one or more feeds. In some examples, one or more of the elements described herein (e.g., first element(s), second element(s), third element(s), and/or fourth element(s), etc.) may include a parasitic radiator. For instance, one or more of the elements described herein may include a parasitic radiator(s) disposed above (e.g., stacked above) a radiator that is connected to a feed. For instance, a parasitic radiator may be a parasitic metal patch that is disposed above a radiator that is connected to a feed or above radiators that are connected to feeds. A parasitic radiator may not be connected to a feed. In some examples, a parasitic radiator may increase bandwidth. In some examples, a parasitic radiator may be smaller in size than (or approximately a same size as) a radiator (e.g., radiator connected to a feed) that is disposed below the parasitic radiator.

In this example, each of the first elements 104*a-d* may include a respective first radiator 108*a-d* and second radiator 118*a-d*. For instance, first radiator A 108*a* of first element A 104*a* may be an approximately planar structure and second radiator A 118*a* of first element A 104*a* may be an approximately planar structure. Radiators may have similar or different sizes (e.g., dimensions). In some examples, one or more of the radiators described herein may have dimension(s) (e.g., x and/or y dimensions) between $\lambda_g/2$ and $\lambda_g/3$ relative to one or more supported bands, where $\lambda_g$ is a wavelength of a supported band in a dielectric substrate of the antenna. In some examples, one or more of the radiators described herein may work with a relatively large bandwidth (e.g., 6 GHz or greater) by disposing the patches further away from ground (e.g., from a bottom of an element, from a base, etc.) and/or by stacking one or more parasitic radiators (e.g., patches). In the example of FIG. 1, first radiator A 108*a* is larger than second radiator A 118*a* in x and y dimensions. In some configurations, an element or elements (e.g., the first elements 104*a-d*) may include a stack of metallic patches. In this example, first radiator A 108*a* is below (e.g., stacked with) second radiator A 118*a* in the z dimension. For instance, first radiator A 108*a* and second radiator A 118*a* may overlap in x and y dimensions. In some configurations, a lower radiator (e.g., first radiator A 108*a*) may include holes to permit feeds (e.g., third feed A 112*a* and/or fourth feed A 116*a*) to pass to an upper radiator (e.g., second radiator A 118*a*). In some examples, respective metallic patches may support respective sets of bands. For instance, first radiator A 108*a* and second radiator A 118*a* may support respective bands and/or respective sets of bands (e.g., first radiator A 108*a* may support a set of bands lower in frequency, and second radiator A 118*a* may support a set of bands higher in frequency). In some examples, all bands supported by one or more of the antennas described herein may be greater than 23 GHz in frequency and/or may be in a mmWave frequency range. For instance, all bands supported by the antenna 102 may be greater than 23 GHz in frequency and/or may be in a mmWave frequency range.

As used herein, the term "connect" and variations thereof may mean a contacting electrical connection. As used herein, the term "couple" and variations thereof may mean an electromagnetic coupling (e.g., capacitive and/or non-contacting coupling). In some examples, one or more of the feeds described herein may be direct feeds, where the feeds are connected to the radiators. In some examples, one or more of the feeds described herein may be couple-fed, where the feeds are coupled to (e.g., capacitively coupled to and/or non-contacting with) the radiators. In some examples, one or more of the feeds described here may be slot-fed. A variety of feed structures may be implemented in various examples of the antennas described herein.

First radiator A 108*a* may be connected to and/or coupled to first feed A 110*a* and second feed A 114*a*. Second radiator A 118*a* may be connected to and/or coupled to third feed A 112*a* and fourth feed A 116*a*. First elements B-D 104*b-d* may each include respective first radiators B-D 108*b-d* connected to and/or coupled to respective first feeds B-D 110*b-d* and respective second feeds B-D 114*b-d*. First elements B-D 104*b-d* may each include respective second radiators B-D 118*b-d* connected to and/or coupled to respective third feeds B-D 112*b-d* and respective fourth feeds B-D 116*b-d*. A feed may be a coupling (e.g., wire, connection, etc.) between a transceiver (e.g., transmitter, receiver, and/or a radio frequency integrated circuit (RFIC)) and a radiator. In some configurations, each feed may correspond to a polarization. For instance, first feed A 110*a* may correspond to a polarization (e.g., horizontal polarization, +45 degree polarization, etc.) and second feed A 114*a* may correspond to another polarization (e.g., vertical polarization, −45 degree polarization, etc.) (for a first band or first set of bands, for example). Third feed A 112*a* may correspond to a polarization (e.g., vertical polarization, −45 degree polarization, etc.) and fourth feed A 116*a* may correspond to another polarization (e.g., horizontal polarization, +45 degree polarization, etc.) (for a second band or second set of bands, for example). For instance, some elements (e.g., first elements 104*a-d*) may each have four feeds with two polarizations. An element may be dual polarized when the element is connected to and/or coupled to feeds for two polarizations. For instance, each of the first elements 104*a-d* may be dual polarized. In some examples, different elements may have opposite feed placement. For instance, first elements C-D 104*c-d* may have opposite (e.g., mirrored) feed placement relative to first elements A-B 104*a-b*.

In the example of FIG. 1, each of the first elements 104*a-d* includes four feeds. For instance, two of the feeds may be utilized for the first set of bands (e.g., to transmit and/or receive on the first set of bands) and the other two of the feeds may be utilized for the second set of bands (e.g., to transmit and/or to receive on the second set of bands). In some examples, one or more elements may include two feeds (e.g., one or more elements that support multiple sets of bands may include only two feeds). For instance, one or more of the first elements 104*a-d* may instead include only two feeds. Each of the two feeds may correspond to a different polarization and/or signals on the first set of bands may be multiplexed with signals on the second set of bands for each of the polarizations.

In this example, each of the second elements 106*a-c* may include a respective radiator 120*a-c*. For instance, radiator A 120*a* of second element A 106*a* may be an approximately planar structure. In this example, radiator A 120*a* of second element A 106*a* may have a similar size in x and y dimensions as second radiator A 118*a* of first element A 104*a*. In some examples, radiators in different elements may be at a same height or different heights in the z dimension. For instance, radiator A 120*a* of second element A 106*a* may be at a different height than first radiator A 108*a* and/or second radiator A 118*a* of first element A 104*a*.

Radiator A 120*a* may be connected to and/or coupled to first feed A 122*a* and second feed A 124*a* of second element A 106*a*. Second elements B-C 106*b-c* may each include respective radiators B-C 120*b-c* connected to and/or coupled to respective first feeds B-C 122*b-c* and respective second feeds B-C 124*b-c*. First feed A 122*a* of second element A 106*a* may correspond to a polarization (e.g., horizontal polarization, +45 degree polarization, etc.) and second feed A 124*a* may correspond to another polarization (e.g., vertical polarization, −45 degree polarization, etc.) (for a second band or second set of bands, for example). For instance, some elements (e.g., second elements 106*a-c*) may each have two feeds with two polarizations. In some examples, the antenna 102 array may have two polarizations (e.g., horizontal and vertical polarizations, ±45 degree polarizations, etc.). Each of the second elements 106*a-c* may be dual polarized. In some examples, different elements may have similar feed placement. For instance, second elements A-C 106*a-c* may have similar feed placements.

In some examples, one or more elements may include material. For instance, one or more radiators of an element may be embedded within material (e.g., support material, dielectric material, etc.). For instance, first element A 104*a* may include first radiator A 108*a* and/or second radiator A 118*a* embedded in material (e.g., support material and/or dielectric material). In some examples, the material for each element (e.g., each first element 104*a-d* and each second element 106*a-c*) may be separate. For instance, the material (e.g., support material and/or dielectric material) of first element A 104*a* may be distanced from the material (e.g., support material and/or dielectric material) of second element A 106*a*. In some examples, each of the first elements 104*a-d* may be implemented as and/or included in a separate PCB.

The second elements 106*a-c* may be interleaved with the first elements 104*a-d*. For example, the first elements 104*a-d* may alternate with the second elements 106*a-c* along a dimension (e.g., x dimension) of the antenna array. In some configurations, one or more of the first elements 104*a-d* may have a larger dimension than one or more of the second elements 106*a-c*. For instance, first element A 104*a* may have a larger size in the x dimension than second element A 106*a*. In some examples, each of the second elements 106*a-c* may be implemented as and/or included in a separate PCB. In other examples, all of the elements of the antenna 102 may be included on or in a single PCB or substrate, and/or packaged together in a module. While not explicitly described below, other example antennas referenced herein may also be similarly configured in some implementations.

In some configurations, each of the first elements 104*a-d* and second elements 106*a-c* may be positioned on a base 126. The base 126 may be attached to (e.g., coupled to) and/or may support the first elements 104*a-d* and second elements 106*a-c*. In some examples, the base 126 may be a PCB. For instance, the first elements 104*a-d* and second elements 106*a-c* may be PCBs (e.g., individual PCBs, separate PCBs, etc.) that are assembled on the base (e.g., a larger PCB or other substrate). For example, one or more of the first elements 104*a-d* and/or second elements 106*a-c* (e.g., PCB(s)) may be soldered to (e.g., into) the base 126 (e.g., a larger PCB). In some configurations, one or more substrates of the first elements 104*a-d*, the second elements 106*a-c*, and/or the base 126 may be similar or vary. In some examples, the substrate(s) of the first elements 104*a*-d, the second elements 106*a-c*, and/or the base 126 may include one or more dielectric materials. In some configurations, one or more substrates may include resin with reinforcing material (e.g., fiberglass, paper, etc.). In some examples, the base 126 (e.g., PCB) may include one or more metal layers (with supporting material(s) and/or dielectric material(s)). In some configurations, the base 126 may route signals from one or more of the first elements 104*a-d* and/or second elements 106*a-c* to one or more transceivers (which may be situated on an opposite side of the base 126 (e.g., PCB), for instance). In some examples, each of the first elements 104*a-d* and/or second elements 106*a-c* may be implemented as and/or included in a respective PCB that is assembled, soldered, and/or surface mounted on the base 126 (e.g., a larger PCB). In some examples, the first elements 104*a-d* and/or the second elements 106*a-c* may be implemented in a single PCB that is mounted into the base 126 (e.g., a larger PCB). In some examples, at least two of the PCBs of the elements (e.g., first elements 104*a-d* and second elements 106*a-c*) may be different heights. In some examples, the antenna 102 array may be implemented in a single (e.g., monolithic) PCB. For instance, all elements of an antenna described herein may be on a same PCB. In some examples, one or more of the bases described herein (e.g., base 126) may be an active PCB with an approximate height of 0.4 mm.

In some configurations, each of the first elements 104*a-d* may be configured to support a first set of bands and a second set of bands. Supporting a band or bands may mean that an element may be configured to transmit and/or receive one or more signals within the band or bands. For instance, one or more signals within a supported band may be provided and/or routed to an element that supports the band. For example, a transmitter may provide one or more signals within the band to the one or more elements that support the band via one or more corresponding feeds. Additionally or alternatively, one or more signals within the band that are received by the elements that support the band may be provided to a receiver via one or more corresponding feeds. In some examples, an element may support a band if the element meets a performance criterion or criteria (e.g., maximum return loss and/or minimum gain). For instance, an element may support a band (e.g., n259, n260, n262, and/or a band greater than 29.5 GHz, etc.) if the element provides less than or equal to a maximum −10 decibel (dB) return loss and/or greater than or equal to a minimum gain of 2 decibels relative to an isotropic antenna (dBi). In some examples, an element may support a band (e.g., a band between 24.25-29.5 GHz, n257, n258, and/or n261, etc.) if the element provides less than or equal to a maximum −7.5 dB return loss and/or greater than or equal to a minimum gain of approximately 2 dBi. While examples of performance criteria are given relative to elements, an antenna array gain may be significantly higher in some examples.

In some configurations, the second set of bands may be mutually exclusive from the first set of bands. For instance, none of the bands in the first set of bands may be included in the second set of bands and/or none of the bands in the second set of bands may be included in the first set of bands.

In some configurations, each of the second elements 106*a-c* may be configured to support the second set of bands. For instance, each of the second elements 106*a-c* may support the second set of bands that is also supported by the first elements 104*a-d*. In some examples, each of the second elements 106*a-c* may not support the first set of bands (e.g., may not transmit signals within the first set of bands and/or may not be utilized to receive signals within the first set of bands).

In some configurations, the first set of bands is lower in frequency than the second set of bands. For example, each band in the first set of bands may be in a lower frequency range than any band in the second set of bands.

In some configurations, a first element spacing for the first set of bands may be greater than a second element spacing for the second set of bands. For example, the first set of bands may be supported by the first elements 104*a-d* and may not be supported by the second set of elements 106*a-c*. Accordingly, the first element spacing for the first set of bands may be a distance between a center of first element A 104*a* and a center of first element B 104*b*. The second set of bands may be supported by each of the first elements 104*a-d* and the second elements 106*a-c*. Accordingly, the second element spacing for the second set of bands may be a distance between a center of first element A 104*a* and a center of second element A 106*a*.

Figure 2A:
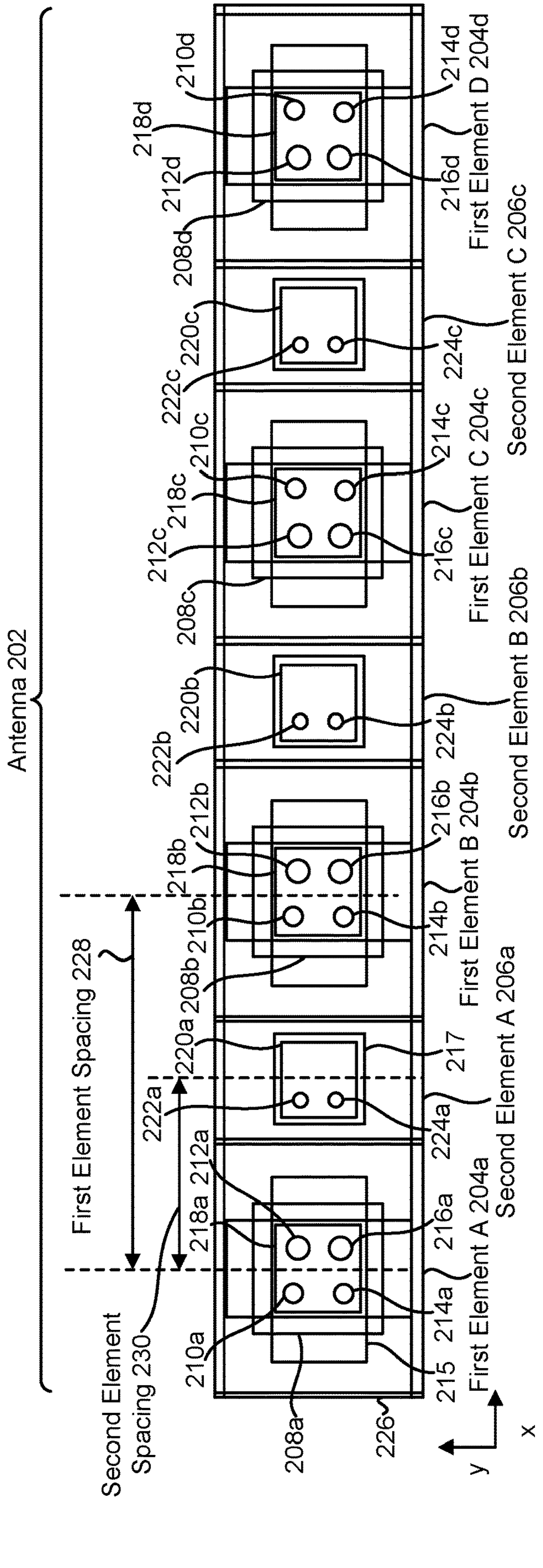
FIG. 2A is a diagram illustrating a top view of a more specific example of an antenna in accordance with some of the configurations described herein.
Figure 2B:
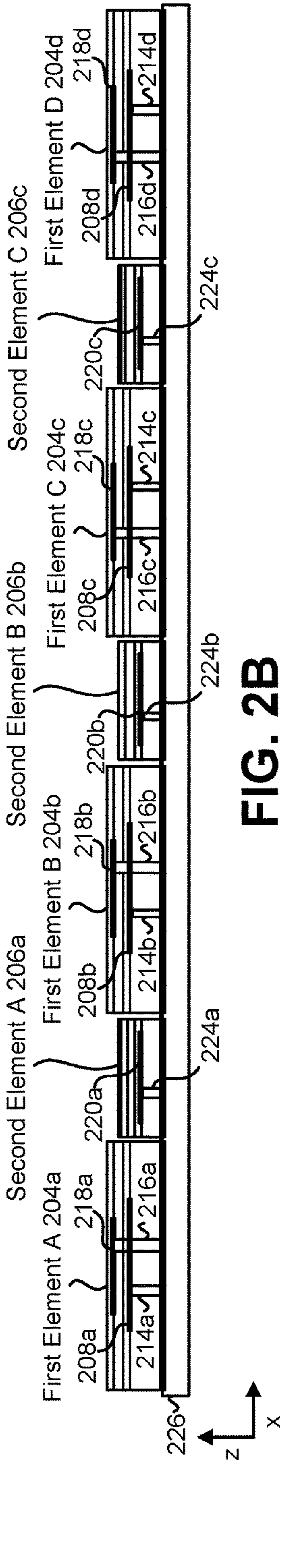
FIG. 2B is a diagram illustrating an elevation view of the antenna of FIG. 2A.

FIG. 2A is a diagram illustrating a top view of a more specific example of an antenna 202 in accordance with some of the configurations described herein. FIG. 2B is a diagram illustrating an elevation view of the antenna 202 of FIG. 2A. FIG. 2A and FIG. 2B will be described together. The antenna 202 and/or one or more components of the antenna 202 may be examples of corresponding components described in relation to FIG. 1A and/or FIG. 1B. The antenna 202 illustrated in FIG. 2A and FIG. 2B is an example of a multiband dual polarization aperture-shared interleaved antenna.

The antenna 202 may include a first plurality of first elements 204*a-d* and a second plurality of second elements 206*a-c*. In this example, four first elements 204*a-d* and three second elements 206*a-c* are illustrated.

In this example, each of the first elements 204*a-d* may include a respective first radiator 208*a-d* and second radiator 218*a-d*. In this example, first radiator A 208*a* is larger than second radiator A 218*a* in x and y dimensions. In this example, first radiator A 208*a* is below (e.g., stacked with) second radiator A 218*a* in the z dimension. In some examples, one or more of the elements described herein may include one or more additional radiators. For instance, first element A 204*a* may include five additional radiators (e.g., four off-center rectangular radiators and a centered rectangular radiator) on a top layer of first element A 204*a*. For example, a parasitic radiator 215 may be a metallic patch of first element A 204*a*.

First radiator A 208*a* may be connected to and/or coupled to first feed A 210*a* and second feed A 214*a*. Second radiator A 218*a* may be connected to and/or coupled to third feed A 212*a* and fourth feed 216*a*. First elements B-D 204*b-d* may each include respective first radiators B-D 208*b-d* connected to and/or coupled to respective first feeds B-D 210*b-d* and respective second feeds B-D 214*b-d*. First elements B-D 204*b-d* may each include respective second radiators B-D 218*b-d* connected to and/or coupled to respective third feeds B-D 212*b-d* and respective fourth feeds B-D 216*b-d*. First feed A 210*a* may correspond to a first polarization and second feed A 214*a* may correspond to a second polarization (for a first band or first set of bands, for example). Third feed A 212*a* may correspond to a second polarization and fourth feed A 216*a* may correspond to a first polarization (for a second band or second set of bands, for example). Each of the first elements 204*a-d* may be dual polarized. In some examples, first elements C-D 204*c-d* may have opposite (e.g., mirrored) feed placement relative to first elements A-B 204*a-b*.

In some examples (e.g., some examples described herein), a first polarization may be a horizontal polarization, vertical polarization, +45 degree polarization, −45 degree polarization, or other polarization. In some examples, a second polarization may be a vertical polarization, horizontal polarization, −45 degree polarization, +45 degree polarization, or other polarization. In some examples, a first polarization may be complementary to (e.g., approximately 90 degrees offset from) a second polarization. In some examples, polarization pairs (e.g., first and second polarizations) between bands and/or elements may be the same or different types (e.g., pairs) of polarizations.

In this example, each of the second elements 206*a-c* may include a respective radiator 220*a-c*. In this example, radiator A 220*a* of second element A 206*a* may have a similar size in x and y dimensions as second radiator A 218*a* of first element A 204*a*. Radiator A 220*a* of second element A 206*a* may be at a different height than first radiator A 208*a* and/or second radiator A 218*a* of first element A 204*a*. As described above, one or more of the elements described herein may include one or more additional radiators in some examples. For instance, second element A 206*a* may include two radiators, including a radiator 217 on a top layer of second element A 206*a* (e.g., centered over radiator A 220*a*).

Radiator A 220*a* may be connected to and/or coupled to first feed A 222*a* and second feed A 224*a* of second element A 206*a*. Second elements B-C 206*b-c* may each include respective radiators B-C 220*b-c* connected to and/or coupled to respective first feeds B-C 222*b-c* and respective second feeds B-C 224*b-c*. First feed A 222*a* of second element A 206*a* may correspond to a first polarization and second feed A 224*a* may correspond to a second polarization (for a second band or second set of bands, for example). Each of the second elements 206*a-c* may be dual polarized. Second elements A-C 206*a-c* may have similar feed placements.

First element A 204*a* may include first radiator A 208*a* and/or second radiator A 218*a* embedded in material (e.g., support material and/or dielectric material). The material (e.g., support material and/or dielectric material) of first element A 204*a* may be distanced from the material (e.g., support material and/or dielectric material) of second element A 206*a*.

The second elements 206*a-c* may be interleaved with the first elements 204*a-d*. First element A 204*a* may have a larger size in the x dimension than second element A 206*a*.

Each of the first elements 204*a-d* and second elements 206*a-c* may be positioned on a base 226. In some examples, each of the first elements 204*a-d* and second elements 206*a-c* may be implemented as and/or included in a respective PCB that is assembled, soldered, and/or surface mounted on the base 226 (e.g., a larger PCB). In some examples, the first elements 204*a-d* and the second elements 206*a-c* may be implemented in a single PCB that is mounted into the base 226 (e.g., a larger PCB). In some examples, the antenna 202 array may be implemented in a single (e.g., monolithic) PCB.

In some configurations, each of the first elements 204*a-d* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 37-40 GHz band (e.g., n260), a 39.5-43.5 GHz band (e.g., n259), and/or a 47.2-48.2 GHz band (e.g., 48G band). In this example, the second set of bands may be mutually exclusive from the first set of bands. In this example, the first set of bands is lower in frequency than the second set of bands. In some of the examples described herein, a highest frequency in the first set of bands may be separated from a lowest frequency in the second set of bands by more than 6 GHz.

In some configurations, each of the second elements 206*a-c* may be configured to support the second set of bands. For instance, each of the second elements 206*a-c* may support the second set of bands that is also supported by the first elements 204*a-d*. In some examples, each of the second elements 206*a-c* may not support the first set of bands (e.g., may not transmit signals within the first set of bands and/or may not be utilized to receive signals within the first set of bands). In some examples, a number of elements (e.g., 4) for the first set of bands may be less than a number of elements (e.g., 7) for the second set of bands. For instance, the antenna 202 may provide a 1×4 element array for the first set of bands and may provide a 1×7 element array for the second set of bands.

In this example, a first element spacing 228 (e.g., 6.4 millimeters (mm)) for the first set of bands may be greater than a second element spacing 230 (e.g., 3.2 mm) for the second set of bands. For example, the first set of bands may be supported by the first elements 204*a-d* and may not be supported by the second set of elements 206*a-c*. Accordingly, the first element spacing 228 for the first set of bands may be a distance between a center of first element A 204*a* and a center of first element B 204*b*. The second set of bands may be supported by each of the first elements 204*a-d* and the second elements 206*a-c*. Accordingly, the second element spacing 230 for the second set of bands may be a distance between a center of first element A 204*a* and a center of second element A 206*a*.

In this example, the first elements 204*a-d* (for the first set of bands and the second set of bands) and the second elements 206*a-c* (for the second set of bands) may support multiple bands by aperture sharing. The example of FIG. 2A and FIG. 2B may provide one or more benefits. This example may include an increased number of second band-only elements (e.g., second elements 206*a-c*) for increased gain and effective isotropic radiated power (EIRP) in the second set of bands. Different element spacing for the first set of bands and the second set of bands may provide improved scanning performance. This example may provide a potential path for use in a variety of countries (e.g., globally) with the 48G band.

Figure 3:
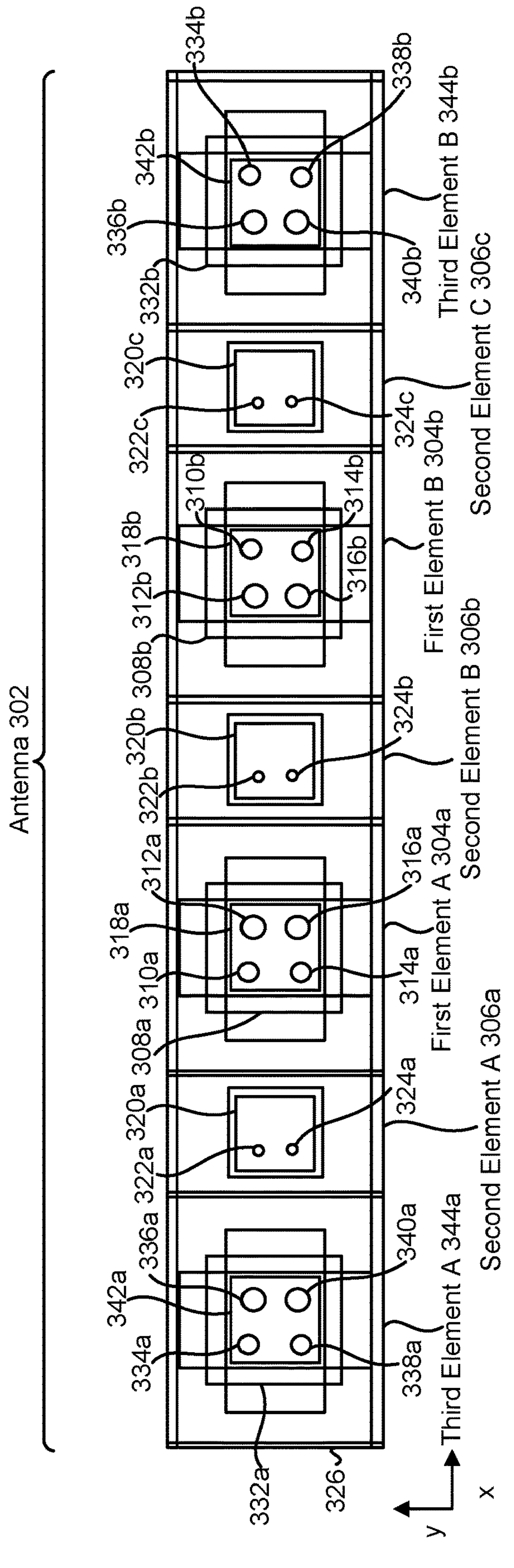
FIG. 3 is a diagram illustrating a top view of another example of an antenna in accordance with some of the configurations described herein.

FIG. 3 is a diagram illustrating a top view of another example of an antenna 302 in accordance with some of the configurations described herein. The antenna 302 and/or one or more components of the antenna 302 may be examples of corresponding components described in relation to FIG. 1A and/or FIG. 1B. The antenna 302 illustrated in FIG. 3 is an example of a multiband dual polarization aperture-shared interleaved antenna.

The antenna 302 may include a first plurality of first elements 304*a-b*, a second plurality of second elements 306*a-c*, and a third plurality of third elements 344*a-b*. In this example, two first elements 304*a-b*, three second elements 306*a-c*, and two third elements 344*a-b* are illustrated.

In this example, each of the first elements 304*a-b* may include a respective first radiator 308*a-b* and second radiator 318*a-b*. In this example, first radiator A 308*a* is larger than second radiator A 318*a* in x and y dimensions. In this example, first radiator A 308*a* is below (e.g., stacked with) second radiator A 318*a* in the z dimension.

First radiator A 308*a* may be connected to and/or coupled to first feed A 310*a* and second feed A 314*a*. Second radiator A 318*a* may be connected to and/or coupled to third feed A 312*a* and fourth feed 316*a*. First element B 304*b* may include a respective first radiator B 308*b* connected to and/or coupled to respective first feed B 310*b* and respective second feed B 314*b*. First element B 304*b* may include respective second radiator B 318*b* connected to and/or coupled to respective third feed B 312*b* and respective fourth feed B 316*b*. First feed A 310*a* may correspond to a first polarization and second feed A 314*a* may correspond to a second polarization. Third feed A 312*a* may correspond to a second polarization and fourth feed A 316*a* may correspond to a first polarization. Each of the first elements 304*a-b* may be dual polarized. In some examples, first element B 304*b* may have opposite (e.g., mirrored) feed placement relative to first element A 304*a*.

In this example, each of the second elements 306*a-c* may include a respective radiator 320*a-c*. In this example, radiator A 320*a* of second element A 306*a* may have a similar size in x and y dimensions as second radiator A 318*a* of first element A 304*a*. Radiator A 320*a* of second element A 306*a* may be at a different height than first radiator A 308*a* and/or second radiator A 318*a* of first element A 304*a*.

Radiator A 320*a* may be connected to and/or coupled to first feed A 322*a* and second feed A 324*a* of second element A 306*a*. Second elements B-C 306*b-c* may each include respective radiators B-C 320*b-c* connected to and/or coupled to respective first feeds B-C 322*b-c* and respective second feeds B-C 324*b-c*. First feed A 322*a* of second element A 306*a* may correspond to a first polarization and second feed A 324*a* may correspond to a second polarization. Each of the second elements 306*a-c* may be dual polarized. Second elements A-C 306*a-c* may have similar feed placements.

In this example, each of the third elements 344*a-b* may include a respective first radiator 332*a-b* and second radiator 342*a-b*. In this example, first radiator A 332*a* is larger than second radiator A 342*a* in x and y dimensions. In this example, first radiator A 332*a* is below (e.g., stacked with) second radiator A 342*a* in the z dimension.

First radiator A 332*a* may be connected to and/or coupled to first feed A 334*a* and second feed A 338*a*. Second radiator A 342*a* may be connected to and/or coupled to third feed A 336*a* and fourth feed 340*a*. Third element B 344*b* may include a respective first radiator B 332*b* connected to and/or coupled to respective first feed B 334*b* and respective second feed B 338*b*. Third element B 344*b* may include respective second radiator B 342*b* connected to and/or coupled to respective third feed B 336*b* and respective fourth feed B 340*b*. First feed A 334*a* may correspond to a first polarization and second feed A 338*a* may correspond to a second polarization. Third feed A 336*a* may correspond to a second polarization and fourth feed A 340*a* may correspond to a first polarization. Each of the third elements 344*a-b* may be dual polarized. In some examples, third element B 344*b* may have opposite (e.g., mirrored) feed placement relative to third element A 344*a*. In the example of FIG. 3, each third element 344*a* includes four feeds. In some examples, one or more third elements may include two feeds.

First element A 304*a* may include first radiator A 308*a* and/or second radiator A 318*a* embedded in material (e.g., support material and/or dielectric material). The material (e.g., support material and/or dielectric material) of first element A 304*a* may be distanced from the material (e.g., support material and/or dielectric material) of second element A 306*a*. The material (e.g., support material and/or dielectric material) of third element A 344*a* may be distanced from the material (e.g., support material and/or dielectric material) of second element A 306*a*.

The second elements 306*a-c* may be interleaved with the first elements 304*a-d*. First element A 304*a* may have a larger size in the x dimension than second element A 306*a*. Third element A 344*a* may have a larger size in the x dimension than second element A 306*a*. First element A 304*a* may have a similar size in the x dimension to third element A 344*a*. The third elements 344*a-b* may be end elements in the antenna 302.

Each of the first elements 304*a-b*, second elements 306*a-c*, and third elements 344*a-b* may be positioned on a base 326. In some examples, each of the first elements 304*a-b*, second elements 306*a-c*, and/or third elements 344*a-b* may be implemented as and/or included in a respective PCB that is assembled, soldered, and/or surface mounted on the base 326 (e.g., a larger PCB). In some examples, the first elements 304*a-b*, the second elements 306*a-c*, and/or the third elements 344*a-b* may be implemented in a single PCB that is mounted into the base 326 (e.g., a larger PCB). In some examples, the antenna 302 array may be implemented in a single (e.g., monolithic) PCB.

In some configurations, each of the first elements 304*a-b* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 47.2-48.2 GHz band (e.g., 48G band) and a 37-40 GHz band (e.g., n260). In some examples, one or more third bands may be supported by one or more third elements (e.g., third elements 344*a-b*). For instance, a third set of bands may include a 47.2-48.2 GHz band (e.g., 48G band) and a 39.5-43.5 GHz band (e.g., n259). The third set of bands may overlap with the second set of bands. For instance, the second set of bands and the third set of bands may include the 48G band. In this example, the second set of bands may be mutually exclusive from the first set of bands. In this example, the first set of bands is lower in frequency than the second set of bands and than the third set of bands.

In some configurations, each of the second elements 306*a-c* may be configured to support the second set of bands (e.g., 48G and n260) and the third set of bands (e.g., 48G and n259). For example, each of the second elements 306*a-c* may support the union of the second set of bands and the third set of bands. For instance, each of the second elements 306*a-c* may support the second set of bands that is also supported by the first elements 304*a-b* and the third set of bands that is also supported by the third elements 344*a-b*. In some examples, each of the second elements 306*a-c* may not support the first set of bands (e.g., may not transmit signals within the first set of bands and/or may not be utilized to receive signals within the first set of bands).

In some configurations, each of the third elements 344*a-b* may be configured to support the first set of bands (e.g., n258, n257, and n261) and one or more third bands (e.g., third set of bands (e.g., 48G and n259)). For instance, the antenna 302 may provide a 1×4 element array for the first set of bands, may provide a 1×5 array for n259 and n260 bands, and may provide a 1×7 element array for the 48G band. The third elements 344*a-b* may be separated by multiple (e.g., 3) of the second elements 306*a-c* and/or by multiple (e.g., 2) of the first elements 304*a-b*. In some examples, the antenna 302 may include a non-uniform (e.g., uneven) element spacing for a band. For instance, when the n259 band is being transmitted, third elements 344*a-b* and second elements 306*a-c* may be active, while first elements 304*a-b* may be inactive, creating a larger spacing between second elements A-B 306*a-b* than between third element A 344*a* and second element A 306.

The example of FIG. 3 may provide one or more benefits. This example may reduce implementation complexity for the first elements 304*a-b* and third elements 344*a-b* (which may cover a combination of relatively lower and higher bands). For instance, the first elements 304*a-b* and/or third elements 344*a-b* may not support all bands, which may help in maintaining performance in relatively lower bands (e.g., first set of bands).

In some examples, an antenna (e.g., antenna 302) may include a third plurality of third elements (e.g., third elements 344*a-b*), where each of the third elements is dual polarized and configured to support a first set of bands (e.g., 24.25-27.5 GHz band (e.g., n258), 26.5-29.5 GHz band (e.g., n257), and/or 27.5-28.35 GHz band (e.g., n261)). In some examples, an antenna (e.g., antenna 302) may include a third plurality of third elements (e.g., third elements 344*a-b*), where each of the third elements is dual polarized and configured to support only a first set of bands (e.g., 24.25-27.5 GHz band (e.g., n258), 26.5-29.5 GHz band (e.g., n257), and/or 27.5-28.35 GHz band (e.g., n261)). For instance, the example of FIG. 3 may be varied such that the third elements 344*a-b* may only have two feed points (e.g., two feeds 336*a*, 340*a* for third element A 344*a* and two feeds 336*b*, 340*b* for third element B 344*b*) to support the first set of bands. For instance, some feeds (e.g., feeds 334*a*, 338*a*, 334*b*, 338*b*) may be omitted in some examples.

Figure 4:
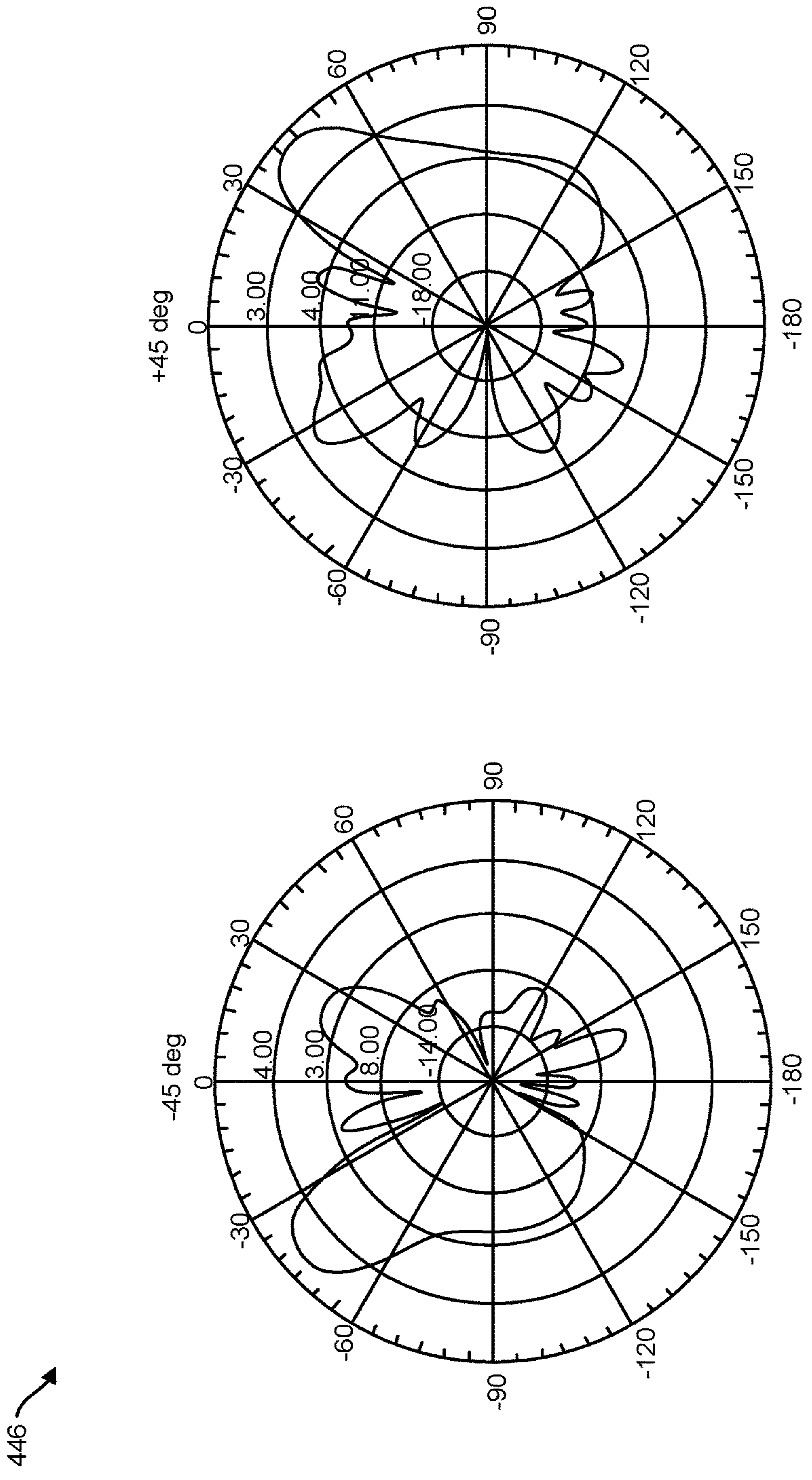
FIG. 4 is a diagram illustrating examples of scanning performance for a band.

FIG. 4 is a diagram illustrating examples of scanning performance for a band. For instance, FIG. 4 illustrates plots 446 of gain relative to angle for the n259 band for the example of the antenna 302 described in relation to FIG. 3. As illustrated in FIG. 4, the scanning performance for the n259 band was good even with the uneven spacing caused by the arrangement of the antenna 302 described in relation to FIG. 3. The plots 446 illustrate gain for ±45 degree scanning angles for the n259 band. For instance, the 1×5 array may produce magnitude (in decibels (dB)) over angle for an excitation at 43.5 GHz (for the n259 band). For instance, the excitation for the elements (left to right) of the antenna described in relation to FIG. 3 may be performed in accordance with the expression: [1(0), 1(120), 0, 1(3*120), 0, 1(5*120), 1(6*120)], where the first term indicates a magnitude of excitation, and the number in parentheses indicates the phase of the excitation at each element for one of the polarizations.

Figure 5:
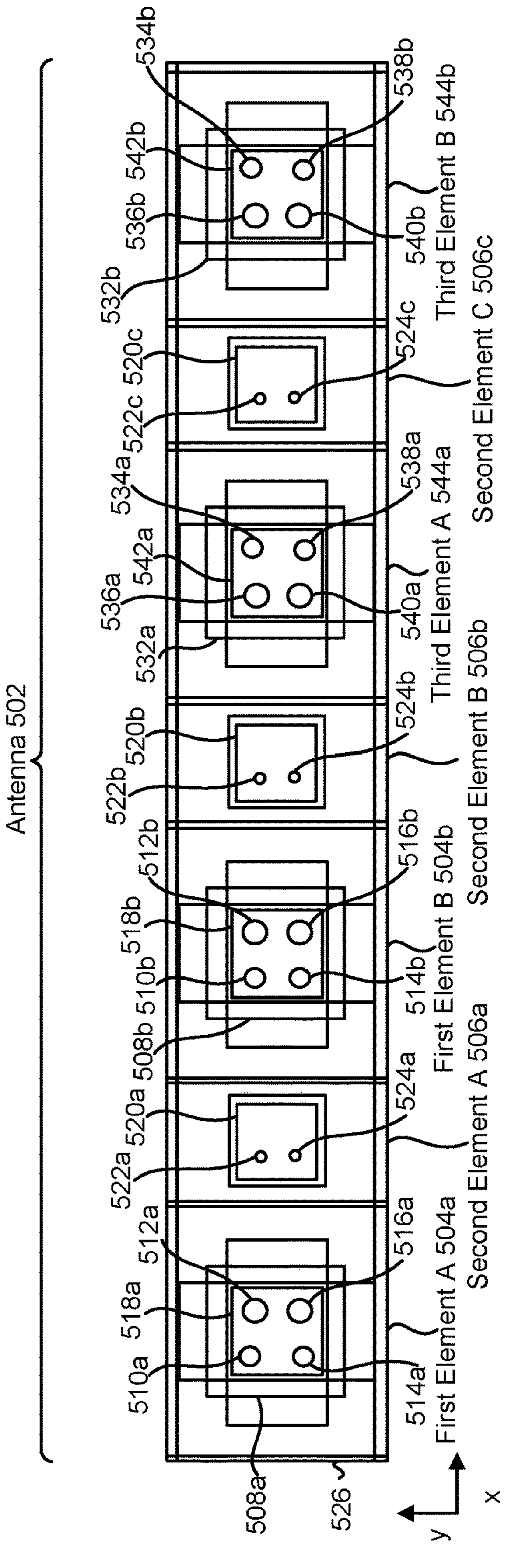
FIG. 5 is a diagram illustrating a top view of another example of an antenna in accordance with some of the configurations described herein.

FIG. 5 is a diagram illustrating a top view of another example of an antenna 502 in accordance with some of the configurations described herein. The antenna 502 and/or one or more components of the antenna 502 may be examples of corresponding components described in relation to FIG. 1A and/or FIG. 1B. The antenna 502 illustrated in FIG. 5 is an example of a multiband dual polarization aperture-shared interleaved antenna.

The antenna 502 may include a first plurality of first elements 504*a-b*, a second plurality of second elements 506*a-c*, and a third plurality of third elements 544*a-b*. In this example, two first elements 504*a-b*, three second elements 506*a-c*, and two third elements 544*a-b* are illustrated.

In this example, each of the first elements 504*a-b* may include a respective first radiator 508*a-b* and second radiator 518*a-b*. In this example, first radiator A 508*a* is larger than second radiator A 518*a* in x and y dimensions. In this example, first radiator A 508*a* is below (e.g., stacked with) second radiator A 518*a* in the z dimension.

First radiator A 508*a* may be connected to and/or coupled to first feed A 510*a* and second feed A 514*a*. Second radiator A 518*a* may be connected to and/or coupled to third feed A 512*a* and fourth feed 516*a*. First element B 504*b* may include a respective first radiator B 508*b* connected to and/or coupled to respective first feed B 510*b* and respective second feed B 514*b*. First element B 504*b* may include respective second radiator B 518*b* connected to and/or coupled to respective third feed B 512*b* and respective fourth feed B 516*b*. First feed A 510*a* may correspond to a first polarization and second feed A 514*a* may correspond to a second polarization. Third feed A 512*a* may correspond to a second polarization and fourth feed A 516*a* may correspond to a first polarization. Each of the first elements 504*a-b* may be dual polarized. In some examples, first element B 504*b* may have opposite (e.g., mirrored) feed placement relative to third element A 544*a*.

In this example, each of the second elements 506*a-c* may include a respective radiator 520*a-c*. In this example, radiator A 520*a* of second element A 506*a* may have a similar size in x and y dimensions as second radiator A 518*a* of first element A 504*a*. Radiator A 520*a* of second element A 506*a* may be at a different height than first radiator A 508*a* and/or second radiator A 518*a* of first element A 504*a*.

Radiator A 520*a* may be connected to and/or coupled to first feed A 522*a* and second feed A 524*a* of second element A 506*a*. Second elements B-C 506*b-c* may each include respective radiators B-C 520*b-c* connected to and/or coupled to respective first feeds B-C 522*b-c* and respective second feeds B-C 524*b-c*. First feed A 522*a* of second element A 506*a* may correspond to a first polarization and second feed A 524*a* may correspond to a second polarization. Each of the second elements 506*a-c* may be dual polarized. Second elements A-C 506*a-c* may have similar feed placements.

In this example, each of the third elements 544*a-b* may include a respective first radiator 532*a-b* and second radiator 542*a-b*. In this example, first radiator A 532*a* is larger than second radiator A 542*a* in x and y dimensions. In this example, first radiator A 532*a* is below (e.g., stacked with) second radiator A 542*a* in the z dimension.

First radiator A 532*a* may be connected to and/or coupled to first feed A 534*a* and second feed A 538*a*. Second radiator A 542*a* may be connected to and/or coupled to third feed A 536*a* and fourth feed 540*a*. Third element B 544*b* may include a respective first radiator B 532*b* connected to and/or coupled to respective first feed B 534*b* and respective second feed B 538*b*. Third element B 544*b* may include respective second radiator B 542*b* connected to and/or coupled to respective third feed B 536*b* and respective fourth feed B 540*b*. First feed A 534*a* may correspond to a first polarization and second feed A 538*a* may correspond to a second polarization. Third feed A 536*a* may correspond to a second polarization and fourth feed A 540*a* may correspond to a first polarization. Each of the third elements 544*a-b* may be dual polarized. In some examples, third element B 544*b* may have opposite (e.g., mirrored) feed placement relative to first element A 504*a*.

First element A 504*a* may include first radiator A 508*a* and/or second radiator A 518*a* embedded in material (e.g., support material and/or dielectric material). The material (e.g., support material and/or dielectric material) of first element A 504*a* may be distanced from the material (e.g., support material and/or dielectric material) of second element A 506*a*. The material (e.g., support material and/or dielectric material) of third element A 544*a* may be distanced from the material (e.g., support material and/or dielectric material) of second element C 506*c*. In some examples, the third elements 544*a-b* may be separated by second element C 506*c*.

The first elements 504*a-b* may be interleaved with second element A 506*a*. The third elements 544*a-b* may be interleaved with second element C 506*c*. First element A 504*a* may have a larger size in the x dimension than second element A 506*a*. Third element A 544*a* may have a larger size in the x dimension than second element A 506*a*. First element A 504*a* may have a similar size in the x dimension to third element A 544*a*.

Each of the first elements 504*a-b*, second elements 506*a-c*, and third elements 544*a-b* may be positioned on a base 526. In some examples, each of the first elements 504*a-b*, second elements 506*a-c*, and/or third elements 544*a-b* may be implemented as and/or included in a respective PCB that is assembled, soldered, and/or surface mounted on the base 526 (e.g., a larger PCB). In some examples, the first elements 504*a-b*, the second elements 506*a-c*, and/or the third elements 544*a-b* may be implemented in a single PCB that is mounted into the base 526 (e.g., a larger PCB). In some examples, the antenna 502 array may be implemented in a single (e.g., monolithic) PCB.

In some configurations, each of the first elements 504*a-b* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 47.2-48.2 GHz band (e.g., 48G band) and a 37-40 GHz band (e.g., n260). In this example, a third set of bands includes a 47.2-48.2 GHz band (e.g., 48G band) and a 39.5-43.5 GHz band (e.g., n259). The third set of bands may overlap with the second set of bands. For instance, the second set of bands and the third set of bands may include the 48G band. In this example, the second set of bands may be mutually exclusive from the first set of bands. In this example, the first set of bands is lower in frequency than the second set of bands and than the third set of bands.

In some configurations, each of the second elements 506*a-c* may be configured to support the second set of bands (e.g., 48G and n260) and the third set of bands (e.g., 48G and n259). For example, each of the second elements 506*a-c* may support the union of the second set of bands and the third set of bands. For instance, each of the second elements 506*a-c* may support the second set of bands that is also supported by the first elements 504*a-b* and the third set of bands that is also supported by the third elements 544*a-b*. In some examples, each of the second elements 506*a-c* may not support the first set of bands (e.g., may not transmit signals within the first set of bands and/or may not be utilized to receive signals within the first set of bands).

In some configurations, each of the third elements 544*a-b* may be configured to support the first set of bands (e.g., n258, n257, and n261) and the third set of bands (e.g., 48G and n259). For instance, the antenna 502 may provide a 1×4 element array for the first set of bands, may provide a 1×5 array for n259 and n260 bands, and may provide a 1×7 element array for the 48G band. The third elements 544*a-b* may be separated by second element C 506*c* and/or the first elements 504*a-b* may be separated by second element A 506*a*.

The example of FIG. 5 may provide one or more benefits. This example may reduce implementation complexity for the first elements 504*a-b* and third elements 544*a-b* (which may cover a combination of relatively lower and higher bands). For instance, the first elements 504*a-b* and/or third elements 544*a-b* may not support all bands, which may help in maintaining performance in relatively lower bands (e.g., first set of bands).

Figure 6:
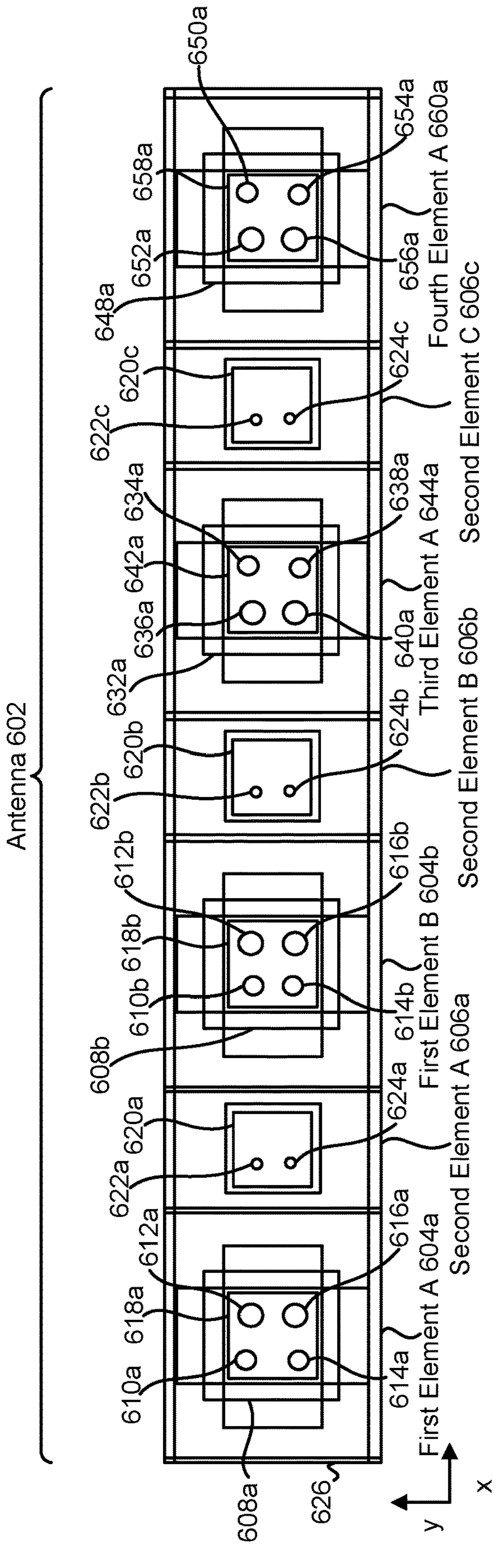
FIG. 6 is a diagram illustrating a top view of another example of an antenna in accordance with some of the configurations described herein.

FIG. 6 is a diagram illustrating a top view of another example of an antenna 602 in accordance with some of the configurations described herein. The antenna 602 and/or one or more components of the antenna 602 may be examples of corresponding components described in relation to FIG. 1A and/or FIG. 1B. The antenna 602 illustrated in FIG. 6 is an example of a multiband dual polarization aperture-shared interleaved antenna.

The antenna 602 may include a first plurality of first elements 604*a-b*, a second plurality of second elements 606*a-c*, a third element 644*a*, and a fourth element 660*a*. In this example, two first elements 604*a-b*, three second elements 606*a-c*, one third element 644*a*, and one fourth element 660*a* are illustrated.

In this example, each of the first elements 604*a-b* may include a respective first radiator 608*a-b* and second radiator 618*a-b*. In this example, first radiator A 608*a* is larger than second radiator A 618*a* in x and y dimensions. In this example, first radiator A 608*a* is below (e.g., stacked with) second radiator A 618*a* in the z dimension.

First radiator A 608*a* may be connected to and/or coupled to first feed A 610*a* and second feed A 614*a*. Second radiator A 618*a* may be connected to and/or coupled to third feed A 612*a* and fourth feed 616*a*. First element B 604*b* may include a respective first radiator B 608*b* connected to and/or coupled to respective first feed B 610*b* and respective second feed B 614*b*. First element B 604*b* may include respective second radiator B 618*b* connected to and/or coupled to respective third feed B 612*b* and respective fourth feed B 616*b*. First feed A 610*a* may correspond to a first polarization and second feed A 614*a* may correspond to a second polarization. Third feed A 612*a* may correspond to a second polarization and fourth feed A 616*a* may correspond to a first polarization. Each of the first elements 604*a-b* may be dual polarized. In some examples, first element B 604*b* may have opposite (e.g., mirrored) feed placement relative to third element A 644*a*.

In this example, each of the second elements 606*a-c* may include a respective radiator 620*a-c*. In this example, radiator A 620*a* of second element A 606*a* may have a similar size in x and y dimensions as second radiator A 618*a* of first element A 604*a*. Radiator A 620*a* of second element A 606*a* may be at a different height than first radiator A 608$a$ and/or second radiator A 618$a$ of first element A 604$a$.

Radiator A 620$a$ may be connected to and/or coupled to first feed A 622$a$ and second feed A 624$a$ of second element A 606$a$. Second elements B-C 606$b$-$c$ may each include respective radiators B-C 620$b$-$c$ connected to and/or coupled to respective first feeds B-C 622$b$-$c$ and respective second feeds B-C 624$b$-$c$. First feed A 622$a$ of second element A 606$a$ may correspond to a first polarization and second feed A 624$a$ may correspond to a second polarization. Each of the second elements 606$a$-$c$ may be dual polarized. Second elements A-C 606$a$-$c$ may have similar feed placements.

In this example, the third element 644$a$ may include a respective first radiator 632$a$ and second radiator 642$a$. In this example, first radiator A 632$a$ is larger than second radiator A 642$a$ in x and y dimensions. In this example, first radiator A 632$a$ is below (e.g., stacked with) second radiator A 642$a$ in the z dimension.

First radiator A 632$a$ may be connected to and/or coupled to first feed A 634$a$ and second feed A 638$a$. Second radiator A 642$a$ may be connected to and/or coupled to third feed A 636$a$ and fourth feed A 640$a$. First feed A 634$a$ may correspond to a first polarization and second feed A 638$a$ may correspond to a second polarization. Third feed A 636$a$ may correspond to a second polarization and fourth feed A 640$a$ may correspond to a first polarization. The third element 644$a$ may be dual polarized. In some examples, third element A 644$a$ may have opposite (e.g., mirrored) feed placement relative to first element B 604$b$.

In this example, the fourth element 660$a$ may include a respective first radiator 648$a$ and second radiator 658$a$. In this example, first radiator A 648$a$ is larger than second radiator A 658$a$ in x and y dimensions. In this example, first radiator A 648$a$ is below (e.g., stacked with) second radiator A 658$a$ in the z dimension.

First radiator A 648$a$ may be connected to and/or coupled to first feed A 650$a$ and second feed A 654$a$. Second radiator A 658$a$ may be connected to and/or coupled to third feed A 652$a$ and fourth feed A 656$a$. First feed A 650$a$ may correspond to a first polarization and second feed A 654$a$ may correspond to a second polarization. Third feed A 652$a$ may correspond to a second polarization and fourth feed A 656$a$ may correspond to a first polarization. The fourth element 660$a$ may be dual polarized. In some examples, the fourth element 660$a$ may have opposite (e.g., mirrored) feed placement relative to first element A 604$a$. In the example of FIG. 6, the fourth element 660$a$ includes four feeds. In some examples, one or more fourth elements may include two feeds.

First element A 604$a$ may include first radiator A 608$a$ and/or second radiator A 618$a$ embedded in material (e.g., support material and/or dielectric material). The material (e.g., support material and/or dielectric material) of first element A 604$a$ may be distanced from the material (e.g., support material and/or dielectric material) of second element A 606$a$. The material (e.g., support material and/or dielectric material) of third element A 644$a$ may be distanced from the material (e.g., support material and/or dielectric material) of second element C 606$c$. In some examples, the third element 644$a$ and fourth element 660$a$ may be separated by second element C 606$c$.

The first elements 604$a$-$b$ may be interleaved with second element A 606$a$. First element A 604$a$ may have a larger size in the x dimension than second element A 606$a$. Third element A 644$a$ may have a larger size in the x dimension than second element A 606$a$. Fourth element A 660$a$ may have a larger size in the x dimension than second element A 606$a$. First element A 604$a$ may have a similar size in the x dimension to third element A 644$a$ and/or fourth element A 660$a$.

Each of the first elements 604$a$-$b$, second elements 606$a$-$c$, third element 644$a$, and fourth element 660$a$ may be positioned on a base 626. In some examples, each of the first elements 604$a$-$b$, second elements 606$a$-$c$, third element 644$a$, and/or fourth element 660$a$ may be implemented as and/or included in a respective PCB that is assembled, soldered, and/or surface mounted on the base 626 (e.g., a larger PCB). In some examples, the first elements 604$a$-$b$, the second elements 606$a$-$c$, third element 644$a$, and/or fourth element 660$a$ may be implemented in a single PCB that is mounted into the base 626 (e.g., a larger PCB). In some examples, the antenna 602 array may be implemented in a single (e.g., monolithic) PCB.

In some configurations, each of the first elements 604$a$-$b$ may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 47.2-48.2 GHz band (e.g., 48G band) and a 37-40 GHz band (e.g., n260). In this example, a third set of bands includes a 47.2-48.2 GHz band (e.g., 48G band) and a 39.5-43.5 GHz band (e.g., n259). The third set of bands may overlap with the second set of bands. For instance, the second set of bands and the third set of bands may include the 48G band. In this example, a fourth set of bands includes a 37-40 GHz band (e.g., n260) and a 39.5-43.5 GHz band (e.g., n259). The fourth set of bands may overlap with the second set of bands and/or the third set of bands. For instance, the second set of bands and the fourth set of bands may include the n260 band. In this example, the second set of bands may be mutually exclusive from the first set of bands. In this example, the first set of bands is lower in frequency than the second set of bands, than the third set of bands, and than the fourth set of bands.

In some configurations, each of the second elements 606$a$-$c$ may be configured to support the second set of bands (e.g., 48G and n260), the third set of bands (e.g., 48G and n259), and the fourth set of bands (e.g., n260 and n259). For example, each of the second elements 606$a$-$c$ may support the union of the second set of bands, the third set of bands, and the fourth set of bands. For instance, each of the second elements 606$a$-$c$ may support the second set of bands that is also supported by the first elements 604$a$-$b$, the third set of bands that is also supported by the third element 644$a$, and the fourth set of bands that is also supported by the fourth element 660$a$. In some examples, each of the second elements 606$a$-$c$ may not support the first set of bands (e.g., may not transmit signals within the first set of bands and/or may not be utilized to receive signals within the first set of bands).

In some configurations, the third element 644$a$ may be configured to support the first set of bands (e.g., n258, n257, and n261) and the third set of bands (e.g., 48G and n259). In some configurations, the fourth element 660$a$ may be configured to support the first set of bands (e.g., n258, n257, and n261) and the fourth set of bands (e.g., n260 and n259). For instance, the antenna 602 may provide a 1×4 element array for the first set of bands, may provide a 1×5 array for n259 band, and may provide a 1×6 element array for the 48G band and n260 band. It should be noted that other implementations are possible with different band combinations.

Figure 7A:
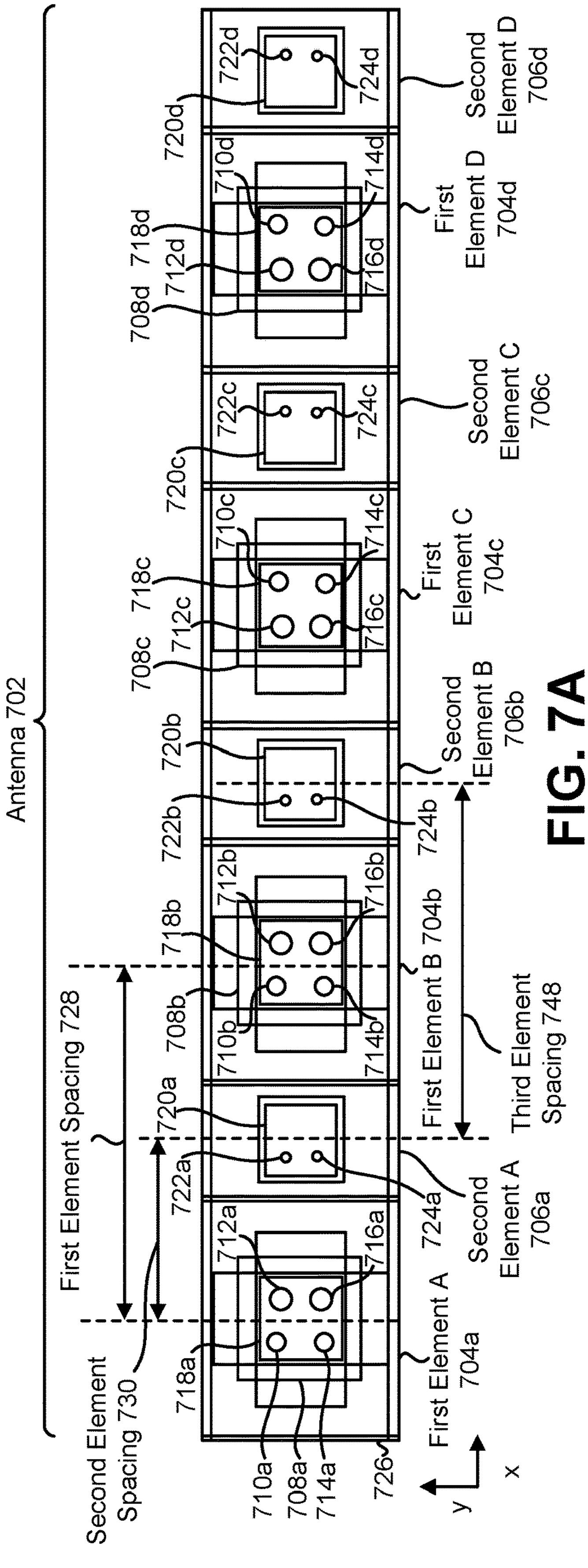
FIG. 7A is a diagram illustrating a top view of another example of an antenna in accordance with some of the configurations described herein.
Figure 7B:
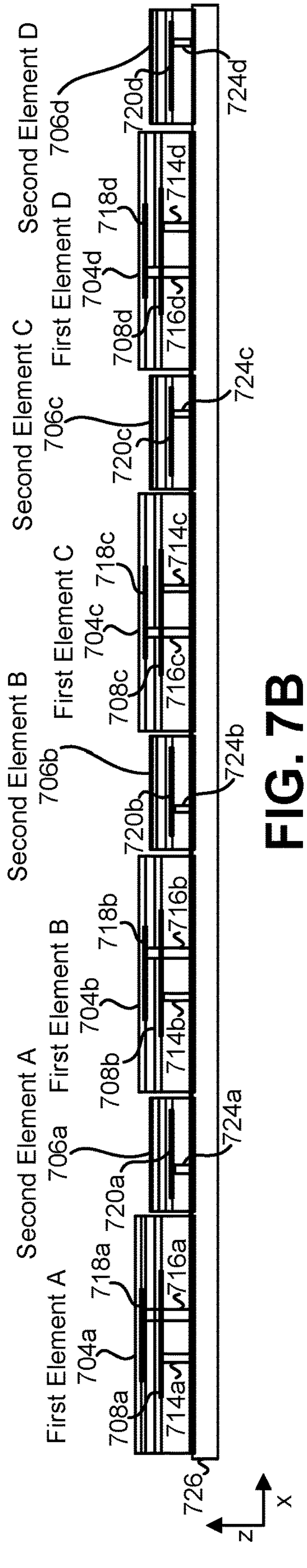
FIG. 7B is a diagram illustrating an elevation view of the antenna of FIG. 7A.

FIG. 7A is a diagram illustrating a top view of another example of an antenna 702 in accordance with some of the configurations described herein. FIG. 7B is a diagram illustrating an elevation view of the antenna 702 of FIG. 7A. FIG. 7A and FIG. 7B will be described together. The antenna 702 and/or one or more components of the antenna 702 may be examples of corresponding components described in relation to FIG. 1A and/or FIG. 1B. The antenna 702 illustrated in FIG. 7A and FIG. 7B is an example of a multiband dual polarization aperture-shared interleaved antenna.

The antenna 702 may include a first plurality of first elements 704*a-d* and a second plurality of second elements 706*a-d*. In this example, four first elements 704*a-d* and four second elements 706*a-d* are illustrated. In this example, the antenna 702 has a width of 26.2 mm and a length of 3.5 mm. Other dimensions may be utilized in other examples.

In this example, each of the first elements 704*a-d* may include a respective first radiator 708*a-d* and second radiator 718*a-d*. In this example, first radiator A 708*a* is larger than second radiator A 718*a* in x and y dimensions. In this example, first radiator A 708*a* is below (e.g., stacked with) second radiator A 718*a* in the z dimension.

First radiator A 708*a* may be connected to and/or coupled to first feed A 710*a* and second feed A 714*a*. Second radiator A 718*a* may be connected to and/or coupled to third feed A 712*a* and fourth feed 716*a*. First elements B-D 704*b-d* may each include respective first radiators B-D 708*b-d* connected to and/or coupled to respective first feeds B-D 710*b-d* and respective second feeds B-D 714*b-d*. First elements B-D 704*b-d* may each include respective second radiators B-D 718*b-d* connected to and/or coupled to respective third feeds B-D 712*b-d* and respective fourth feeds B-D 716*b-d*. First feed A 710*a* may correspond to a first polarization and second feed A 714*a* may correspond to a second polarization (for a first band or first set of bands, for example). Third feed A 712*a* may correspond to a second polarization and fourth feed A 716*a* may correspond to a first polarization (for a second band or second set of bands, for example). Each of the first elements 704*a-d* may be dual polarized. In some examples, first elements C-D 704*c-d* may have opposite (e.g., mirrored) feed placement relative to first elements A-B 704*a-b*.

In this example, each of the second elements 706*a-d* may include a respective radiator 720*a-d*. In this example, radiator A 720*a* of second element A 706*a* may have a similar size in x and y dimensions as second radiator A 718*a* of first element A 704*a*. Radiator A 720*a* of second element A 706*a* may be at a different height than first radiator A 708*a* and/or second radiator A 718*a* of first element A 704*a*.

Radiator A 720*a* may be connected to and/or coupled to first feed A 722*a* and second feed A 724*a* of second element A 706*a*. Second elements B-D 706*b-d* may each include respective radiators B-D 720*b-d* connected to and/or coupled to respective first feeds B-D 722*b-d* and respective second feeds B-D 724*b-d*. First feed A 722*a* of second element A 706*a* may correspond to a first polarization and second feed A 724*a* may correspond to a second polarization (for a second band or second set of bands, for example). Each of the second elements 706*a-d* may be dual polarized. Second elements C-D 706*c-d* may have opposite (e.g., mirrored) feed placements relative to second elements A-B 706*a-b*.

First element A 704*a* may include first radiator A 708*a* and/or second radiator A 718*a* embedded in material (e.g., support material and/or dielectric material). The material (e.g., support material and/or dielectric material) of first element A 704*a* may be distanced from the material (e.g., support material and/or dielectric material) of second element A 706*a*.

The second elements 706*a-d* may be interleaved with the first elements 704*a-d*. First element A 704*a* may have a larger size in the x dimension than second element A 706*a*.

Each of the first elements 704*a-d* and second elements 706*a-d* may be positioned on a base 726. In some examples, each of the first elements 704*a-d* and/or second elements 706*a-d* may be implemented as and/or included in a respective PCB that is assembled, soldered, and/or surface mounted on the base 726 (e.g., a larger PCB). In some examples, the first elements 704*a-d* and/or the second elements 706*a-d* may be implemented in a single PCB that is mounted into the base 726 (e.g., a larger PCB). In some examples, the antenna 702 array may be implemented in a single (e.g., monolithic) PCB.

In some configurations, each of the first elements 704*a-d* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 37-40 GHz band (e.g., n260), and/or a 39.5-43.5 GHz band (e.g., n259). In some examples, only the second elements 706*a-d* may support a 47.2-48.2 GHz band (e.g., 48G band). In this example, the second set of bands may be mutually exclusive from the first set of bands. In this example, the first set of bands is lower in frequency than the second set of bands.

In some configurations, each of the second elements 706*a-d* may be configured to support the second set of bands. For instance, each of the second elements 706*a-d* may support the second set of bands that is also supported by the first elements 704*a-d*. In some examples, each of the second elements 706*a-d* may not support the first set of bands (e.g., may not transmit signals within the first set of bands and/or may not be utilized to receive signals within the first set of bands). In some examples, a number of elements (e.g., 4) for the first set of bands may be less than a number of elements (e.g., 8) for the second set of bands. For instance, the antenna 702 may provide a 1×4 element array for the first set of bands, may provide a 1×8 element array for the second set of bands, and may provide a 1×4 array for the 48G band.

In this example, a first element spacing 728 (e.g., 6.6 millimeters (mm)) for the first set of bands may be greater than a second element spacing 730 (e.g., 3.3 mm) for the second set of bands. For example, the first set of bands may be supported by the first elements 704*a-d* and may not be supported by the second set of elements 706*a-d*. Accordingly, the first element spacing 728 for the first set of bands may be a distance between a center of first element A 704*a* and a center of first element B 704*b*. The first element spacing 728 may range from approximately 0.53-0.65λ for the first set of bands, where λ is the signal wavelength. The second set of bands may be supported by each of the first elements 704*a-d* and the second elements 706*a-d*. Accordingly, the second element spacing 730 for the second set of bands may be a distance between a center of first element A 704*a* and a center of second element A 706*a*. The second element spacing 730 may range from approximately 0.41-0.48λ for the n259 and n260 bands. In this example, a third element spacing 748 (e.g., 6.6 millimeters (mm)) may be used for the 48G band between the centers of the second elements 706*a-d*. The third element spacing 748 may be approximately 1.06λ for the 48G band.

In this example, the first elements 704*a-d* (for the first set of bands and the second set of bands) and the second elements 706*a-d* (for the second set of bands) may support multiple bands by aperture sharing. Because the element spacing 748 is approximately 1.06λ for the 48G band, grating lobes may occur for the 48G band. In some approaches, element spacing may be targeted to be approximately 0.5λ. In the example of FIG. 7, however, good scanning performance is still achieved with the grating lobes.

Figure 8:
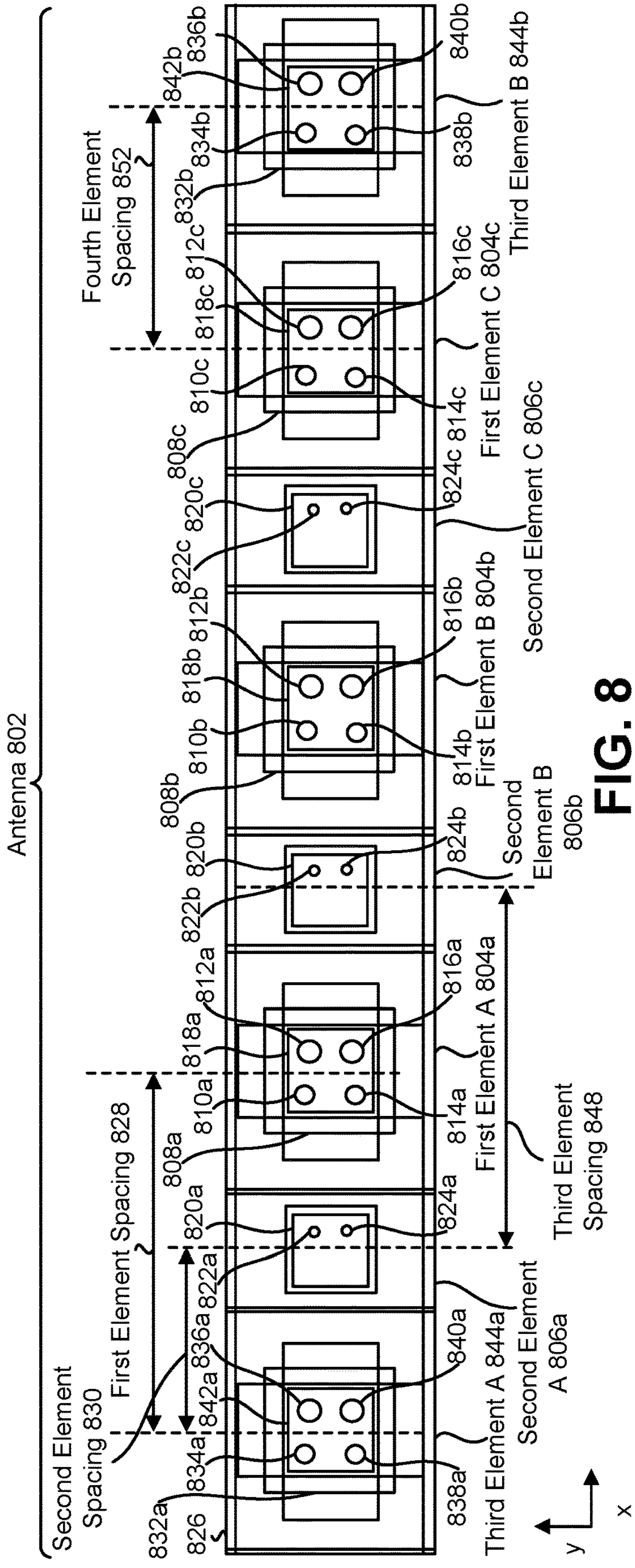
FIG. 8 is a diagram illustrating a top view of another example of an antenna in accordance with some of the configurations described herein.

FIG. 8 is a diagram illustrating a top view of another example of an antenna 802 in accordance with some of the configurations described herein. The antenna 802 and/or one or more components of the antenna 802 may be examples of corresponding components described in relation to FIG. 1A and/or FIG. 1B. The antenna 802 illustrated in FIG. 8 is an example of a multiband dual polarization aperture-shared interleaved antenna.

The antenna 802 may include a first plurality of first elements 804*a-c*, a second plurality of second elements 806*a-c*, and a third plurality of third elements 844*a-b*. In this example, three first elements 804*a-c*, three second elements 806*a-c*, and two third elements 844*a-b* are illustrated. In this example, a dimension of the antenna 802 is 3.5 mm in the y dimension. Other dimensions may be utilized in other examples.

In this example, each of the first elements 804*a-c* may include a respective first radiator 808*a-c* and second radiator 818*a-c*. In this example, first radiator A 808*a* is larger than second radiator A 818*a* in x and y dimensions. In this example, first radiator A 808*a* is below (e.g., stacked with) second radiator A 818*a* in the z dimension.

First radiator A 808*a* may be connected to and/or coupled to first feed A 810*a* and second feed A 814*a*. Second radiator A 818*a* may be connected to and/or coupled to third feed A 812*a* and fourth feed 816*a*. First elements B-C 804*b-c* may each include respective first radiators B-C 808*b-c* connected to and/or coupled to respective first feeds B-C 810*b-c* and respective second feeds B-C 814*b-c*. First elements B-C 804*b-c* may each include respective second radiators B-C 818*b-c* connected to and/or coupled to respective third feeds B-C 812*b-c* and respective fourth feeds B-C 816*b-c*. First feed A 810*a* may correspond to a first polarization and second feed A 814*a* may correspond to a second polarization (for a first band or first set of bands, for example). Third feed A 812*a* may correspond to a second polarization and fourth feed A 816*a* may correspond to a first polarization (for a second band or second set of bands, for example). Each of the first elements 804*a-c* may be dual polarized. In some examples, first elements B-C 804*b-c* may have similar feed placement relative to first element A 804*a*.

In this example, each of the second elements 806*a-c* may include a respective radiator 820*a-c*. In this example, radiator A 820*a* of second element A 806*a* may have a similar size in x and y dimensions as second radiator A 818*a* of first element A 804*a*. Radiator A 820*a* of second element A 806*a* may be at a different height than first radiator A 808*a* and/or second radiator A 818*a* of first element A 804*a*.

Radiator A 820*a* may be connected to and/or coupled to first feed A 822*a* and second feed A 824*a* of second element A 806*a*. Second elements B-C 806*b-c* may each include respective radiators B-C 820*b-c* connected to and/or coupled to respective first feeds B-C 822*b-c* and respective second feeds B-C 824*b-c*. First feed A 822*a* of second element A 806*a* may correspond to a first polarization and second feed A 824*a* may correspond to a second polarization. Each of the second elements 806*a-c* may be dual polarized. Second elements A-C 806*a-c* may have similar feed placements.

In this example, each of the third elements 844*a-b* may include a respective first radiator 832*a-b* and second radiator 842*a-b*. In this example, first radiator A 832*a* is larger than second radiator A 842*a* in x and y dimensions. In this example, first radiator A 832*a* is below (e.g., stacked with) second radiator A 842*a* in the z dimension.

First radiator A 832*a* may be connected to and/or coupled to first feed A 834*a* and second feed A 838*a*. Second radiator A 842*a* may be connected to and/or coupled to third feed A 836*a* and fourth feed A 840*a*. Third element B 844*b* may include a respective first radiator B 832*b* connected to and/or coupled to respective first feed B 834*b* and respective second feed B 838*b*. Third element B 844*b* may include respective second radiator B 842*b* connected to and/or coupled to respective third feed B 836*b* and respective fourth feed B 840*b*. First feed A 834*a* may correspond to a first polarization and second feed A 838*a* may correspond to a second polarization. Third feed A 836*a* may correspond to a second polarization and fourth feed A 840*a* may correspond to a first polarization. Each of the third elements 844*a-b* may be dual polarized. In some examples, third element B 844*b* may have similar feed placement relative to third element A 844*a*.

First element A 804*a* may include first radiator A 808*a* and/or second radiator A 818*a* embedded in material (e.g., support material and/or dielectric material). The material (e.g., support material and/or dielectric material) of first element A 804*a* may be distanced from the material (e.g., support material and/or dielectric material) of second element A 806*a*. The material (e.g., support material and/or dielectric material) of third element A 844*a* may be distanced from the material (e.g., support material and/or dielectric material) of second element A 806*a*.

The second elements 806*a-c* may be interleaved with the first elements 804*a-c*. First element A 804*a* may have a larger size in the x dimension than second element A 806*a*. Third elements A-C 844*a-b* may have a larger size in the x dimension than second element A 806*a*. First element A 804*a* may have a similar size in the x dimension to third element A 844*a*.

Each of the first elements 804*a-c*, second elements 806*a-c*, and third elements 844*a-b* may be positioned on a base 826. In some examples, each of the first elements 804*a-c*, second elements 806*a-c*, and/or third elements 844*a-b* may be implemented as and/or included in a respective PCB that is assembled, soldered, and/or surface mounted on the base 826 (e.g., a larger PCB). In some examples, the first elements 804*a-c*, the second elements 806*a-c*, and/or the third elements 844*a-b* may be implemented in a single PCB that is mounted into the base 826 (e.g., a larger PCB). In some examples, the antenna 802 array may be implemented in a single (e.g., monolithic) PCB.

In some configurations, each of the first elements 804*a-c* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 37-40 GHz band (e.g., n260), and/or a 39.5-43.5 GHz band (e.g., n259). In some examples, the second elements 806*a-c* and/or the third elements 844*a-b* may support a 47.2-48.2 GHz band (e.g., 48G band). In some examples, one or more third bands may be supported by one or more third elements (e.g., third elements 844*a-b*). For instance, a third band may include a 47.2-48.2 GHz band (e.g., 48G band). In some examples, the third elements 844*a-b* may support the first set of bands. In this example, the second set of bands may be mutually exclusive from the first set of bands. In this example, the first set of bands is lower in frequency than the second set of bands.

In some configurations, each of the second elements 806*a-c* may be configured to support the second set of bands. For instance, each of the second elements 806*a-c* may support the second set of bands that is also supported by the first elements 804*a-c*. In some examples, each of the second elements 806*a-c* may not support the first set of bands (e.g., may not transmit signals within the first set of bands and/or may not be utilized to receive signals within the first set of bands). In some examples, a number of elements for the first set of bands (e.g., 5) may be less than a number of elements (e.g., 6) for the second set of bands. For instance, the antenna 802 may provide a 1×5 element array for the first set of bands, may provide a 1×6 element array for the second set of bands, and may provide a 1×5 array for the third band (e.g., 48G).

In this example, a first element spacing 828 (e.g., 6.6 mm) for the first set of bands may be greater than a second element spacing 830 (e.g., 3.3 mm) for the third band (e.g., 48G). For example, the first set of bands may be supported by the first elements 804*a-c* and may not be supported by the second set of elements 806*a-c*. Accordingly, the first element spacing 828 for the first set of bands may be a distance between a center of third element A 844*a* and a center of first element A 804*a* and/or between a center of first element A 804*a* and a center of first element B 804*b*. The first element spacing 828 may range from approximately 0.53-0.65λ for the first set of bands, where λ is the signal wavelength. The second set of bands may be supported by each of the first elements 804*a-c* and the second elements 806*a-c*. A second element spacing 830 for the third band (e.g., 48G) may be a distance between a center of third element A 844*a* and a center of second element A 806*a*. The second element spacing 830 may be approximately 0.53λ for the 48G band. In this example, a third element spacing 848 (e.g., 6.6 mm) may be used for the 48G band between the centers of the second elements 806*a-c*. The third element spacing 848 may be approximately 1.06λ for the 48G band. In this example, a fourth element spacing 852 (e.g., 4.7 mm) may be used for the first set of bands (e.g., approximately 0.42λ) between the centers of first element C 804*c* and third element B 844*b*. In this example, the first elements 804*a-c* (for the first set of bands and the second set of bands), the second elements 806*a-c* (for the second set of bands and/or the third band (e.g., 48G)), and the third elements 844*a-b* (for the first set of bands and the third band) may support multiple bands by aperture sharing.

Figure 9:
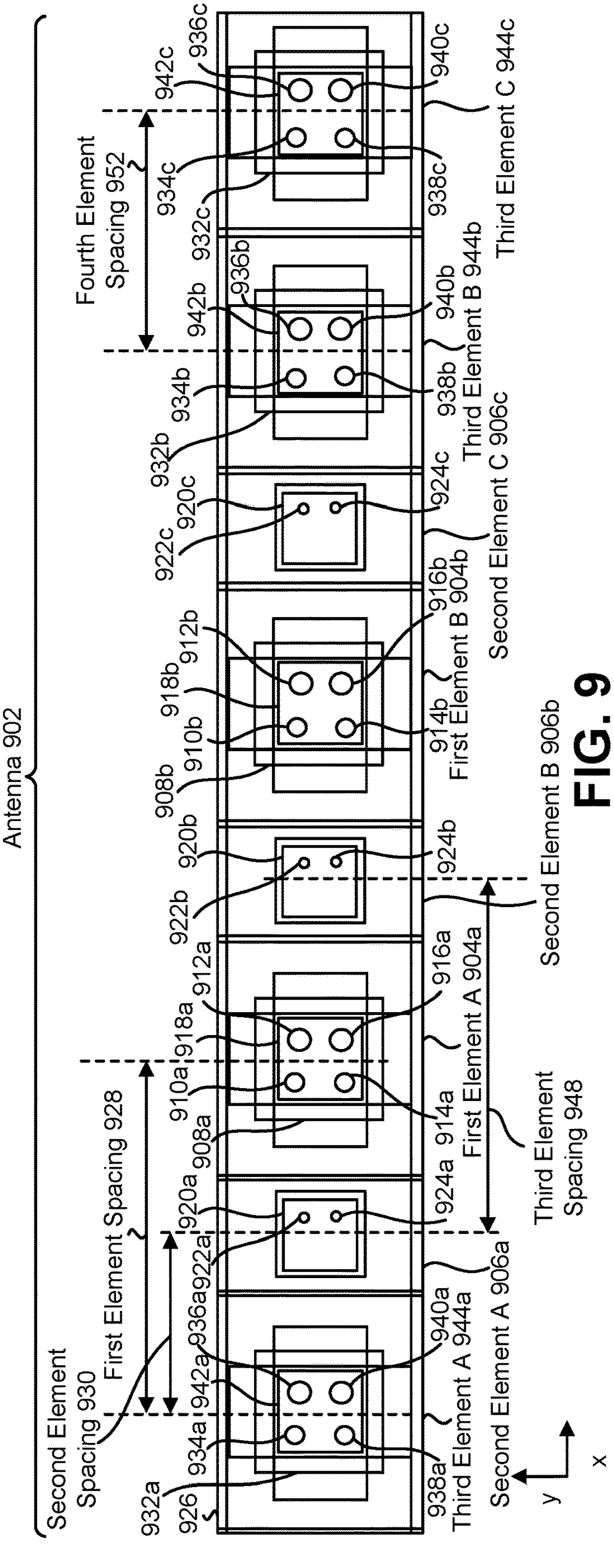
FIG. 9 is a diagram illustrating a top view of another example of an antenna in accordance with some of the configurations described herein.

FIG. 9 is a diagram illustrating a top view of another example of an antenna 902 in accordance with some of the configurations described herein. The antenna 902 and/or one or more components of the antenna 902 may be examples of corresponding components described in relation to FIG. 1A and/or FIG. 1B. The antenna 902 illustrated in FIG. 9 is an example of a multiband dual polarization aperture-shared interleaved antenna.

The antenna 902 may include a first plurality of first elements 904*a-b*, a second plurality of second elements 906*a-c*, and a third plurality of third elements 944*a-c*. In this example, two first elements 904*a-b*, three second elements 906*a-c*, and three third elements 944*a-c* are illustrated. In this example, the antenna 902 has a length of 3.5 mm. Other dimensions may be utilized in other examples.

In this example, each of the first elements 904*a-b* may include a respective first radiator 908*a-b* and second radiator 918*a-b*. In this example, first radiator A 908*a* is larger than second radiator A 918*a* in x and y dimensions. In this example, first radiator A 908*a* is below (e.g., stacked with) second radiator A 918*a* in the z dimension.

First radiator A 908*a* may be connected to and/or coupled to first feed A 910*a* and second feed A 914*a*. Second radiator A 918*a* may be connected to and/or coupled to third feed A 912*a* and fourth feed A 916*a*. First element B 904*b* may include a respective first radiator B 908*b* connected to and/or coupled to respective first feed B 910*b* and respective second feed B 914*b*. First element B 904*b* may include a respective second radiator B 918*b* connected to and/or coupled to respective third feed B 912*b* and respective fourth feed B 916*b*. First feed A 910*a* may correspond to a first polarization and second feed A 914*a* may correspond to a second polarization. Third feed A 912*a* may correspond to a second polarization and fourth feed A 916*a* may correspond to a first polarization. Each of the first elements 904*a-b* may be dual polarized. In some examples, first element B 904*b* may have similar feed placement relative to first element A 904*a*.

In this example, each of the second elements 906*a-c* may include a respective radiator 920*a-c*. In this example, radiator A 920*a* of second element A 906*a* may have a similar size in x and y dimensions as second radiator A 918*a* of first element A 904*a*. Radiator A 920*a* of second element A 906*a* may be at a different height than first radiator A 908*a* and/or second radiator A 918*a* of first element A 904*a*.

Radiator A 920*a* may be connected to and/or coupled to first feed A 922*a* and second feed A 924*a* of second element A 906*a*. Second elements B-C 906*b-c* may each include respective radiators B-C 920*b-c* connected to and/or coupled to respective first feeds B-C 922*b-c* and respective second feeds B-C 924*b-c*. First feed A 922*a* of second element A 906*a* may correspond to a first polarization and second feed A 924*a* may correspond to a second polarization. Each of the second elements 906*a-c* may be dual polarized. Second elements A-C 906*a-c* may have similar feed placements.

In this example, each of the third elements 944*a-c* may include a respective first radiator 932*a-c* and second radiator 942*a-c*. In this example, first radiator A 932*a* is larger than second radiator A 942*a* in x and y dimensions. In this example, first radiator A 932*a* is below (e.g., stacked with) second radiator A 942*a* in the z dimension.

First radiator A 932*a* may be connected to and/or coupled to first feed A 934*a* and second feed A 938*a*. Second radiator A 942*a* may be connected to and/or coupled to third feed A 936*a* and fourth feed A 940*a*. Third elements B-C 944*b-c* may include respective first radiators B-C 932*b-c* connected to and/or coupled to respective first feeds B-C 934*b-c* and respective second feeds B 938*b-c*. Third elements B-C 944*b-c* may include respective second radiators B-C 942*b-c* connected to and/or coupled to respective third feeds B-C 936*b-c* and respective fourth feeds B-C 940*b-c*. First feed A 934*a* may correspond to a first polarization and second feed A 938*a* may correspond to a second polarization. Third feed A 936*a* may correspond to a second polarization and fourth feed A 940*a* may correspond to a first polarization. Each of the third elements 944*a-c* may be dual polarized. In some examples, third elements B-C 944*b-c* may have similar feed placement relative to third element A 944*a*.

First element A 904*a* may include first radiator A 908*a* and/or second radiator A 918*a* embedded in material (e.g., support material and/or dielectric material). The material (e.g., support material and/or dielectric material) of first element A 904*a* may be distanced from the material (e.g., support material and/or dielectric material) of second element A 906*a*.

The second elements 906*a-c* may be interleaved with the first elements 904*a-b*. First element A 904*a* may have a larger size in the x dimension than second element A 906*a*. Third elements A-C 944*a-c* may have a larger size in the x dimension than second element A 906*a*. First element A 904*a* may have a similar size in the x dimension to third element A 944*a*.

Each of the first elements 904*a-b*, second elements 906*a-c*, and third elements 944*a-c* may be positioned on a base 926. In some examples, each of the first elements 904*a-b*, second elements 906*a-c*, and/or third elements 944*a-c* may be implemented as and/or included in a respective PCB that is assembled, soldered, and/or surface mounted on the base 926 (e.g., a larger PCB). In some examples, the first elements 904*a-b*, the second elements 906*a-c*, and/or the third elements 944*a-c* may be implemented in a single PCB that is mounted into the base 926 (e.g., a larger PCB). In some examples, the antenna 902 array may be implemented in a single (e.g., monolithic) PCB.

In some configurations, each of the first elements 904*a-b* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 37-40 GHz band (e.g., n260), and/or a 39.5-43.5 GHz band (e.g., n259). In some examples, the second elements 906*a-c* and/or the third elements 944*a-c* may support a 47.2-48.2 GHz band (e.g., 48G band). In some examples, one or more third bands may be supported by one or more third elements (e.g., third elements 944*a-c*). For instance, a third band may include a 47.2-48.2 GHz band (e.g., 48G band). In some examples, the third elements 944*a-c* may support the first set of bands. In this example, the second set of bands may be mutually exclusive from the first set of bands. In this example, the first set of bands is lower in frequency than the second set of bands.

In some configurations, each of the second elements 906*a-c* may be configured to support the second set of bands. For instance, each of the second elements 906*a-c* may support the second set of bands that is also supported by the first elements 904*a-b*. In some examples, each of the second elements 906*a-c* may not support the first set of bands (e.g., may not transmit signals within the first set of bands and/or may not be utilized to receive signals within the first set of bands). In some examples, a number of elements for the first set of bands (e.g., 5) may be the same as a number of elements (e.g., 5) for the second set of bands. For instance, the antenna 902 may provide a 1×5 element array for the first set of bands, may provide a 1×5 element array for the second set of bands, and may provide a 1×6 array for the 48G band.

In this example, a first element spacing 928 (e.g., 6.6 mm) for the first set of bands may be greater than a second element spacing 930 (e.g., 3.3 mm) for the third band (e.g., 48G). For example, the first set of bands may be supported by the first elements 904*a-b* and may not be supported by the second set of elements 906*a-c*. Accordingly, the first element spacing 928 for the first set of bands may be a distance between a center of third element A 944*a* and a center of first element A 904*a* and/or a distance between a center of first element A 904*a* and a center of first element B 904*b*. The first element spacing 928 may range from approximately 0.53-0.65λ for the first set of bands, where λ is the signal wavelength. The second set of bands may be supported by each of the first elements 904*a-b* and the second elements 906*a-c*. A second element spacing 930 for the third band (e.g., 48G) may be a distance between a center of third element A 944*a* and a center of second element A 906*a*. The second element spacing 930 may be approximately 0.53λ for the 48G band. In this example, a third element spacing 948 (e.g., 6.6 mm) may be used for the 48G band between the centers of the second elements 906*a-c*. The third element spacing 948 may be approximately 1.06λ for the 48G band. In this example, a fourth element spacing 952 (e.g., 4.7 mm) may be used for the first set of bands (e.g., approximately 0.42λ) and the 48G band (e.g., approximately 0.75λ) between the centers of third elements B-C 944*b-c*. In this example, the first elements 904*a-b* (for the first set of bands and the second set of bands), the second elements 906*a-c* (for the second set of bands and/or the third band (e.g., 48G)), and the third elements 944*a-c* (for the first set of bands and the third band) may support multiple bands by aperture sharing.

Figures 10A, 10B:
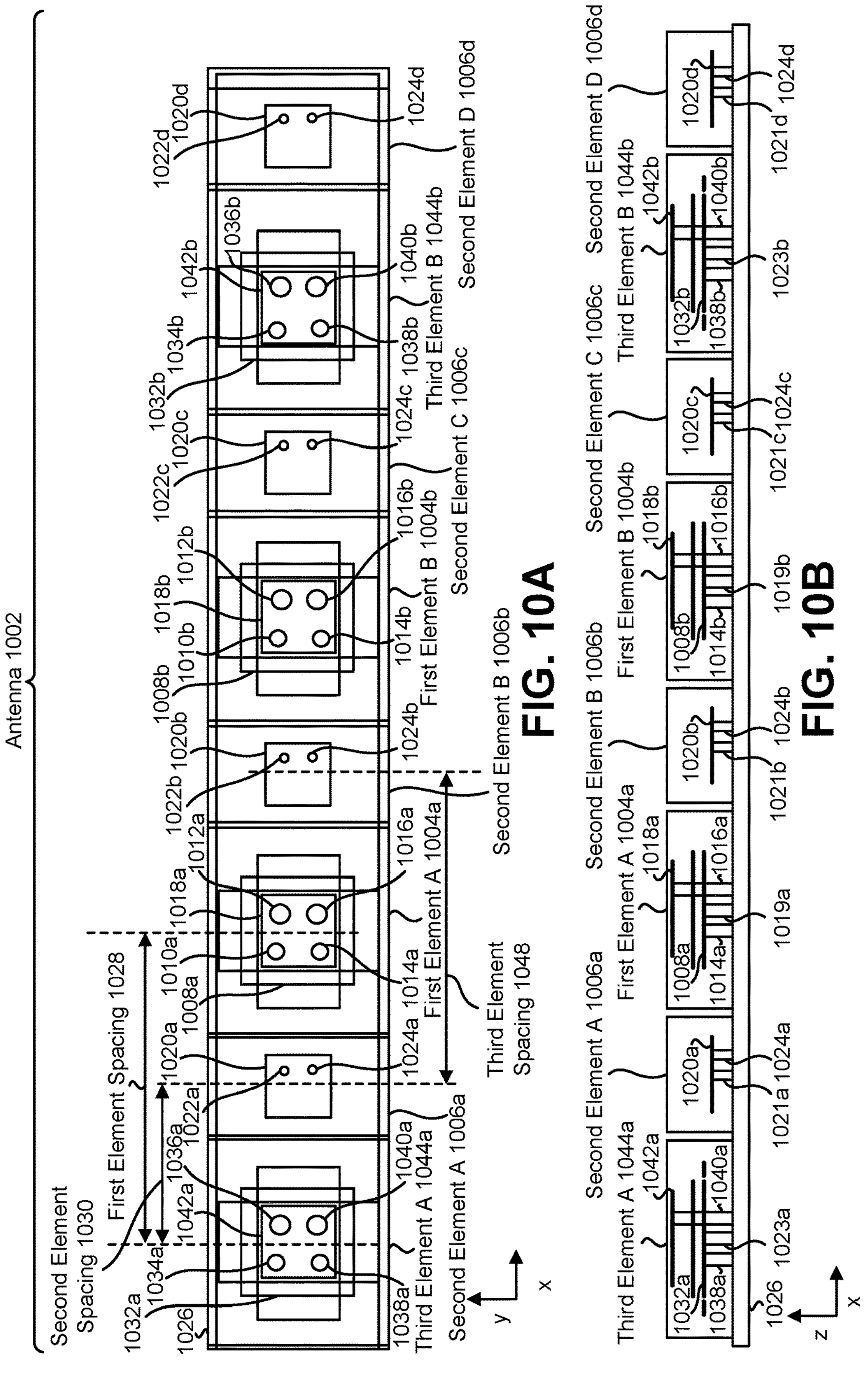
FIG. 10A is a diagram illustrating a top view of another example of an antenna in accordance with some of the configurations described herein.
FIG. 10B is a diagram illustrating an elevation view of the antenna of FIG. 10A.

FIG. 10A is a diagram illustrating a top view of another example of an antenna 1002 in accordance with some of the configurations described herein. FIG. 10B is a diagram illustrating an elevation view of the antenna 1002 of FIG. 10A. FIG. 10A and FIG. 10B will be described together. The antenna 1002 and/or one or more components of the antenna 1002 may be examples of corresponding components described in relation to FIG. 1A and/or FIG. 1B. The antenna 1002 illustrated in FIG. 10A is an example of a multiband dual polarization aperture-shared interleaved antenna.

The antenna 1002 may include a first plurality of first elements 1004*a-b*, a second plurality of second elements 1006*a-d*, and a third plurality of third elements 1044*a-b*. In this example, two first elements 1004*a-b*, four second elements 1006*a-d*, and two third elements 1044*a-b* are illustrated. In this example, the antenna 1002 has a length of 3.5 mm. Other dimensions may be utilized in other examples.

In this example, each of the first elements 1004*a-b* may include a respective first radiator 1008*a-b* and second radiator 1018*a-b*. In this example, first radiator A 1008*a* is larger than second radiator A 1018*a* in x and y dimensions. In this example, first radiator A 1008*a* is below (e.g., stacked with) second radiator A 1018*a* in the z dimension.

First radiator A 1008*a* may be connected to and/or coupled to first feed A 1010*a* and second feed A 1014*a*. Second radiator A 1018*a* may be connected to and/or coupled to third feed A 1012*a* and fourth feed A 1016*a*. First element B 1004*b* may include a respective first radiator B 1008*b* connected to and/or coupled to respective first feed B 1010*b* and respective second feed B 1014*b*. First element B 1004*b* may include a respective second radiator B 1018*b* connected to and/or coupled to respective third feed B 1012*b* and respective fourth feed B 1016*b*. First feed A 1010*a* may correspond to a first polarization and second feed A 1014*a* may correspond to a second polarization. Third feed A 1012*a* may correspond to a second polarization and fourth feed A 1016*a* may correspond to a first polarization. Each of the first elements 1004*a-b* may be dual polarized. In some examples, first element B 1004*b* may have similar feed placement relative to first element A 1004*a*.

In this example, each of the second elements 1006*a-d* may include a respective radiator 1020*a-d*. In this example, radiator A 1020*a* of second element A 1006*a* may have a smaller size in x and/or y dimensions than second radiator A 1042*a* of third element A 1044*a*. Radiator A 1020*a* of second element A 1006*a* may be at a different height than first radiator A 1008*a* and/or second radiator A 1018*a* of first element A 1004*a*.

Radiator A 1020*a* may be connected to and/or coupled to first feed A 1022*a* and second feed A 1024*a* of second element A 1006*a*. Second elements B-D 1006*b-d* may each include respective radiators B-D 1020*b-d* connected to and/or coupled to respective first feeds B-D 1022*b-d* and respective second feeds B-D 1024*b-d*. First feed A 1022*a* of second element A 1006*a* may correspond to a first polarization and second feed A 1024*a* may correspond to a second polarization. Each of the second elements 1006*a-d* may be dual polarized. Second elements A-D 1006*a-d* may have similar feed placements.

In this example, each of the third elements 1044*a-b* may include a respective first radiator 1032*a-b* and second radiator 1042*a-b*. In this example, first radiator A 1032*a* is larger than second radiator A 1042*a* in x and y dimensions. In this example, first radiator A 1032*a* is below (e.g., stacked with) second radiator A 1042*a* in the z dimension.

First radiator A 1032*a* may be connected to and/or coupled to first feed A 1034*a* and second feed A 1038*a*. Second radiator A 1042*a* may be connected to and/or coupled to third feed A 1036*a* and fourth feed A 1040*a*. Third element B 1044*b* may include first radiator B 1032*b* connected to and/or coupled to first feed B 1034*b* and second feed B 1038*b*. Third element B 1044*b* may include second radiator B 1042*b* connected to and/or coupled to third feed B 1036*b* and fourth feed B 1040*b*. First feed A 1034*a* may correspond to a first polarization and second feed A 1038*a* may correspond to a second polarization. Third feed A 1036*a* may correspond to a second polarization and fourth feed A 1040*a* may correspond to a first polarization. Each of the third elements 1044*a-b* may be dual polarized. In some examples, third element B 1044*b* may have similar feed placement relative to third element A 1044*a*.

First element A 1004*a* may include first radiator A 1008*a* and/or second radiator A 1018*a* embedded in material (e.g., support material and/or dielectric material). In some examples, two or more elements may be combined on a printed circuit board or may be separated. For instance, the material (e.g., support material and/or dielectric material) of first element A 1004*a* may be distanced from the material (e.g., support material and/or dielectric material) of second element A 1006*a*. In some examples, third element A 1044*a* and second element A 1006*a* may be combined on one printed circuit board. For instance, the material of third element A 1044*a* and second element A 1006*a* may be combined and/or included in one printed circuit board. Other elements (e.g., first element A 1004*a* and second element B 1006, first element B 1004*b* and second element C 1006*c*, and/or third element B 1044*b* and second element D 1006*d*) may be combined and/or included in one printed circuit board in some examples.

The second elements A-C 1006*a-c* may be interleaved with the first elements 1004*a-b*. First element A 1004*a* may have a larger size in the x dimension than second element A 1006*a*. Third elements A-B 1044*a-b* may have a larger size in the x dimension than second element A 1006*a*. First element A 1004*a* may have a similar size in the x dimension to third element A 1044*a*.

Each of the first elements 1004*a-b*, second elements 1006*a-d*, and third elements 1044*a-b* may be positioned on a base 1026. In some examples, each of the first elements 1004*a-b*, second elements 1006*a-d*, and/or third elements 1044*a-b* may be implemented as and/or included in a respective PCB that is assembled, soldered, and/or surface mounted on the base 1026 (e.g., a larger PCB). In some examples, the first elements 1004*a-b*, the second elements 1006*a-d*, and/or the third elements 1044*a-b* may be implemented in a single PCB that is mounted into the base 1026 (e.g., a larger PCB). In some examples, the antenna 1002 array may be implemented in a single (e.g., monolithic) PCB.

In some configurations, each of the first elements 1004*a-b* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 37-40 GHz band (e.g., n260), and/or a 39.5-43.5 GHz band (e.g., n259). In some examples, the second elements 1006*a-d* and/or the third elements 1044*a-b* may support a 47.2-48.2 GHz band (e.g., 48G band, n262). In some examples, one or more third bands may be supported by one or more third elements (e.g., third elements 1044*a-b*). For instance, a third band may include a 47.2-48.2 GHz band (e.g., 48G band, n262). In some examples, the third elements 1044*a-b* may support the first set of bands. In this example, the second set of bands may be mutually exclusive from the first set of bands. In this example, the first set of bands is lower in frequency than the second set of bands. In some examples, the third band may be separated from the second set of bands by 3 GHz or more. In some examples described herein, each element may support only a subset of all bands supported by the antenna. For instance, none of the elements may support all of the bands supported by the antenna in some implementations.

In some configurations, each of the second elements 1006*a-d* may be configured to support the second set of bands. For instance, each of the second elements 1006*a-d* may support the second set of bands that is also supported by the first elements 1004*a-b*. In some examples, each of the second elements 1006*a-d* may not support the first set of bands (e.g., may not transmit signals within the first set of bands and/or may not be utilized to receive signals within the first set of bands). In some examples, a number of elements (e.g., 4) for the first set of bands may be different from a number of elements (e.g., 6) for the second set of bands and/or for the third band. For instance, the antenna 1002 may provide a 1×4 element array for the first set of bands, may provide a 1×6 element array for the second set of bands, and may provide a 1×6 array for the 48G band.

In this example, a first element spacing 1028 (e.g., 6.6 mm) for the first set of bands may be greater than a second element spacing 1030 (e.g., 3.3 mm) for the third band (e.g., 48G). For example, the first set of bands may be supported by the first elements 1004*a-b* and may not be supported by the second set of elements 1006*a-d*. Accordingly, the first element spacing 1028 for the first set of bands may be a distance between a center of third element A 1044*a* and a center of first element A 1004*a* and/or a distance between a center of first element A 1004*a* and a center of first element B 1004*b*. The first element spacing 1028 may range from approximately 0.53-0.65λ for the first set of bands, where λ is the signal wavelength. The second set of bands may be supported by each of the first elements 1004*a-b* and the second elements 1006*a-d*. A second element spacing 1030 for the third band (e.g., 48G) may be a distance between a center of third element A 1044*a* and a center of second element A 1006*a*. The second element spacing 1030 may be approximately 0.53λ for the 48G band. In this example, a third element spacing 1048 (e.g., 6.6 mm) may be used for the 48G band between the centers of the second elements 1006*a-d*. The third element spacing 1048 may be approximately 1.06λ for the 48G band. In this example, the first elements 1004*a-b* (for the first set of bands and the second set of bands), the second elements 1006*a-d* (for the second set of bands and/or the third band (e.g., 48G)), and the third elements 1044*a-b* (for the first set of bands and the third band) may support multiple bands by aperture sharing.

In some examples, second radiator A 1042*a* of third element A 1044*a* may be larger than radiator A 1020*a* of second element A 1006*a* because third element A 1044*a* includes first radiator A 1032*a* beneath second radiator A 1042*a*, while radiator A 1020*a* of second element A 1006*a* does not. For instance, first radiator A 1032*a* of third element A 1044*a* (e.g., a low band patch) may act as a ground plane for second radiator A 1042*a* (e.g., a high band patch). A radiator (e.g., patch) that is closer to a ground plane may be larger than a radiator (e.g., patch) that is further away from the ground plane in order to radiate at the same frequency. In the example illustrated in FIG. 10B, the elements have equal or approximately equal height. In some examples, elements that are combined on a PCB may have equal or approximately equal height.

In some examples of the antennas described herein, one or more elements may include one or more posts connecting one or more radiators to ground. In FIG. 10B, for instance, first elements 1004*a-b* may include respective posts 1019*a-b* connecting respective radiators 1008*a-b* to ground. Second elements 1006*a-d* may include respective posts 1021*a-d* connecting respective radiators 1020*a-d* to ground. Third elements 1044*a-b* may include respective posts 1023*a-b* connecting respective radiators 1032*a-b* to ground. Other examples of elements described in relation to other Figures may similarly include one or more posts connecting one or more radiators to ground in some implementations. In some examples, posts may be connected approximately centrally to patches.

Figure 11:
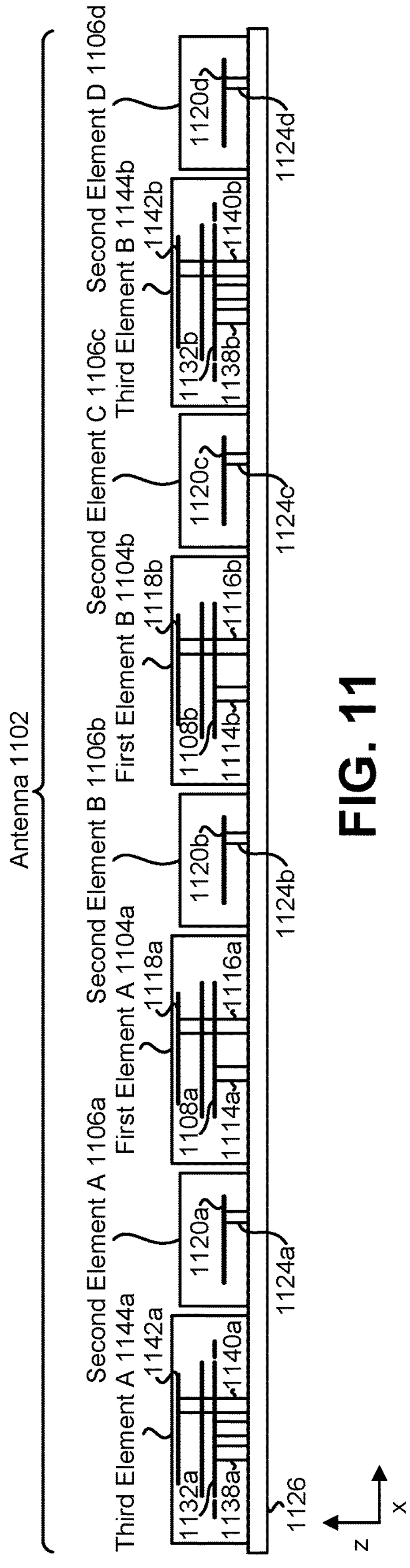
FIG. 11 is a diagram illustrating an elevation view of another example of an antenna 1102 in accordance with some of the configurations described herein.

FIG. 11 is a diagram illustrating an elevation view of another example of an antenna 1102 in accordance with some of the configurations described herein. The antenna 1102 and/or one or more components of the antenna 1102 may be examples of corresponding components described in relation to FIG. 1A and/or FIG. 1B. The antenna 1102 illustrated in FIG. 11 is an example of a multiband dual polarization aperture-shared interleaved antenna. FIG. 11 illustrates an alternate configuration of the antenna 1002 described in relation to FIG. 10A. For example, the components described in relation to FIG. 10A may be similar to the corresponding to components described in relation to FIG. 11. However, the components described in FIG. 11 may vary in one or more aspects relative to the components described in relation to FIG. 10B. For instance, some of the components of FIG. 11 may vary regarding the z (e.g., height) dimension.

As illustrated in FIG. 11, the elements may have different heights. For example, the second elements 1106*a-d* have a lesser height relative to the third elements 1144*a-b* and/or first elements 1104*a-b*. In some examples, some elements (e.g., elements supporting one or more higher bands) may have shorter heights, which may reduce probe length and increase performance.

The antenna 1102 may include a first plurality of first elements 1104*a-b*, a second plurality of second elements 1106*a-d*, and a third plurality of third elements 1144*a-b*. In this example, two first elements 1104*a-b*, four second elements 1106*a-d*, and two third elements 1144*a-b* are illustrated. In this example, the antenna 1102 has a length of 3.5 mm. Other dimensions may be utilized in other examples.

In this example, each of the first elements 1104*a-b* may include a respective first radiator 1108*a-b* and second radiator 1118*a-b*. In this example, first radiator A 1108*a* is larger than second radiator A 1118*a* in x and y dimensions. In this example, first radiator A 1108*a* is below (e.g., stacked with) second radiator A 1118*a* in the z dimension.

First radiator A 1108*a* may be connected to and/or coupled to first feed A (not shown) and second feed A 1114*a* of first element A 1104*a*. Second radiator A 1118*a* may be connected to and/or coupled to third feed A (not shown) and fourth feed A 1116*a* of first element A 1104*a*. First element B 1104*b* may include a respective first radiator B 1108*b* connected to and/or coupled to respective first feed B (not shown) and respective second feed B 1114*b* of first element B 1104*b*. First element B 1104*b* may include a respective second radiator B 1118*b* connected to and/or coupled to respective third feed B (not shown) and respective fourth feed B 1116*b* of first element B 1104*b*. First feed A of first element A 1104*a* may correspond to a first polarization and second feed A 1114*a* may correspond to a second polarization. Third feed A of first element A 1104*a* may correspond to a second polarization and fourth feed A 1116*a* may correspond to a first polarization. Each of the first elements 1104*a-b* may be dual polarized. In some examples, first element B 1104*b* may have similar feed placement relative to first element A 1104*a*.

In this example, each of the second elements 1106*a-d* may include a respective radiator 1120*a-d*. In this example, radiator A 1120*a* of second element A 1106*a* may have a smaller size in x and/or y dimensions than second radiator A 1142*a* of third element A 1144*a*. Radiator A 1120*a* of second element A 1106*a* may be at a different height than first radiator A 1108*a* and/or second radiator A 1118*a* of first element A 1104*a*.

Radiator A 1120*a* may be connected to and/or coupled to first feed A (not shown) and second feed A 1124*a* of second element A 1106*a*. Second elements B-D 1106*b-d* may each include respective radiators B-D 1120*b-d* connected to and/or coupled to respective first feeds B-D (not shown) and respective second feeds B-D 1124*b-d* of respective second elements B-D 1106*b-d*. First feed A of second element A 1106*a* may correspond to a first polarization and second feed A 1124*a* may correspond to a second polarization. Each of the second elements 1106*a-d* may be dual polarized. Second elements A-D 1106*a-d* may have similar feed placements.

In this example, each of the third elements 1144*a-b* may include a respective first radiator 1132*a-b* and second radiator 1142*a-b*. In this example, first radiator A 1132*a* is larger than second radiator A 1142*a* in x and y dimensions. In this example, first radiator A 1132*a* is below (e.g., stacked with) second radiator A 1142*a* in the z dimension.

First radiator A 1132*a* may be connected to and/or coupled to first feed A (not shown) and second feed A 1138*a* of third element A 1144*a*. Second radiator A 1142*a* may be connected to and/or coupled to third feed A (not shown) and fourth feed 1140*a* of third element A 1144*a*. Third element B 1144*b* may include first radiator B 1132*b* connected to and/or coupled to first feed B (not shown) and second feed B 1138*b* of third element B 1144*b*. Third element B 1144*b* may include second radiator B 1142*b* connected to and/or coupled to third feed B (not shown) and fourth feed B 1140*b* of third element B 1144*b*. First feed A of third element A 1144*a* may correspond to a first polarization and second feed A 1138*a* may correspond to a second polarization. Third feed A of third element A 1144*a* may correspond to a second polarization and fourth feed A 1140*a* may correspond to a first polarization. Each of the third elements 1144*a-b* may be dual polarized. In some examples, third element B 1144*b* may have similar feed placement relative to third element A 1144*a*.

First element A 1104*a* may include first radiator A 1108*a* and/or second radiator A 1118*a* embedded in material (e.g., support material and/or dielectric material). In some examples, two or more elements may be combined on a printed circuit board or may be separated. For instance, the material (e.g., support material and/or dielectric material) of first element A 1104*a* may be distanced from the material (e.g., support material and/or dielectric material) of second element A 1106*a*. In some examples, third element A 1144*a* and second element A 1106*a* may be combined on one printed circuit board. For instance, the material of third element A 1144*a* and second element A 1106*a* may be combined and/or included in one printed circuit board. Other elements (e.g., first element A 1104*a* and second element B 1106, first element B 1104*b* and second element C 1106*c*, and/or third element B 1144*b* and second element D 1106*d*) may be combined and/or included in one printed circuit board in some examples.

The second elements A-C 1106*a-c* may be interleaved with the first elements 1104*a-b*. First element A 1104*a* may have a larger size in the x dimension than second element A 1106*a*. Third elements A-B 1144*a-b* may have a larger size in the x dimension than second element A 1106*a*. First element A 1104*a* may have a similar size in the x dimension to third element A 1144*a*.

Each of the first elements 1104*a-b*, second elements 1106*a-d*, and third elements 1144*a-b* may be positioned on a base 1126. In some examples, each of the first elements 1104*a-b*, second elements 1106*a-d*, and/or third elements 1144*a-b* may be implemented as and/or included in a respective PCB that is assembled, soldered, and/or surface mounted on the base 1126 (e.g., a larger PCB). In some examples, the first elements 1104*a-b*, the second elements 1106*a-d*, and/or the third elements 1144*a-b* may be implemented in a single PCB that is mounted into the base 1126 (e.g., a larger PCB). In some examples, the antenna 1102 array may be implemented in a single (e.g., monolithic) PCB.

In some examples, the first elements 1104*a-b*, the second elements 1106*a-d*, and/or the third elements 1144*a-b* may be configured to support bands as described in relation to FIG. 10A or may be different. In some examples, element spacing may be implemented as described in relation to FIG. 10A or may be different. In some examples, the antenna 1102 may support aperture sharing as described in relation to FIG. 10A. In some examples, one or more aspects of the antenna 1102 may be implemented as similarly described in relation to FIG. 10A.

Figure 12A:
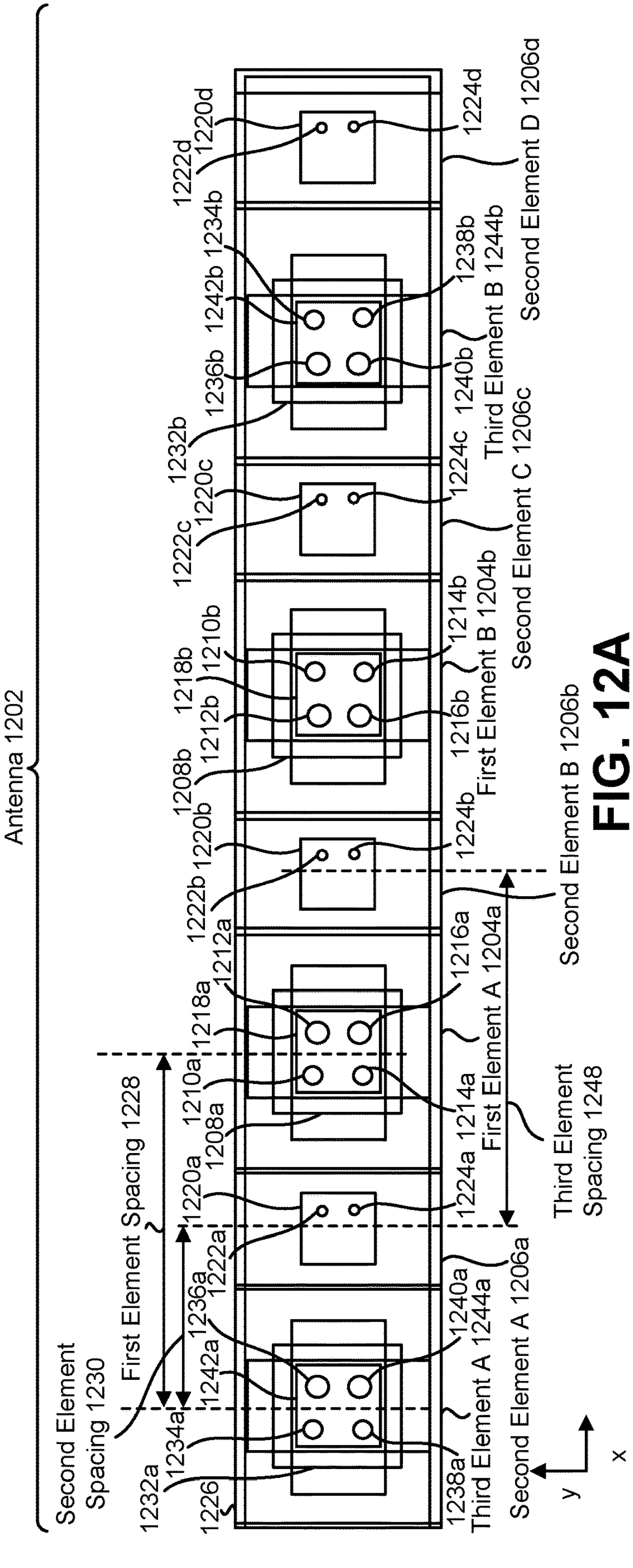
FIG. 12A is a diagram illustrating a top view of another example of an antenna in accordance with some of the configurations described herein.
Figure 12B:
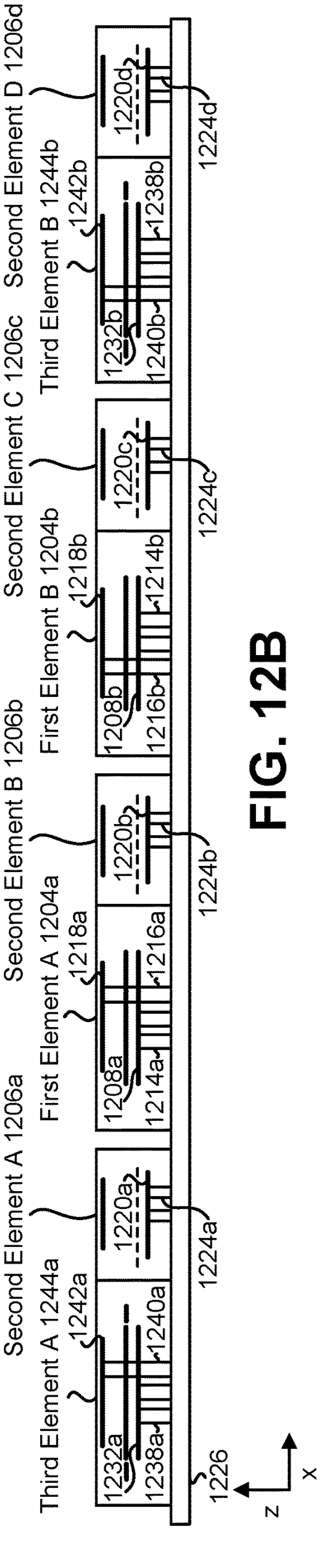
FIG. 12B is a diagram illustrating an elevation view of the antenna of FIG. 12A.

FIG. 12A is a diagram illustrating a top view of another example of an antenna 1202 in accordance with some of the configurations described herein. FIG. 12B is a diagram illustrating an elevation view of the antenna 1202 of FIG. 12A. FIG. 12A and FIG. 12B will be described together. The antenna 1202 and/or one or more components of the antenna 1202 may be examples of corresponding components described in relation to FIG. 1A and/or FIG. 1B. The antenna 1202 illustrated in FIG. 12A is an example of a multiband dual polarization aperture-shared interleaved antenna.

The antenna 1202 may include a first plurality of first elements 1204*a-b*, a second plurality of second elements 1206*a-d*, and a third plurality of third elements 1244*a-b*. In this example, two first elements 1204*a-b*, four second elements 1206*a-d*, and two third elements 1244*a-b* are illustrated. In this example, the antenna 1202 has a length of 3.5 mm. In this example, the antenna 1202 has a width of 27.2 mm. Other dimensions may be utilized in other examples.

In this example, each of the first elements 1204*a-b* may include a respective first radiator 1208*a-b* and second radiator 1218*a-b*. In this example, first radiator A 1208*a* is larger than second radiator A 1218*a* in x and y dimensions. In this example, first radiator A 1208*a* is below (e.g., stacked with) second radiator A 1218*a* in the z dimension.

First radiator A 1208*a* may be connected to and/or coupled to first feed A 1210*a* and second feed A 1214*a*. Second radiator A 1218*a* may be connected to and/or coupled to third feed A 1212*a* and fourth feed 1216*a*. First element B 1204*b* may include a respective first radiator B 1208*b* connected to and/or coupled to respective first feed B 1210*b* and respective second feed B 1214*b*. First element B 1204*b* may include a respective second radiator B 1218*b* connected to and/or coupled to respective third feed B 1212*b* and respective fourth feed B 1216*b*. First feed A 1210*a* may correspond to a first polarization and second feed A 1214*a* may correspond to a second polarization. Third feed A 1212*a* may correspond to a second polarization and fourth feed A 1216*a* may correspond to a first polarization. Each of the first elements 1204*a-b* may be dual polarized. In some examples, first element B 1204*b* may have opposite (e.g., mirrored) feed placement relative to first element A 1204*a*.

In this example, each of the second elements 1206*a-d* may include a respective radiator 1220*a-d*. In this example, radiator A 1220*a* of second element A 1206*a* may have a smaller size in x and/or y dimensions than second radiator A 1242*a* of third element A 1244*a*. Radiator A 1220*a* of second element A 1206*a* may be at a different height than first radiator A 1208*a* and/or second radiator A 1218*a* of first element A 1204*a*.

Radiator A 1220*a* may be connected to and/or coupled to first feed A 1222*a* and second feed A 1224*a* of second element A 1206*a*. Second elements B-D 1206*b-d* may each include respective radiators B-D 1220*b-d* connected to and/or coupled to respective first feeds B-D 1222*b-d* and respective second feeds B-D 1224*b-d*. First feed A 1222*a* of second element A 1206*a* may correspond to a first polarization and second feed A 1224*a* may correspond to a second polarization. Each of the second elements 1206*a-d* may be dual polarized. Second elements A-D 1206*a-d* may have similar feed placements. In the example of FIG. 12B, the respective second elements 1206*a-d* each show dotted lines representing metal dummies between the respective radiators 1220*a-d* (e.g., driven patch) and parasitic radiators (e.g., parasitic patches). In some examples, metal dummies may be disposed underneath the radiators 1220*a-d* or in between respective radiators 1220*a-d* and parasitic radiators without a significant negative effect on performance. If metal dummies are disposed beyond the edge of a radiator, the metal dummies may affect performance unless spaced away from the edge. In some examples, metal dummies may provide a loading effect that may reduce the radiator frequency of operation and/or may increase bandwidth in some cases. At a sufficient distance from radiators, metal dummies may not significantly decrease performance. While not visible in FIG. 12, metal dummies may therefore be disposed near an edge of the PCB. In some examples, each of the metal dummies is sized such that it does not radiate a significant amount of energy at an operating frequency of the respective element.

In this example, each of the third elements 1244*a-b* may include a respective first radiator 1232*a-b* and second radiator 1242*a-b*. In this example, first radiator A 1232*a* is larger than second radiator A 1242*a* in x and y dimensions. In this example, first radiator A 1232*a* is below (e.g., stacked with) second radiator A 1242*a* in the z dimension.

First radiator A 1232*a* may be connected to and/or coupled to first feed A 1234*a* and second feed A 1238*a*. Second radiator A 1242*a* may be connected to and/or coupled to third feed A 1236*a* and fourth feed 1240*a*. Third element B 1244*b* may include first radiator B 1232*b* connected to and/or coupled to first feed B 1234*b* and second feed B 1238*b*. Third element B 1244*b* may include second radiator B 1242*b* connected to and/or coupled to third feed B 1236*b* and fourth feed B 1240*b*. First feed A 1234*a* may correspond to a first polarization and second feed A 1238*a* may correspond to a second polarization. Third feed A 1236*a* may correspond to a second polarization and fourth feed A 1240*a* may correspond to a first polarization. Each of the third elements 1244*a-b* may be dual polarized. In some examples, third element B 1244*b* may have opposite (e.g., mirrored) feed placement relative to third element A 1244*a*.

First element A 1204*a* may include first radiator A 1208*a* and/or second radiator A 1218*a* embedded in material (e.g., support material and/or dielectric material). In some examples, two or more elements may be combined on a printed circuit board or may be separated. For instance, the material (e.g., support material and/or dielectric material) of first element A 1204*a* may be distanced from the material (e.g., support material and/or dielectric material) of second element A 1206*a*. In some examples, third element A 1244*a* and second element A 1206*a* may be combined on one printed circuit board. For instance, the material of third element A 1244*a* and second element A 1206*a* may be combined and/or included in one printed circuit board. Other elements (e.g., first element A 1204*a* and second element B 1206, first element B 1204*b* and second element C 1206*c*, and/or third element B 1244*b* and second element D 1206*d*) may be combined and/or included in one printed circuit board in some examples.

The second elements A-C 1206*a-c* may be interleaved with the first elements 1204*a-b*. First element A 1204*a* may have a larger size in the x dimension than second element A 1206*a*. Third elements A-B 1244*a-b* may have a larger size in the x dimension than second element A 1206*a*. First element A 1204*a* may have a similar size in the x dimension to third element A 1244*a*.

Each of the first elements 1204*a-b*, second elements 1206*a-d*, and third elements 1244*a-b* may be positioned on a base 1226. In some examples, each of the first elements 1204*a-b*, second elements 1206*a-d*, and/or third elements 1244*a-b* may be implemented as and/or included in a respective PCB that is assembled, soldered, and/or surface mounted on the base 1226 (e.g., a larger PCB). In some examples, the first elements 1204*a-b*, the second elements 1206*a-d*, and/or the third elements 1244*a-b* may be implemented in a single PCB that is mounted into the base 1226 (e.g., a larger PCB). In some examples, the antenna 1202 array may be implemented in a single (e.g., monolithic) PCB.

In some configurations, each of the first elements 1204*a-b* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 37-40 GHz band (e.g., n260), and/or a 39.5-43.5 GHz band (e.g., n259). In some examples, the second elements 1206*a-d* and/or the third elements 1244*a-b* may support a 47.2-48.2 GHz band (e.g., 48G band, n262). In some examples, one or more third bands may be supported by one or more third elements (e.g., third elements 1244*a-b*). For instance, a third band may include a 47.2-48.2 GHz band (e.g., 48G band, n262). In some examples, the third elements 1244*a-b* may support the first set of bands. In this example, the second set of bands may be mutually exclusive from the first set of bands. In this example, the first set of bands is lower in frequency than the second set of bands.

In some configurations, each of the second elements 1206*a-d* may be configured to support the second set of bands. For instance, each of the second elements 1206*a-d* may support the second set of bands that is also supported by the first elements 1204*a-b*. In some examples, each of the second elements 1206*a-d* may not support the first set of bands (e.g., may not transmit signals within the first set of bands and/or may not be utilized to receive signals within the first set of bands). In some examples, a number of elements (e.g., 4) for the first set of bands may be different from a number of elements (e.g., 6) for the second set of bands and/or for the third band. For instance, the antenna 1202 may provide a 1×4 element array for the first set of bands, may provide a 1×6 element array for the second set of bands, and may provide a 1×6 array for the third (e.g., 48G) band.

In this example, a first element spacing 1228 (e.g., 6.6 mm) for the first set of bands may be greater than a second element spacing 1230 (e.g., 3.3 mm) for the third band (e.g., 48G). For example, the first set of bands may be supported by the first elements 1204*a-b* and may not be supported by the second set of elements 1206*a-d*. Accordingly, the first element spacing 1228 for the first set of bands may be a distance between a center of third element A 1244*a* and a center of first element A 1204*a* and/or a distance between a center of first element A 1204*a* and a center of first element B 1204*b*. The first element spacing 1228 may range from approximately 0.53-0.65λ for the first set of bands, where λ is the signal wavelength. The second set of bands may be supported by each of the first elements 1204*a-b* and the second elements 1206*a-d*. A second element spacing 1230 for the third band (e.g., 48G) may be a distance between a center of third element A 1244*a* and a center of second element A 1206*a*. The second element spacing 1230 may be approximately 0.53λ for the 48G band. In this example, a third element spacing 1248 (e.g., 6.6 mm) may be used for the 48G band between the centers of the second elements 1206*a-d*. The third element spacing 1248 may be approximately 1.06λ for the 48G band. In this example, the first elements 1204*a-b* (for the first set of bands and the second set of bands), the second elements 1206*a-d* (for the second set of bands and/or the third band (e.g., 48G)), and the third elements 1244*a-b* (for the first set of bands and the third band) may support multiple bands by aperture sharing.

In some examples, second radiator A 1242*a* of third element A 1244*a* may be larger than radiator A 1220*a* of second element A 1206*a* because third element A 1244*a* includes first radiator A 1232*a* beneath second radiator A 1242*a*, while radiator A 1220*a* of second element A 1206*a* does not. For instance, first radiator A 1232*a* of third element A 1244*a* (e.g., a low band patch) may act as a ground plane for second radiator A 1242*a* (e.g., a high band patch). A radiator (e.g., patch) that is closer to a ground plane may be larger than a radiator (e.g., patch) that is further away from the ground plane in order to radiate at the same frequency. In the example illustrated in FIG. 12B, the elements have equal or approximately equal height. In some examples, elements that are combined on a PCB may have equal or approximately equal height.

Figure 13:
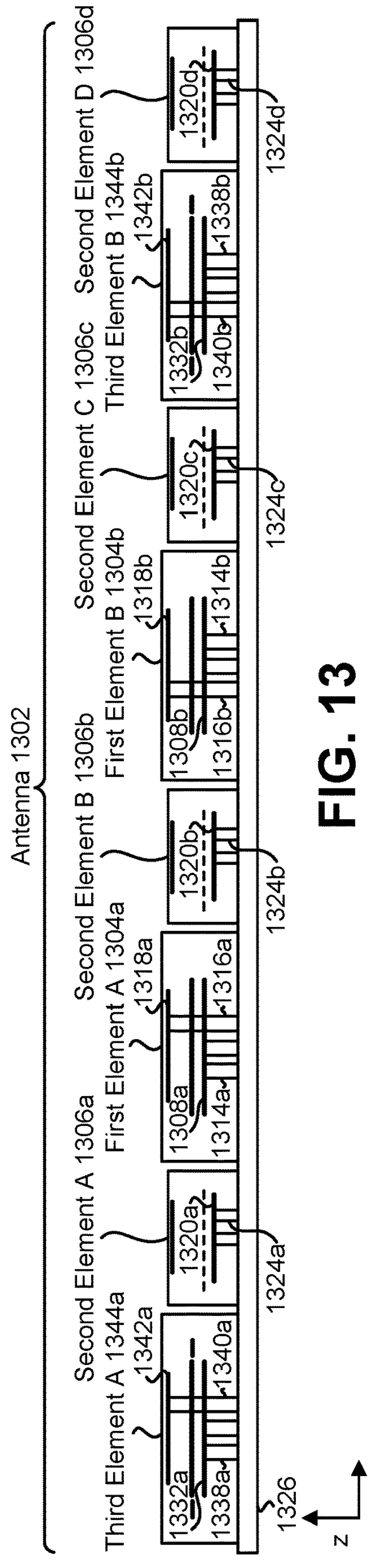
FIG. 13 is a diagram illustrating an elevation view of another example of an antenna in accordance with some of the configurations described herein.

FIG. 13 is a diagram illustrating an elevation view of another example of an antenna 1302 in accordance with some of the configurations described herein. The antenna 1302 and/or one or more components of the antenna 1302 may be examples of corresponding components described in relation to FIG. 1A and/or FIG. 1B. The antenna 1302 illustrated in FIG. 13 is an example of a multiband dual polarization aperture-shared interleaved antenna. FIG. 13 illustrates an alternate configuration of the antenna 1202 described in relation to FIG. 12A. For example, the components described in relation to FIG. 12A may be similar to the corresponding to components described in relation to FIG. 13. However, the components described in FIG. 13 may vary in one or more aspects relative to the components described in relation to FIG. 12B. For instance, some of the components of FIG. 13 may vary regarding the z (e.g., height) dimension.

As illustrated in FIG. 13, the elements may have different heights. For example, the second elements 1306*a-d* have a lesser height relative to the third elements 1344*a-b* and/or first elements 1304*a-b*. In some examples, some elements (e.g., elements supporting one or more higher bands) may have shorter heights, which may reduce probe length and increase performance.

The antenna 1302 may include a first plurality of first elements 1304*a-b*, a second plurality of second elements 1306*a-d*, and a third plurality of third elements 1344*a-b*. In this example, two first elements 1304*a-b*, four second elements 1306*a-d*, and two third elements 1344*a-b* are illustrated. In this example, the antenna 1302 has a length of 3.5 mm. Other dimensions may be utilized in other examples.

In this example, each of the first elements 1304*a-b* may include a respective first radiator 1308*a-b* and second radiator 1318*a-b*. In this example, first radiator A 1308*a* is larger than second radiator A 1318*a* in x and y dimensions. In this example, first radiator A 1308*a* is below (e.g., stacked with) second radiator A 1318*a* in the z dimension.

First radiator A 1308*a* may be connected to and/or coupled to first feed A (not shown) and second feed A 1314*a* of first element A 1304*a*. Second radiator A 1318*a* may be connected to and/or coupled to third feed A (not shown) and fourth feed 1316*a* of first element A 1304*a*. First element B 1304*b* may include a respective first radiator B 1308*b* connected to and/or coupled to respective first feed B (not shown) and respective second feed B 1314*b* of first element B 1304*b*. First element B 1304*b* may include a respective second radiator B 1318*b* connected to and/or coupled to respective third feed B (not shown) and respective fourth feed B 1316*b* of first element B 1304*b*. First feed A of first element A 1304*a* may correspond to a first polarization and second feed A 1314*a* may correspond to a second polarization. Third feed A of first element A 1304*a* may correspond to a second polarization and fourth feed A 1316*a* may correspond to a first polarization. Each of the first elements 1304*a-b* may be dual polarized. In some examples, first element B 1304*b* may have opposite (e.g., mirrored) feed placement relative to first element A 1304*a*.

In this example, each of the second elements 1306*a-d* may include a respective radiator 1320*a-d*. In this example, radiator A 1320*a* of second element A 1306*a* may have a smaller size in x and/or y dimensions than second radiator A 1342*a* of third element A 1344*a*. Radiator A 1320*a* of second element A 1306*a* may be at a different height than first radiator A 1308*a* and/or second radiator A 1318*a* of first element A 1304*a*.

Radiator A 1320*a* may be connected to and/or coupled to first feed A (not shown) and second feed A 1324*a* of second element A 1306*a*. Second elements B-D 1306*b-d* may each include respective radiators B-D 1320*b-d* connected to and/or coupled to respective first feeds B-D (not shown) and respective second feeds B-D 1324*b-d* of respective second elements B-D 1306*b-d*. First feed A of second element A 1306*a* may correspond to a first polarization and second feed A 1324*a* may correspond to a second polarization. Each of the second elements 1306*a-d* may be dual polarized. Second elements A-D 1306*a-d* may have similar feed placements.

In this example, each of the third elements 1344*a-b* may include a respective first radiator 1332*a-b* and second radiator 1342*a-b*. In this example, first radiator A 1332*a* is larger than second radiator A 1342*a* in x and y dimensions. In this example, first radiator A 1332*a* is below (e.g., stacked with) second radiator A 1342*a* in the z dimension.

First radiator A 1332*a* may be connected to and/or coupled to first feed A (not shown) and second feed A 1338*a* of third element A 1344*a*. Second radiator A 1342*a* may be connected to and/or coupled to third feed A (not shown) and fourth feed A 1340*a* of third element A 1344*a*. Third element B 1344*b* may include first radiator B 1332*b* connected to and/or coupled to first feed B (not shown) and second feed B 1338*b* of third element B 1344*b*. Third element B 1344*b* may include second radiator B 1342*b* connected to and/or coupled to third feed B (not shown) and fourth feed B 1340*b* of third element B 1344*b*. First feed A of third element A 1344*a* may correspond to a first polarization and second feed A 1338*a* may correspond to a second polarization. Third feed A of third element A 1344*a* may correspond to a second polarization and fourth feed A 1340*a* may correspond to a first polarization. Each of the third elements 1344*a-b* may be dual polarized. In some examples, third element B 1344*b* may have opposite (e.g., mirrored) feed placement relative to third element A 1344*a*.

First element A 1304*a* may include first radiator A 1308*a* and/or second radiator A 1318*a* embedded in material (e.g., support material and/or dielectric material). In some examples, two or more elements may be combined on a printed circuit board or may be separated. For instance, the material (e.g., support material and/or dielectric material) of first element A 1304*a* may be distanced from the material (e.g., support material and/or dielectric material) of second element A 1306*a*. In some examples, third element A 1344*a* and second element A 1306*a* may be combined on one printed circuit board. For instance, the material of third element A 1344*a* and second element A 1306*a* may be combined and/or included in one printed circuit board. Other elements (e.g., first element A 1304*a* and second element B 1306, first element B 1304*b* and second element C 1306*c*, and/or third element B 1344*b* and second element D 1306*d*) may be combined and/or included in one printed circuit board in some examples.

The second elements A-C 1306*a-c* may be interleaved with the first elements 1304*a-b*. First element A 1304*a* may have a larger size in the x dimension than second element A 1306*a*. Third elements A-B 1344*a-b* may have a larger size in the x dimension than second element A 1306*a*. First element A 1304*a* may have a similar size in the x dimension to third element A 1344*a*.

Each of the first elements 1304*a-b*, second elements 1306*a-d*, and third elements 1344*a-b* may be positioned on a base 1326. In some examples, each of the first elements 1304*a-b*, second elements 1306*a-d*, and/or third elements 1344*a-b* may be implemented as and/or included in a respective PCB that is assembled, soldered, and/or surface mounted on the base 1326 (e.g., a larger PCB). In some examples, the first elements 1304*a-b*, the second elements

1306*a-d*, and/or the third elements 1344*a-b* may be implemented in a single PCB that is mounted into the base 1326 (e.g., a larger PCB). In some examples, the antenna 1302 array may be implemented in a single (e.g., monolithic) PCB.

In some examples, the first elements 1304*a-b*, the second elements 1306*a-d*, and/or the third elements 1344*a-b* may be configured to support bands as described in relation to FIG. 12A or may be different. In some examples, element spacing may be implemented as described in relation to FIG. 12A or may be different. In some examples, the antenna 1302 may support aperture sharing as described in relation to FIG. 12A. In some examples, one or more aspects of the antenna 1302 may be implemented as similarly described in relation to FIG. 12A.

Figure 14A:
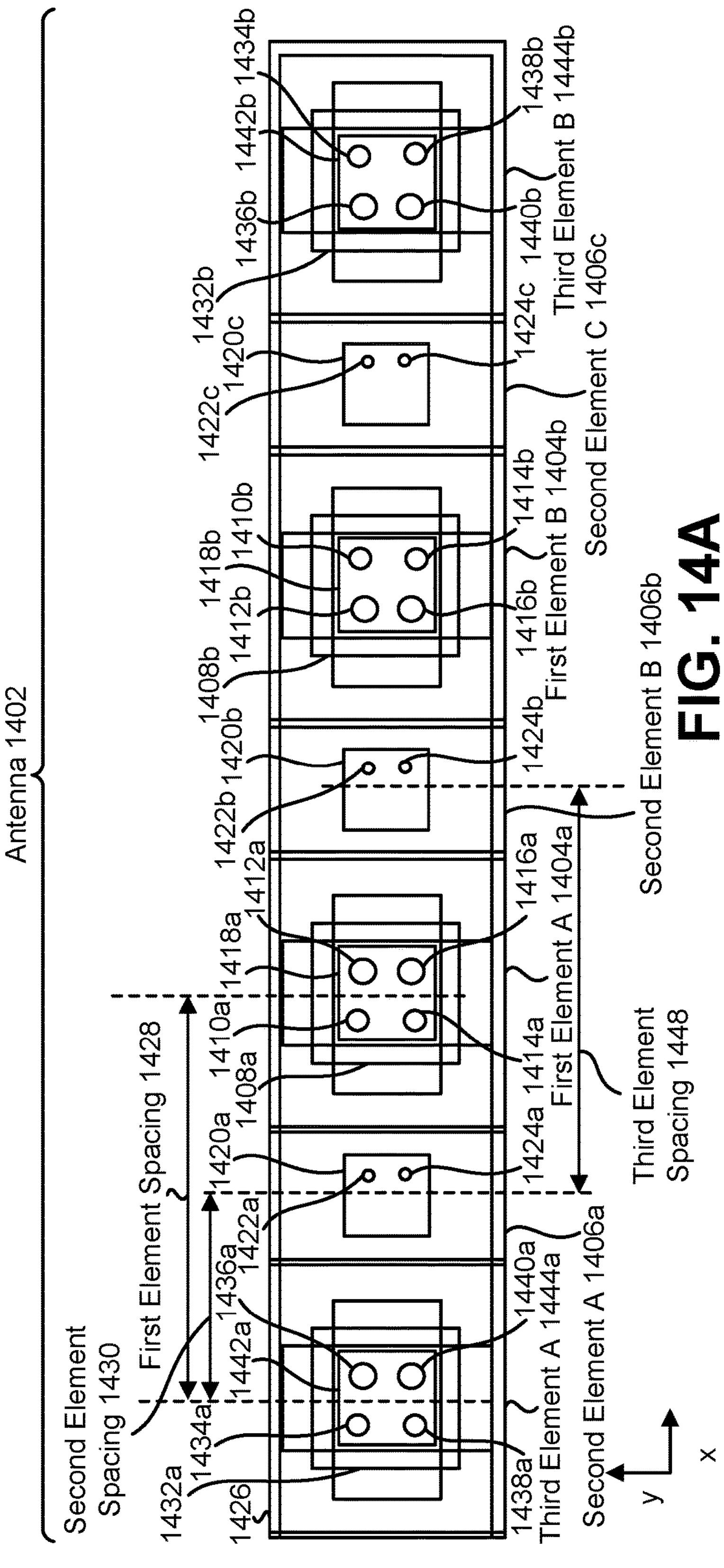
FIG. 14A is a diagram illustrating a top view of another example of an antenna in accordance with some of the configurations described herein.
Figure 14B:
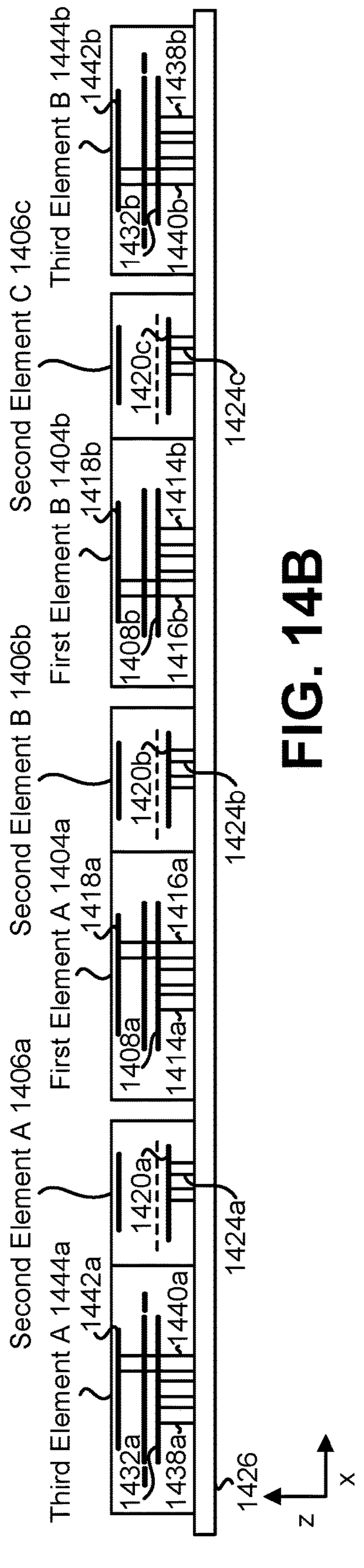
FIG. 14B is a diagram illustrating an elevation view of the antenna of FIG. 14A.

FIG. 14A is a diagram illustrating a top view of another example of an antenna 1402 in accordance with some of the configurations described herein. FIG. 14B is a diagram illustrating an elevation view of the antenna 1402 of FIG. 14A. FIG. 14A and FIG. 14B will be described together. The antenna 1402 and/or one or more components of the antenna 1402 may be examples of corresponding components described in relation to FIG. 1A and/or FIG. 1B. The antenna 1402 illustrated in FIG. 14A is an example of a multiband dual polarization aperture-shared interleaved antenna.

The antenna 1402 may include a first plurality of first elements 1404*a-b*, a second plurality of second elements 1406*a-c*, and a third plurality of third elements 1444*a-b*. In this example, two first elements 1404*a-b*, three second elements 1406*a-c*, and two third elements 1444*a-b* are illustrated. In this example, the antenna 1402 has a length of 3.5 mm. In this example, the antenna 1402 has a width of 25 mm. Other dimensions may be utilized in other examples.

In this example, each of the first elements 1404*a-b* may include a respective first radiator 1408*a-b* and second radiator 1418*a-b*. In this example, first radiator A 1408*a* is larger than second radiator A 1418*a* in x and y dimensions. In this example, first radiator A 1408*a* is below (e.g., stacked with) second radiator A 1418*a* in the z dimension.

First radiator A 1408*a* may be connected to and/or coupled to first feed A 1410*a* and second feed A 1414*a*. Second radiator A 1418*a* may be connected to and/or coupled to third feed A 1412*a* and fourth feed A 1416*a*. First element B 1404*b* may include a respective first radiator B 1408*b* connected to and/or coupled to respective first feed B 1410*b* and respective second feed B 1414*b*. First element B 1404*b* may include a respective second radiator B 1418*b* connected to and/or coupled to respective third feed B 1412*b* and respective fourth feed B 1416*b*. First feed A 1410*a* may correspond to a first polarization and second feed A 1414*a* may correspond to a second polarization. Third feed A 1412*a* may correspond to a second polarization and fourth feed A 1416*a* may correspond to a first polarization. Each of the first elements 1404*a-b* may be dual polarized. In some examples, first element B 1404*b* may have opposite (e.g., mirrored) feed placement relative to first element A 1404*a*.

In this example, each of the second elements 1406*a-c* may include a respective radiator 1420*a-c*. In this example, radiator A 1420*a* of second element A 1406*a* may have a smaller size in x and/or y dimensions than second radiator A 1442*a* of third element A 1444*a*. Radiator A 1420*a* of second element A 1406*a* may be at a different height than first radiator A 1408*a* and/or second radiator A 1418*a* of first element A 1404*a*.

Radiator A 1420*a* may be connected to and/or coupled to first feed A 1422*a* and second feed A 1424*a* of second element A 1406*a*. Second elements B-C 1406*b-c* may each include respective radiators B-C 1420*b-c* connected to and/or coupled to respective first feeds B-C 1422*b-c* and respective second feeds B-C 1424*b-c*. First feed A 1422*a* of second element A 1406*a* may correspond to a first polarization and second feed A 1424*a* may correspond to a second polarization. Each of the second elements 1406*a-c* may be dual polarized. Second elements A-C 1406*a-c* may have similar feed placements. In the example of FIG. 14B, the respective second elements 1406*a-c* each show dotted lines representing metal dummies between the respective radiators 1420*a-c* (e.g., driven patch) and parasitic radiators (e.g., parasitic patches). In some examples, metal dummies may be disposed underneath the radiators 1420*a-c* or in between respective radiators 1420*a-c* and parasitic radiators without a significant negative effect on performance. If metal dummies are disposed beyond the edge of a radiator, the metal dummies may affect performance unless spaced away from the edge. In some examples, metal dummies may provide a loading effect that may reduce the radiator frequency of operation and/or may increase bandwidth in some cases. At a sufficient distance from radiators, metal dummies may not significantly decrease performance. While not visible in FIG. 14, metal dummies may therefore be disposed near an edge of the PCB. In some examples, each of the metal dummies is sized such that it does not radiate a significant amount of energy at an operating frequency of the respective element.

In this example, each of the third elements 1444*a-b* may include a respective first radiator 1432*a-b* and second radiator 1442*a-b*. In this example, first radiator A 1432*a* is larger than second radiator A 1442*a* in x and y dimensions. In this example, first radiator A 1432*a* is below (e.g., stacked with) second radiator A 1442*a* in the z dimension.

First radiator A 1432*a* may be connected to and/or coupled to first feed A 1434*a* and second feed A 1438*a*. Second radiator A 1442*a* may be connected to and/or coupled to third feed A 1436*a* and fourth feed A 1440*a*. Third element B 1444*b* may include first radiator B 1432*b* connected to and/or coupled to first feed B 1434*b* and second feed B 1438*b*. Third element B 1444*b* may include second radiator B 1442*b* connected to and/or coupled to third feed B 1436*b* and fourth feed B 1440*b*. First feed A 1434*a* may correspond to a first polarization and second feed A 1438*a* may correspond to a second polarization. Third feed A 1436*a* may correspond to a second polarization and fourth feed A 1440*a* may correspond to a first polarization. Each of the third elements 1444*a-b* may be dual polarized. In some examples, third element B 1444*b* may have opposite (e.g., mirrored) feed placement relative to third element A 1444*a*.

First element A 1404*a* may include first radiator A 1408*a* and/or second radiator A 1418*a* embedded in material (e.g., support material and/or dielectric material). In some examples, two or more elements may be combined on a printed circuit board or may be separated. For instance, the material (e.g., support material and/or dielectric material) of first element A 1404*a* may be distanced from the material (e.g., support material and/or dielectric material) of second element A 1406*a*. In some examples, third element A 1444*a* and second element A 1406*a* may be combined on one printed circuit board. For instance, the material of third element A 1444*a* and second element A 1406*a* may be combined and/or included in one printed circuit board. Other elements (e.g., first element A 1404*a* and second element B 1406, and/or first element B 1404*b* and second element C 1406*c*) may be combined and/or included in one printed circuit board in some examples.

The second elements A-C 1406*a-c* may be interleaved with the first elements 1404*a-b*. First element A 1404*a* may have a larger size in the x dimension than second element A 1406*a*. Third elements A-B 1444*a-b* may have a larger size in the x dimension than second element A 1406*a*. First element A 1404*a* may have a similar size in the x dimension to third element A 1444*a*.

Each of the first elements 1404*a-b*, second elements 1406*a-c*, and third elements 1444*a-b* may be positioned on a base 1426. In some examples, each of the first elements 1404*a-b*, second elements 1406*a-c*, and/or third elements 1444*a-b* may be implemented as and/or included in a respective PCB that is assembled, soldered, and/or surface mounted on the base 1426 (e.g., a larger PCB). In some examples, the first elements 1404*a-b*, the second elements 1406*a-c*, and/or the third elements 1444*a-b* may be implemented in a single PCB that is mounted into the base 1426 (e.g., a larger PCB). In some examples, the antenna 1402 array may be implemented in a single (e.g., monolithic) PCB.

In some configurations, each of the first elements 1404*a-b* may be configured to support a first set of bands and a second set of bands. In this example, the first set of bands includes a 24.25-27.5 GHz band (e.g., n258), 26.5-29.5 GHz band (e.g., n257), and/or 27.5-28.35 GHz band (e.g., n261). In this example, the second set of bands includes a 37-40 GHz band (e.g., n260), and/or a 39.5-43.5 GHz band (e.g., n259). In some examples, the second elements 1406*a-c* and/or the third elements 1444*a-b* may support a 47.2-48.2 GHz band (e.g., 48G band, n262). In some examples, one or more third bands may be supported by one or more third elements (e.g., third elements 1444*a-b*). For instance, a third band may include a 47.2-48.2 GHz band (e.g., 48G band, n262). In some examples, the third elements 1444*a-b* may support the first set of bands. In this example, the second set of bands may be mutually exclusive from the first set of bands. In this example, the first set of bands is lower in frequency than the second set of bands.

In some configurations, each of the second elements 1406*a-c* may be configured to support the second set of bands. For instance, each of the second elements 1406*a-c* may support the second set of bands that is also supported by the first elements 1404*a-b*. In some examples, each of the second elements 1406*a-c* may not support the first set of bands (e.g., may not transmit signals within the first set of bands and/or may not be utilized to receive signals within the first set of bands). In some examples, a number of elements (e.g., 4) for the first set of bands may be different from a number of elements (e.g., 5) for the second set of bands and/or for the third band. For instance, the antenna 1402 may provide a 1×4 element array for the first set of bands, may provide a 1×5 element array for the second set of bands, and may provide a 1×5 array for the third (e.g., 48G) band.

In this example, a first element spacing 1428 (e.g., 6.6 mm) for the first set of bands may be greater than a second element spacing 1430 (e.g., 3.3 mm) for the third band (e.g., 48G). For example, the first set of bands may be supported by the first elements 1404*a-b* and may not be supported by the second set of elements 1406*a-c*. Accordingly, the first element spacing 1428 for the first set of bands may be a distance between a center of third element A 1444*a* and a center of first element A 1404*a* and/or a distance between a center of first element A 1404*a* and a center of first element B 1404*b*. The first element spacing 1428 may range from approximately 0.53-0.65λ for the first set of bands, where λ is the signal wavelength. The second set of bands may be supported by each of the first elements 1404*a-b* and the second elements 1406*a-c*. A second element spacing 1430 for the third band (e.g., 48G) may be a distance between a center of third element A 1444*a* and a center of second element A 1406*a*. The second element spacing 1430 may be approximately 0.53λ for the 48G band. In this example, a third element spacing 1448 (e.g., 6.6 mm) may be used for the 48G band between the centers of the second elements 1406*a-c*. The third element spacing 1448 may be approximately 1.06λ for the 48G band. In this example, the first elements 1404*a-b* (for the first set of bands and the second set of bands), the second elements 1406*a-c* (for the second set of bands and/or the third band (e.g., 48G)), and the third elements 1444*a-b* (for the first set of bands and the third band) may support multiple bands by aperture sharing.

In some examples, second radiator A 1442*a* of third element A 1444*a* may be larger than radiator A 1420*a* of second element A 1406*a* because third element A 1444*a* includes first radiator A 1432*a* beneath second radiator A 1442*a*, while radiator A 1420*a* of second element A 1406*a* does not. For instance, first radiator A 1432*a* of third element A 1444*a* (e.g., a low band patch) may act as a ground plane for second radiator A 1442*a* (e.g., a high band patch). A radiator (e.g., patch) that is closer to a ground plane may be larger than a radiator (e.g., patch) that is further away from the ground plane in order to radiate at the same frequency. In the example illustrated in FIG. 14B, the elements have equal or approximately equal height. In some examples, elements that are combined on a PCB may have equal or approximately equal height.

Figure 15:
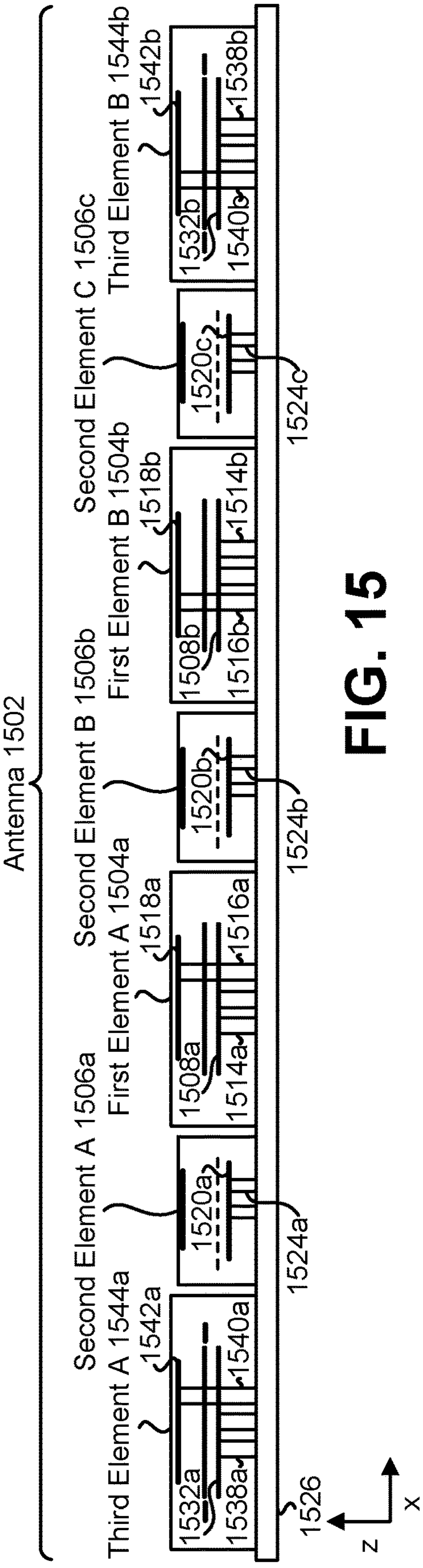
FIG. 15 is a diagram illustrating an elevation view of another example of an antenna in accordance with some of the configurations described herein.

FIG. 15 is a diagram illustrating an elevation view of another example of an antenna 1502 in accordance with some of the configurations described herein. The antenna 1502 and/or one or more components of the antenna 1502 may be examples of corresponding components described in relation to FIG. 1A and/or FIG. 1B. The antenna 1502 illustrated in FIG. 15 is an example of a multiband dual polarization aperture-shared interleaved antenna. FIG. 15 illustrates an alternate configuration of the antenna 1402 described in relation to FIG. 14A. For example, the components described in relation to FIG. 14A may be similar to the corresponding to components described in relation to FIG. 15. However, the components described in FIG. 15 may vary in one or more aspects relative to the components described in relation to FIG. 14B. For instance, some of the components of FIG. 15 may vary regarding the z (e.g., height) dimension.

As illustrated in FIG. 15, the elements may have different heights. For example, the second elements 1506*a-c* have a lesser height relative to the third elements 1544*a-b* and/or first elements 1504*a-b*. In some examples, some elements (e.g., elements supporting one or more higher bands) may have shorter heights, which may reduce probe length and increase performance.

The antenna 1502 may include a first plurality of first elements 1504*a-b*, a second plurality of second elements 1506*a-c*, and a third plurality of third elements 1544*a-b*. In this example, two first elements 1504*a-b*, three second elements 1506*a-c*, and two third elements 1544*a-b* are illustrated. In this example, the antenna 1502 has a length of 3.5 mm. Other dimensions may be utilized in other examples.

In this example, each of the first elements 1504*a-b* may include a respective first radiator 1508*a-b* and second radiator 1518*a-b*. In this example, first radiator A 1508*a* is larger than second radiator A 1518*a* in x and y dimensions. In this example, first radiator A 1508*a* is below (e.g., stacked with) second radiator A 1518*a* in the z dimension.

First radiator A 1508*a* may be connected to and/or coupled to first feed A (not shown) and second feed A 1514*a* of first element A 1504*a*. Second radiator A 1518*a* may be connected to and/or coupled to third feed A (not shown) and fourth feed A 1516*a* of first element A 1504*a*. First element B 1504*b* may include a respective first radiator B 1508*b* connected to and/or coupled to respective first feed B (not shown) and respective second feed B 1514*b* of first element B 1504*b*. First element B 1504*b* may include a respective second radiator B 1518*b* connected to and/or coupled to respective third feed B (not shown) and respective fourth feed B 1516*b* of first element B 1504*b*. First feed A of first element A 1504*a* may correspond to a first polarization and second feed A 1514*a* may correspond to a second polarization. Third feed A of first element A 1504*a* may correspond to a second polarization and fourth feed A 1516*a* may correspond to a first polarization. Each of the first elements 1504*a-b* may be dual polarized. In some examples, first element B 1504*b* may have opposite (e.g., mirrored) feed placement relative to first element A 1504*a*.

In this example, each of the second elements 1506*a-c* may include a respective radiator 1520*a-c*. In this example, radiator A 1520*a* of second element A 1506*a* may have a smaller size in x and/or y dimensions than second radiator A 1542*a* of third element A 1544*a*. Radiator A 1520*a* of second element A 1506*a* may be at a different height than first radiator A 1508*a* and/or second radiator A 1518*a* of first element A 1504*a*.

Radiator A 1520*a* may be connected to and/or coupled to first feed A (not shown) and second feed A 1524*a* of second element A 1506*a*. Second elements B-C 1506*b-c* may each include respective radiators B-C 1520*b-c* connected to and/or coupled to respective first feeds B-C (not shown) and respective second feeds B-C 1524*b-c* of respective second elements B-C 1506*b-c*. First feed A of second element A 1506*a* may correspond to a first polarization and second feed A 1524*a* may correspond to a second polarization. Each of the second elements 1506*a-c* may be dual polarized. Second elements A-D 1506*a-c* may have similar feed placements.

In this example, each of the third elements 1544*a-b* may include a respective first radiator 1532*a-b* and second radiator 1542*a-b*. In this example, first radiator A 1532*a* is larger than second radiator A 1542*a* in x and y dimensions. In this example, first radiator A 1532*a* is below (e.g., stacked with) second radiator A 1542*a* in the z dimension.

First radiator A 1532*a* may be connected to and/or coupled to first feed A (not shown) and second feed A 1538*a* of third element A 1544*a*. Second radiator A 1542*a* may be connected to and/or coupled to third feed A (not shown) and fourth feed A 1540*a* of third element A 1544*a*. Third element B 1544*b* may include first radiator B 1532*b* connected to and/or coupled to first feed B (not shown) and second feed B 1538*b* of third element B 1544*b*. Third element B 1544*b* may include second radiator B 1542*b* connected to and/or coupled to third feed B (not shown) and fourth feed B 1540*b* of third element B 1544*b*. First feed A of third element A 1544*a* may correspond to a first polarization and second feed A 1538*a* may correspond to a second polarization. Third feed A of third element A 1544*a* may correspond to a second polarization and fourth feed A 1540*a* may correspond to a first polarization. Each of the third elements 1544*a-b* may be dual polarized. In some examples, third element B 1544*b* may have opposite (e.g., mirrored) feed placement relative to third element A 1544*a*.

First element A 1504*a* may include first radiator A 1508*a* and/or second radiator A 1518*a* embedded in material (e.g., support material and/or dielectric material). In some examples, two or more elements may be combined on a printed circuit board or may be separated. For instance, the material (e.g., support material and/or dielectric material) of first element A 1504*a* may be distanced from the material (e.g., support material and/or dielectric material) of second element A 1506*a*. In some examples, third element A 1544*a* and second element A 1506*a* may be combined on one printed circuit board. For instance, the material of third element A 1544*a* and second element A 1506*a* may be combined and/or included in one printed circuit board. Other elements (e.g., first element A 1504*a* and second element B 1506, and/or first element B 1504*b* and second element C 1506*c*) may be combined and/or included in one printed circuit board in some examples.

The second elements A-C 1506*a-c* may be interleaved with the first elements 1504*a-b*. First element A 1504*a* may have a larger size in the x dimension than second element A 1506*a*. Third elements A-B 1544*a-b* may have a larger size in the x dimension than second element A 1506*a*. First element A 1504*a* may have a similar size in the x dimension to third element A 1544*a*.

Each of the first elements 1504*a-b*, second elements 1506*a-c*, and third elements 1544*a-b* may be positioned on a base 1526. In some examples, each of the first elements 1504*a-b*, second elements 1506*a-c*, and/or third elements 1544*a-b* may be implemented as and/or included in a respective PCB that is assembled, soldered, and/or surface mounted on the base 1526 (e.g., a larger PCB). In some examples, the first elements 1504*a-b*, the second elements 1506*a-c*, and/or the third elements 1544*a-b* may be implemented in a single PCB that is mounted into the base 1526 (e.g., a larger PCB). In some examples, the antenna 1502 array may be implemented in a single (e.g., monolithic) PCB.

In some examples, the first elements 1504*a-b*, the second elements 1506*a-c*, and/or the third elements 1544*a-b* may be configured to support bands as described in relation to FIG. 14A or may be different. In some examples, element spacing may be implemented as described in relation to FIG. 14A or may be different. In some examples, the antenna 1502 may support aperture sharing as described in relation to FIG. 14A. In some examples, one or more aspects of the antenna 1502 may be implemented as similarly described in relation to FIG. 14A.

Figure 16:
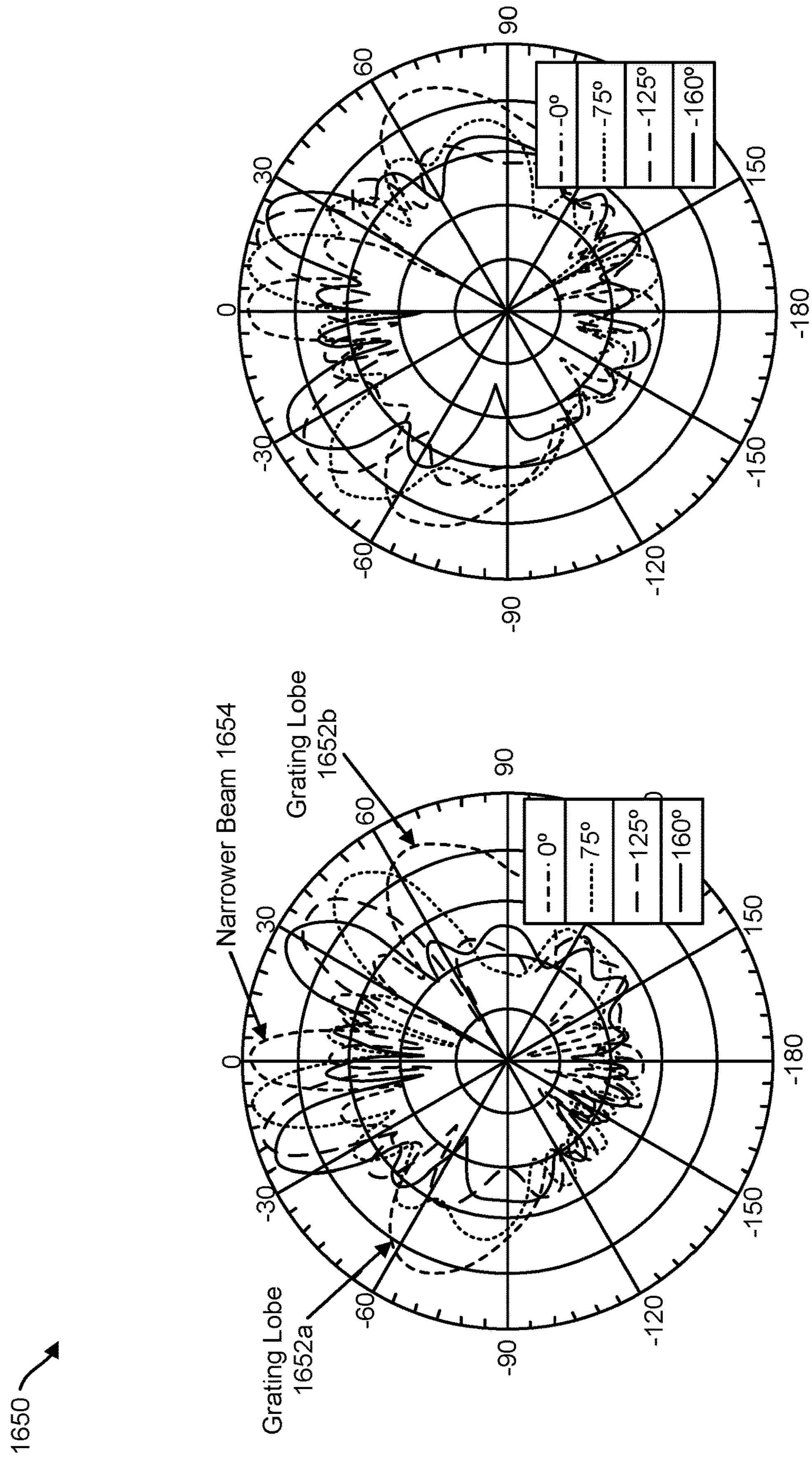
FIG. 16 is a diagram illustrating examples of scanning performance for a band.

FIG. 16 is a diagram illustrating examples of scanning performance for a band. For instance, FIG. 16 illustrates plots 1650 of gain relative to angle for the 48G band (at 48.2 GHz) for the example of the antenna 702 described in relation to FIG. 7A and FIG. 7B (e.g., 1×4(8) element array). As illustrated in FIG. 16, the scanning performance for the 48G band was good even with the grating lobes 1652*a-b* and narrower boresight beam 1654 caused by the arrangement of the antenna 702 (e.g., approximate 1.06λ spacing) described in relation to FIG. 7A and FIG. 7B. For instance, grating lobes with ±45 degree coverage (or other ranges of coverage) may be achieved in accordance with some of the techniques described herein. The plots 1650 illustrate gain for different polarizations for the 48G band. For instance, the first plot (on the left) illustrates magnitude (in dB) over angle for progressive phases 0, 75, 125, and 160 degrees. For instance, the second plot (on the right) illustrates magnitude (in dB) over angle for progressive phases 0, −75, −125, and −160 degrees.

Figure 17:
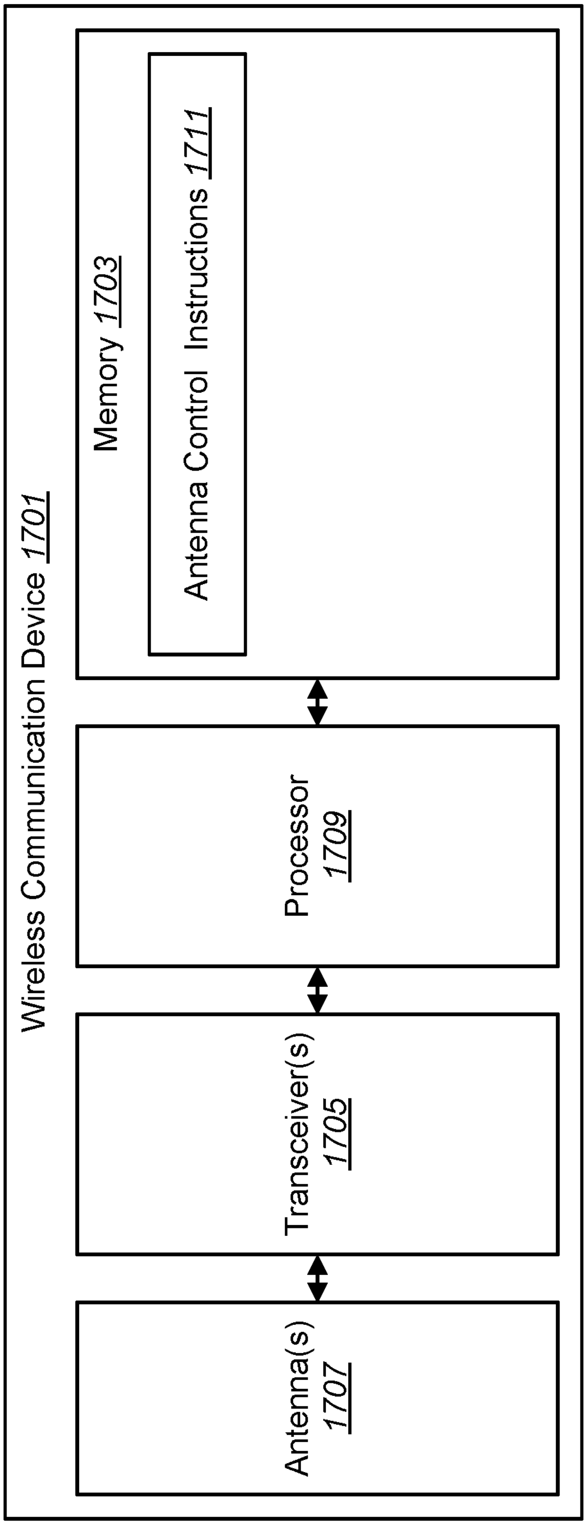
FIG. 17 is a diagram illustrating an example of a wireless communication device in which one or more multiband antennas may be implemented.

FIG. 17 is a diagram illustrating an example of a wireless communication device 1701 in which one or more multi-band antennas may be implemented. The wireless communication device 1701 may be a device or apparatus for transmitting and/or receiving RF signals. Examples of the wireless communication device 1701 may include user equipments (UEs), smartphones, tablet devices, computing devices, computers (e.g., desktop computers, laptop computers, etc.), televisions, cameras, virtual reality devices (e.g., headsets), vehicles (e.g., semi-autonomous vehicles, autonomous vehicles, etc.), robots, aircraft, drones, unmanned aerial vehicles (UAVs), healthcare equipment, gaming consoles, Internet of Things (IoT) devices, etc. The wireless communication device 1701 may include one or more components or elements. One or more of the components or elements may be implemented in hardware (e.g., circuitry) or a combination of hardware and instructions (e.g., a processor with software stored in memory).

In some configurations, the wireless communication device 1701 may include a processor 1709, a memory 1703, one or more transceivers 1705, and/or one or more antennas 1707. The antenna(s) 1707 may be and/or include one or more of the antennas 102, 202, 302, 502, 602, 702, 802, 902, 1002, 1102, 1202, 1302, 1402, 1502 described herein. In some configurations, the wireless communication device 1701 may include one or more other components and/or elements. For example, the wireless communication device 1701 may include a display (e.g., touchscreen). The processor 1709 may be integrated circuitry configured to perform one or more functions. In some configurations, the processor 1709 may execute instructions to perform the one or more functions. In some configurations, the processor 1709 may include one or more functionalities that are structurally implemented in the processor 1709. In some configurations, the processor 1709 may be a baseband processor, a modem, a modem processor, an application processor, and/or any combination thereof. The processor 1709 may be coupled to (e.g., in electronic communication with) the memory 1703 and/or transceiver(s) 1705. In some examples, the wireless communication device 1701 and/or the processor 1709 may be configured to perform one or more of the methods 1800, procedures, functions, operations, etc., described in relation to one or more of the Figures.

The memory 1703 may store instructions and/or data. The processor 1709 may access (e.g., read from and/or write to) the memory 1703. Examples of instructions and/or data that may be stored by the memory 1703 may include antenna control instructions 1711 and/or instructions for other elements, etc.

The transceiver(s) 1705 may enable the wireless communication device 1701 to communicate with one or more other electronic devices. For example, the transceiver(s) 1705 may provide an interface for wireless communications. In some configurations, the transceiver 1705 may be coupled to antenna(s) 1707 for transmitting and/or receiving radio frequency (RF) signals. For example, the transceiver 1705 may enable one or more modes of wireless (e.g., cellular, wireless local area network (WLAN), personal area network (PAN), etc.) communication. The transceiver(s) 1705 may include one or more transmitters and/or one or more receivers. In some configurations, the transceiver(s) 1705 may be included in an RF front-end or RFIC and/or may include an RF front-end or RFIC. In some configurations, the transceiver(s) 1705 may include one or more switches, one or more filters, one or more power amplifiers, one or more downconverters, and/or one or more upconverters, etc., to enable wireless communication.

In some configurations, multiple transceivers 1705 may be implemented and/or utilized. For example, one or more transceivers 1705 may be utilized for cellular (e.g., 3G, Long Term Evolution (LTE), Code Division Multiple Access (CDMA), 5G, etc.) communications, and/or one or more transceivers 1705 may be utilized for wireless local area network (WLAN) (e.g., Institute of Electrical and Electronics Engineers (IEEE) 802.11) communications. In some configurations, the transceiver(s) 1705 may send information (e.g., uplink packets, uplink control information, etc.) to and/or receive information (e.g., downlink packets, downlink control information, etc.) from one or more devices (e.g., base station, evolved NodeB (eNodeB), next generation NodeB (gNB), etc.). In some examples, one or more network devices (e.g., base stations, access points, wireless communication devices, etc.) may send packets to the wireless communication device 1701.

In some configurations, the memory 1703 may include antenna control instructions 1711. The antenna control instructions 1711 may be instructions for controlling the antenna(s) 1707. For example, the processor 1709 may execute the antenna control instructions 1711 to schedule one or more transmissions and/or reception on a band or bands supported by the antenna(s) 1707. For instance, the processor 1709 may select a band or bands for the transmission(s) and/or reception. The processor 1709 may activate and/or deactivate an element or elements of the antenna(s) 1707 for the transmission and/or reception based on the selected band(s). The processor 1709 may send signals to the antenna(s) 1707 for transmission via the transceiver(s) 1705 and/or may receive signal(s) from the antenna(s) 1707 based on the selected band(s).

In some configurations, the transceiver(s) 1705 may additionally or alternatively perform antenna control. For instance, the transceiver(s) 1705 may select a band or bands for the transmission(s) and/or reception. The transceiver(s) 1705 may activate and/or deactivate an element or elements of the antenna(s) 1707 for the transmission and/or reception based on the transmission band(s). The transceiver(s) 1705 may send signals to the antenna(s) 1707 for transmission and/or may receive signal(s) via the transceiver(s) 1705.

In some configurations, the wireless communication device 1701 may include one or more elements that are not shown in FIG. 17. For example, the wireless communication device 1701 may include one or more displays. A display may be a screen or panel for presenting images. In some examples, the display(s) may be implemented with one or more display technologies, such as liquid crystal display (LCD), light-emitting diode (LED), organic light-emitting diode (OLED), plasma, cathode ray tube (CRT), etc. The display(s) may present content. Examples of content may include one or more interactive controls, graphics, symbols, characters, etc.

The display(s) may be integrated into the wireless communication device 1701 or may be linked to the wireless communication device 1701. In some examples, the display(s) may be a monitor with a desktop computer, a display on a laptop, a touch screen on a tablet device, an OLED panel in a smartphone, etc. In another example, the wireless communication device 1701 may be a virtual reality headset with integrated displays. In another example, the wireless communication device 1701 may be a computer that is coupled to a virtual reality headset with the displays.

In some configurations, the wireless communication device 1701 may present a user interface on the display. For example, the user interface may enable a user to interact with the wireless communication device 1701. In some configurations, the display may be a touchscreen that receives input from physical touch (by a finger, stylus, or other tool, for example). Additionally or alternatively, the wireless communication device 1701 may include or be coupled to another input interface. For example, the wireless communication device 1701 may include a camera and may detect user gestures (e.g., hand gestures, arm gestures, eye tracking, eyelid blink, etc.). In another example, the wireless communication device 1701 may be linked to a mouse and may detect a mouse click. In another example, the wireless communication device 1701 may be linked to a keyboard and may detect keyboard input. In another example, the wireless communication device 1701 may be linked to one or more other controllers (e.g., game controllers, joy sticks, touch pads, motion sensors, etc.) and may detect input from the one or more controllers. In some examples, the wireless communication device 1701 may utilize input received with the input interface to select a band or bands for transmission and/or reception using the antenna(s) 1707.

Figure 18:
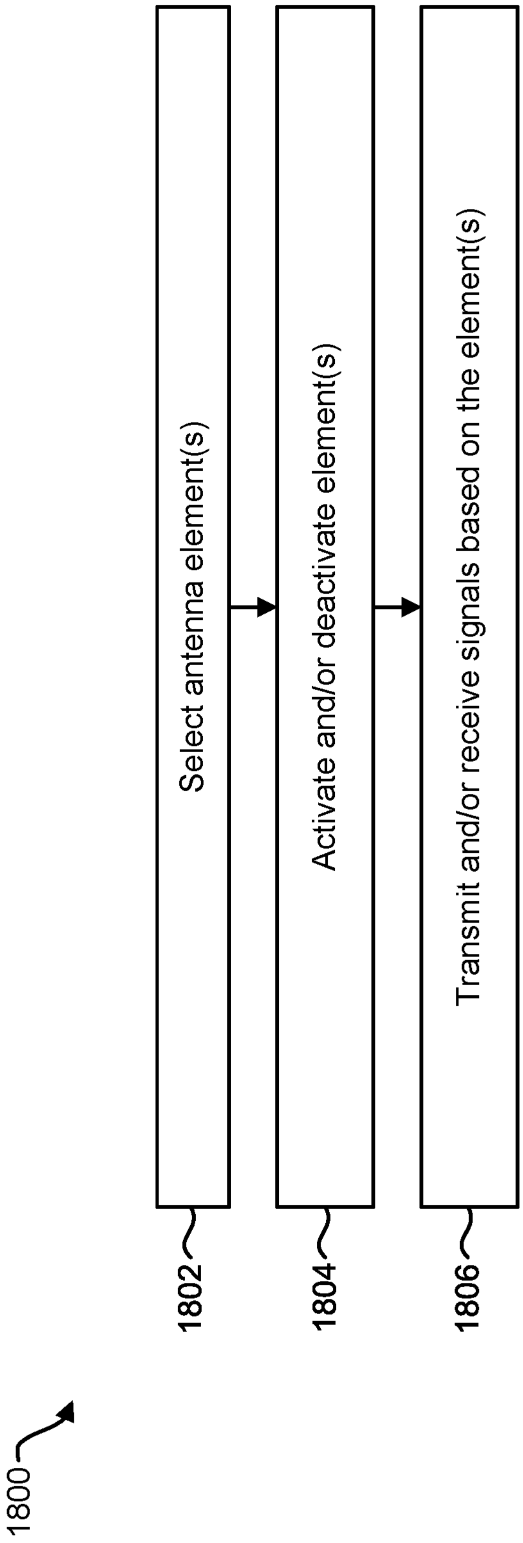
FIG. 18 is a flow diagram illustrating an example of a method for controlling one or more multiband antennas.

FIG. 18 is a flow diagram illustrating an example of a method 1800 for controlling one or more multiband antennas. In some examples, the method 1800 may be performed by a wireless communication device (e.g., the wireless communication device 1701 described in relation to FIG. 17). In some examples, the method 1800 may be performed with one or more of the antennas 102, 202, 302, 502, 602, 702, 802, 902, 1002, 1102, 1202, 1302, 1402, 1502 described herein A wireless communication device may select 1802 one or more antenna elements. This may be accomplished as described above in relation to FIG. 17 in some configurations. For example, the wireless communication device may select the antenna element(s) according to scheduled transmission and/or reception for one or more bands.

The wireless communication device may activate and/or deactivate 1804 one or more elements. For instance, the wireless communication device (e.g., processor and/or transceiver) may activate one or more selected elements and/or may deactivate one or more unselected elements. This may be accomplished as described in relation to FIG. 17 in some configurations.

The wireless communication device may transmit and/or receive 1806 one or more signals based on the element(s). This may be accomplished as described in relation to FIG. 17 in some configurations. For example, the wireless communication device (e.g., transceiver and/or processor) may provide signals to the selected (e.g., activated) element(s) for transmission and/or may receive signals from the selected (e.g., activated) element(s).

In some examples, a first signal may be transmitted in two polarizations in one of a first set of bands from a first element of a first plurality of first elements. Each of the first elements may be configured to support the first set of bands and a second set of bands that is mutually exclusive from the first set of bands. In some examples, a second signal may be transmitted in two polarizations in one of the second set of bands from a second element of a second plurality of second elements. Each of the second elements may be configured to support the second set of bands. The second plurality of second elements may be interleaved with the first plurality of first elements. In some examples, a third signal may be transmitted in two polarizations in a third band from a third element of a third plurality of third elements. Each of the third elements may be configured to support the first set of bands and the third band. In some examples, the third band may include frequencies of approximately 48 GHz.

Figure 19:
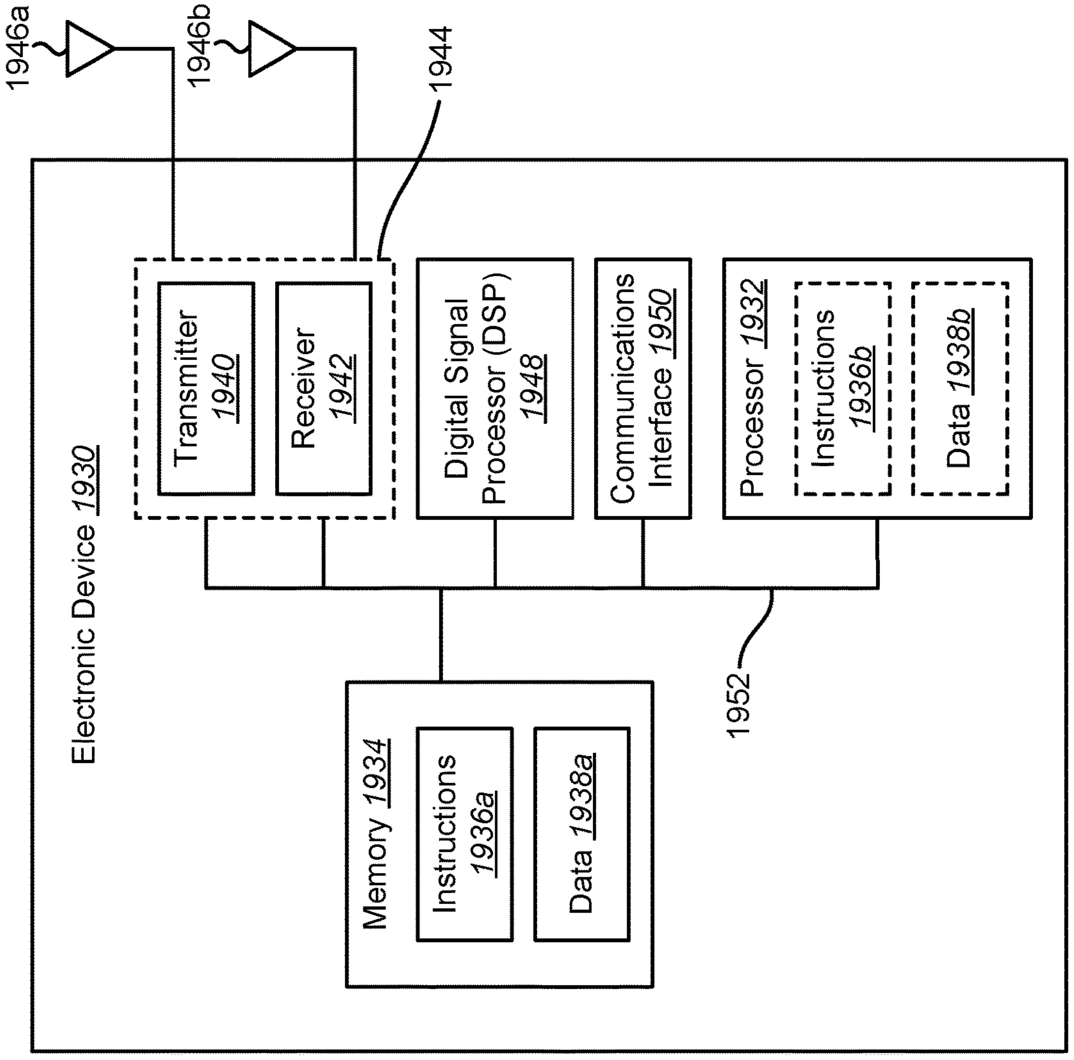
FIG. 19 illustrates certain components that may be included within an electronic device configured to implement various configurations of the multiband antennas described herein.

FIG. 19 illustrates certain components that may be included within an electronic device 1930 configured to implement various configurations of the multiband antennas described herein. The electronic device 1930 may be an access terminal, a mobile station, a user equipment (UE), a smartphone, a digital camera, a video camera, a tablet device, a laptop computer, a desktop computer, a server, etc. The electronic device 1930 may be implemented in accordance with one or more of the wireless communication devices (e.g., wireless communication device 1701) described herein.

The electronic device 1930 includes a processor 1932. The processor 1932 may be a general purpose single- or multi-chip microprocessor (e.g., an ARM), a special purpose microprocessor (e.g., a digital signal processor (DSP)), a microcontroller, a programmable gate array, etc. The processor 1932 may be referred to as a central processing unit (CPU) and/or a modem processor. Although a single processor 1932 is shown in the electronic device 1930, in an alternative configuration, a combination of processors (e.g., an ARM and DSP) could be implemented.

The electronic device 1930 also includes memory 1934. The memory 1934 may be any electronic component capable of storing electronic information. The memory 1934 may be embodied as random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), synchronous dynamic random-access memory (SDRAM), registers, and so forth, including combinations thereof.

Data 1938*a* and instructions 1936*a* may be stored in the memory 1934. The instructions 1936*a* may be executable by the processor 1932 to implement one or more of the methods described herein. Executing the instructions 1936*a* may involve the use of the data 1938*a* that is stored in the memory 1934. When the processor 1932 executes the instructions 1936, various portions of the instructions 1936*b* may be loaded onto the processor 1932 and/or various pieces of data 1938*b* may be loaded onto the processor 1932. In some configurations, the instructions 1936 may be executable to implement and/or perform one or more of the methods 1800 and/or procedures, operations, functions, etc., described herein.

The electronic device 1930 may also include a transmitter 1940 and a receiver 1942 to allow transmission and reception of signals to and from the electronic device 1930. The transmitter 1940 and receiver 1942 may be collectively referred to as a transceiver 1944. One or more antennas 1946*a-b* may be electrically coupled to the transceiver 1944. The electronic device 1930 may also include (not shown) multiple transmitters, multiple receivers, multiple transceivers, and/or additional antennas. In some examples, one or more of the antennas 1946*a-b* may be and/or include one or more of the antennas 102, 202, 302, 502, 602, 702, 802, 902, 1002, 1102, 1202, 1302, 1402, 1502 described herein The electronic device 1930 may include a digital signal processor (DSP) 1948. The electronic device 1930 may also include a communications interface 1950. The communications interface 1950 may allow and/or enable one or more kinds of input and/or output. For example, the communications interface 1950 may include one or more ports and/or communication devices for linking other devices to the electronic device 1930. In some configurations, the communications interface 1950 may include the transmitter 1940, the receiver 1942, or both (e.g., the transceiver 1944). Additionally or alternatively, the communications interface 1950 may include one or more other interfaces (e.g., touchscreen, keypad, keyboard, microphone, camera, etc.). For example, the communication interface 1950 may enable a user to interact with the electronic device 1930.

The various components of the electronic device 1930 may be coupled together by one or more buses, which may include a power bus, a control signal bus, a status signal bus, a data bus, etc. For the sake of clarity, the various buses are illustrated in FIG. 19 as a bus system 1952.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" may describe "based only on" and/or "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

One or more of the functions described herein may be implemented in hardware or in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, compact disc read-only memory (CD-ROM) or other optical disk storage, magnetic disk storage or other magnetic storage devices, or any other medium that can be used to carry or store program code in the form of instructions and/or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The method disclosed herein comprises one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" may be interpreted to mean one or more items. For example, the phrase "A, B, and/or C" may be interpreted to mean any of: only A, only B, only C, A and B (but not C), B and C (but not A), A and C (but not B), or all of A, B, and C. As used herein, the phrase "at least one of" may be interpreted to mean one or more items. For example, the phrase "at least one of A, B, and C" or the phrase "at least one of A, B, or C" may be interpreted to mean any of: only A, only B, only C, A and B (but not C), B and C (but not A), A and C (but not B), or all of A, B, and C. As used herein, the phrase "one or more of" may be interpreted to mean one or more items. For example, the phrase "one or more of A, B, and C" or the phrase "one or more of A, B, or C" may be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

Implementation examples are described in the following numbered clauses:

1. An antenna, comprising:
   a first plurality of first elements, wherein each of the first elements is dual polarized and configured to support a first set of bands and a second set of bands that is mutually exclusive from the first set of bands; and
   a second plurality of second elements, wherein each of the second elements is dual polarized and configured to support the second set of bands, and wherein the second plurality of second elements is interleaved with the first plurality of first elements.
2. The antenna of clause 1, wherein the first set of bands is lower in frequency than the second set of bands.
3. The antenna of any preceding clause, wherein a highest frequency in the first set of bands is separated from a lowest frequency in the second set of bands by more than 6 gigahertz (GHz).
4. The antenna of any preceding clause, wherein a first element spacing for the first set of bands is greater than a second element spacing for the second set of bands.
5. The antenna of any preceding clause, wherein a first number of elements for the first set of bands is less than a second number of elements for the second set of bands.
6. The antenna of any preceding clause, the antenna further comprising a third plurality of third elements, wherein each of the third elements is dual polarized and configured to support the first set of bands and one or more third bands.
7. The antenna of clause 6, wherein the one or more of the third bands overlaps with the second set of bands.
8. The antenna of clause 6, wherein a band of the one or more third bands is separated from the second set of bands by at least 3 gigahertz (GHz).
9. The antenna of any of clauses 6-8, wherein the third plurality of third elements comprises two elements that are separated by multiple of the second elements.
10. The antenna of any of clauses 6-8, wherein the third plurality of third elements comprises two elements that are separated by one second element.
11. The antenna of any preceding clause, wherein a lowest frequency in the first set of bands, the second set of bands, and the one or more third bands is greater than 23 gigahertz (GHz).
12. The antenna of any preceding clause, the antenna further comprising:
   a third element that is dual polarized and configured to support the first set of bands and a third set of bands that overlaps with the second set of bands; and
   a fourth element that is dual polarized and configured to support the first set of bands and a fourth set of bands that overlaps with the second set of bands.
13. The antenna of any preceding clause, wherein the antenna includes a non-uniform element spacing for a band.
14. The antenna of any preceding clause, wherein the antenna comprises 7 elements.
15. The antenna of any preceding clause, wherein the antenna comprises 8 elements.
16. The antenna of any preceding clause, wherein each of the first elements comprises a stack of metallic patches, wherein two of the metallic patches support respective sets of bands.
17. The antenna of any preceding clause, wherein each of the first elements and the second elements is soldered to a base.
18. The antenna of clause 17, wherein each of the first elements and the second elements is a respective printed circuit board, and wherein the base is a printed circuit board.
19. The antenna of clause 18, wherein at least two of the printed circuit boards of the first elements and the second elements are different heights.
20. The antenna of any of clauses 1-16, wherein all of the elements are on a same printed circuit board.
21. The antenna of any of clauses 1-5, the antenna further comprising a third plurality of third elements, wherein each of the third elements is dual polarized and configured to support only the first set of bands.
22. The antenna of any preceding clause, wherein one or more of the first elements comprises four feeds.
23. The antenna of any preceding clause, wherein one or more of the first elements comprises two feeds, wherein each of the two feeds corresponds to a different polarization, and wherein signals on the first set of bands and signals on the second set of bands are multiplexed for each of the different polarizations.
24. The antenna of any preceding clause, wherein the antenna has a largest dimension that is 30 millimeters or less.
25. The antenna of any preceding clause, wherein each of the first elements and second elements supports only a subset of all bands supported by the antenna.
26. A method, comprising:
   transmitting, from an antenna, a first signal in two polarizations in one of a first set of bands from a first element of a first plurality of first elements, wherein each of the first elements is configured to support the first set of bands and a second set of bands that is mutually exclusive from the first set of bands; and
   transmitting, from the antenna, a second signal in two polarizations in one of the second set of bands from a second element of a second plurality of second elements, wherein each of the second elements is configured to support the second set of bands, and wherein the second plurality of second elements is interleaved with the first plurality of first elements.
27. The method of clause 26, wherein the first set of bands is lower in frequency than the second set of bands.
28. The method of any of clauses 26-27, further comprising transmitting, from the antenna, a third signal in two polarizations in a third band from a third element of a third plurality of third elements, wherein each of the third elements is configured to support the first set of bands and the third band.
29. The method of any of clauses 26-28, wherein each of the first elements comprises a stack of metallic patches, wherein two of the metallic patches support respective sets of bands.
30. The method of clause 28, wherein the third band includes frequencies of approximately 48 GHz.
31. A non-transitory tangible computer-readable medium in combination with any of clauses 1-25, where the non-transitory tangible computer-readable medium stores computer-executable code for causing an electronic device to transmit a signal from the antenna of any of clauses 1-25.
32. An apparatus in combination with any of clauses 1-25, wherein the apparatus includes a signal transmission means that includes the antenna of any of clauses 1-25.

What is claimed is:

1. An antenna, comprising:
   a first plurality of first elements configured to support a first set of bands and a second set of bands that is mutually exclusive from the first set of bands; and
   a second plurality of second elements configured to support the second set of bands, wherein:
      each of the first elements and each of the second elements are dual polarized;

the second plurality of second elements is interleaved with the first plurality of first elements;

at least some of the first plurality of first elements and at least some of the second plurality of second elements are included on different circuit boards; and a first subset of the first elements of the first plurality of first elements and a second subset of the second elements of the second plurality of second elements are included on a first circuit board.

2. The antenna of claim 1, wherein the different circuit boards have different heights.

3. The antenna of claim 1, wherein:

a third subset of the first elements of the first plurality of first elements are included on a second circuit board; and a fourth subset of the second elements of the second plurality of second elements are included on a third circuit board.

4. The antenna of claim 1, wherein the different circuit boards are assembled on a substrate.

5. The antenna of claim 4, wherein the substrate comprises one or more metal layers configured to route signals from at least one of the first plurality of first elements or the second plurality of second elements to one or more transceivers.

6. The antenna of claim 5, wherein the one or more transceivers are disposed on an opposite side of the substrate to at least one of the first plurality of first elements or the second plurality of second elements.

7. The antenna of claim 1, wherein the first plurality of first elements and the second plurality of second elements each include at least one respective radiator.

8. The antenna of claim 7, wherein:

the at least one respective radiator of the first plurality of first elements is embedded in a first dielectric material; and the at least one respective radiator of the second plurality of second elements is embedded in a second dielectric material.

9. The antenna of claim 7, wherein the at least one respective radiator of the first plurality of first elements has a different size relative to the at least one respective radiator of the second plurality of second elements.

10. The antenna of claim 7, further comprising a third plurality of third elements, wherein each of the third elements is dual polarized and configured to support the first set of bands and one or more third bands.

11. The antenna of claim 10, wherein a third subset of the third elements of the third plurality of third elements are included on a same circuit board as a fourth subset of the second elements of the second plurality of second elements.

12. The antenna of claim 10, wherein:

the third plurality of third elements includes at least one respective radiator; and each at least one respective radiator of the first plurality of first elements, the second plurality of second elements, and the third plurality of third elements is connected to at least one respective feed.

13. An antenna, comprising:

a first plurality of first elements configured to support a first set of bands and a second set of bands that is mutually exclusive from the first set of bands, wherein all radiators in a first element of the first plurality of first elements are included in a first substrate; and a second plurality of second elements configured to support the second set of bands, wherein:

each of the first elements and each of the second elements are dual polarized;

the second plurality of second elements is interleaved with the first plurality of first elements; and all radiators in a first second element of the second plurality of second elements are included in a second substrate different from the first substrate.

14. The antenna of claim 13, wherein the different substrates comprise different dielectric materials.

15. The antenna of claim 13, wherein at least one of the different substrates includes resin with a reinforcing material.

16. The antenna of claim 13, further comprising a third plurality of third elements, wherein each of the third elements is dual polarized and configured to support the first set of bands and one or more third bands.

17. The antenna of claim 16, wherein:

the first plurality of first elements, the second plurality of second elements, and the third plurality of third elements each include at least one respective radiator; and each at least one respective radiator of the first plurality of first elements, the second plurality of second elements, and the third plurality of third elements is connected to at least one respective feed.

18. The antenna of claim 13, wherein at least one of the different substrates includes one or more metal layers configured to route signals from at least one of the first plurality of first elements or the second plurality of second elements to one or more transceivers.

19. The antenna of claim 18, wherein the one or more transceivers are disposed on an opposite side of the substrate to the at least one of the first plurality of first elements or the at least one of the second plurality of second elements.

20. The antenna of claim 13, wherein the first substrate and the second substrate are assembled on a third substrate.

* * * * *